United States Patent
Kanamoto

(10) Patent No.: US 8,847,815 B2
(45) Date of Patent: Sep. 30, 2014

(54) ELECTRONIC SCANNING RADAR APPARATUS, RECEIVED WAVE DIRECTION ESTIMATING METHOD, AND RECEIVED WAVE DIRECTION ESTIMATING PROGRAM

(75) Inventor: Junji Kanamoto, Yokohama (JP)

(73) Assignee: Honda elesys Co., Ltd., Yokohama (JP)

(*) Notice: Subject to any disclaimer, the term of this patent is extended or adjusted under 35 U.S.C. 154(b) by 363 days.

(21) Appl. No.: 13/333,405

(22) Filed: Dec. 21, 2011

(65) Prior Publication Data

US 2012/0242535 A1 Sep. 27, 2012

(30) Foreign Application Priority Data

Dec. 22, 2010 (JP) ................................. 2010-286637

(51) Int. Cl.
- *G01S 13/34* (2006.01)
- *G01S 7/35* (2006.01)
- *G01S 13/93* (2006.01)
- *G01S 13/58* (2006.01)
- *G01S 3/74* (2006.01)
- *G01S 13/00* (2006.01)
- *G01S 7/00* (2006.01)

(52) U.S. Cl.
CPC ............. *G01S 13/345* (2013.01); *G01S 13/931* (2013.01); *G01S 13/584* (2013.01); *G01S 3/74* (2013.01)
USPC ............. 342/158; 342/70; 342/118; 342/128; 342/133; 342/146; 342/147; 342/156; 342/175; 342/192; 342/194; 342/195; 342/196

(58) Field of Classification Search
USPC ................. 342/27, 28, 70–72, 118, 128–133, 342/145–158, 175, 192–197
See application file for complete search history.

(56) References Cited

U.S. PATENT DOCUMENTS

| 5,181,037 A | * | 1/1993 | Komatsu ........................ 342/70 |
| 5,229,774 A | * | 7/1993 | Komatsu ........................ 342/70 |

(Continued)

FOREIGN PATENT DOCUMENTS

| JP | 62-080576 A | 4/1987 |
| JP | 63-091684 A | 4/1988 |

(Continued)

OTHER PUBLICATIONS

Steven M. Kay, "Modern Spectral Estimation Theory & Application", Prentice Hall, 1988, pp. 426-428 (13.8.1 AR Frequency Estimation).

(Continued)

*Primary Examiner* — Bernarr Gregory
(74) *Attorney, Agent, or Firm* — Arent Fox LLP

(57) ABSTRACT

An electronic scanning radar apparatus mounted on a moving object includes a receiving unit including a plurality of antennas receiving a received wave arriving from a target having reflected a transmitted wave, a beat signal generating unit generating a beat signal from the transmitted wave and the received wave, a frequency resolving unit resolving the beat signal in beat frequencies and to calculate complex data based on the beat signal resolved for each beat frequency, and an azimuth detecting unit calculating a direction of arrival of the received wave based on original complex data calculated based on the beat signal, wherein the azimuth detecting unit includes a data extending unit generating extended complex data by extending the number of data based on the original complex data, and a first computation processing unit calculating the direction of arrival of the received wave based on the extended complex data.

20 Claims, 35 Drawing Sheets

(56) References Cited

U.S. PATENT DOCUMENTS

| | | | |
|---|---|---|---|
| 5,751,240 A * | 5/1998 | Fujita et al. | 342/70 |
| 5,757,307 A * | 5/1998 | Nakatani et al. | 342/70 |
| 6,246,359 B1 * | 6/2001 | Asano et al. | 342/158 |
| 7,394,422 B2 * | 7/2008 | Nohmi | 342/196 |
| 7,495,604 B2 * | 2/2009 | Yamano et al. | 342/147 |
| 7,688,255 B2 * | 3/2010 | Suzuki et al. | 342/133 |
| 7,692,574 B2 * | 4/2010 | Nakagawa | 342/147 |
| 7,692,575 B2 * | 4/2010 | Nishimura | 342/147 |
| 7,760,133 B2 * | 7/2010 | Shirai et al. | 342/147 |
| 7,898,460 B2 * | 3/2011 | Nishimura et al. | 342/128 |
| 7,907,083 B2 * | 3/2011 | Sakamoto et al. | 342/70 |
| 7,924,214 B2 * | 4/2011 | Ando | 342/70 |
| 7,928,897 B2 * | 4/2011 | Ishii et al. | 342/128 |
| 7,932,854 B2 * | 4/2011 | Ando | 342/70 |
| 8,026,841 B2 * | 9/2011 | Liu et al. | 342/128 |
| 8,102,309 B2 * | 1/2012 | Nakagawa | 342/147 |
| 8,446,312 B2 * | 5/2013 | Kanamoto et al. | 342/149 |
| 2007/0008211 A1 * | 1/2007 | Yamano et al. | 342/70 |

FOREIGN PATENT DOCUMENTS

| | | |
|---|---|---|
| JP | 03-293575 A | 12/1991 |
| JP | 2001-305202 A | 10/2001 |
| JP | 2006-275840 A | 10/2006 |
| JP | 2009-156582 A | 7/2009 |
| JP | 2009-162688 A | 7/2009 |
| JP | 2011-242288 A | 12/2011 |
| JP | 2012-013569 A | 1/2012 |

OTHER PUBLICATIONS

T. Shimamura et al., "Data prediction for the Burg Method", The Journal of Institute of Electronics, Information and Communication Engineers Transactions, vol. J77-A, No. 8, pp. 1182-1185, Aug. 1994.

Japanese Office Action with translation dated Apr. 8, 2014 issued in Japanese Patent Application No. 2010-286637.

Minami Nagatsuka, et al. "A Study on an Updating Algorithm Based on Maximum Entropy Method for an Adaptive Array Antenna", IEICE Technical Report, Mar. 9, 1993, vol. 92, No. 488, pp. 39-46.

* cited by examiner

FIG. 5

ASCENDING PEAK →

↑ DESCENDING PEAK ↓

|   | 1 | 2 | 3 | 4 | 5 |
|---|---|---|---|---|---|
| 1 | $r_{11}$ $v_{11}$ $pu_1$ $pd_1$ | $r_{12}$ $v_{12}$ $pu_2$ $pd_2$ | ... | | |
| 2 | $r_{21}$ $v_{21}$ $pu_1$ $pd_2$ | $r_{22}$ $v_{22}$ $pu_2$ $pd_2$ | | | |
| 3 | ... | ... | | | |
| 4 | | | | | |
| 5 | | | | | $r_{55}$ $v_{55}$ $pu_5$ $pd_5$ |

MATRIX IS CREATED TO CORRESPOND TO ANGLE CH AFTER DBF

FIG. 6

| TARGET GROUP NUMBER | DISTANCE | RELATIVE VELOCITY | FREQUENCY POINT |
|---|---|---|---|
| TARGET GROUP 1 | $r_1$ | $v_1$ | $f_1$ |
| TARGET GROUP 2 | $r_2$ | $v_2$ | $f_2$ |
| TARGET GROUP 3 | $r_3$ | $v_3$ | $f_3$ |
| TARGET GROUP 4 | $r_4$ | $v_4$ | $f_4$ |
| ⋮ | | | |

FIG. 13

STANDARD AR PARAMETER ESTIMATION
(CALCULATION OF AR COEFFICIENT)

$$\hat{a} = -\hat{C}_{xx}^{-1}\hat{c}_{xx}$$

IN EIGENVALUE DECOMPOSITION $\hat{a} = -\sum_{i=1}^{M}\frac{1}{\hat{\lambda}_i}\hat{v}_i\hat{v}_i^H\hat{c}_{xx}$ $$\hat{a} = -\left(\boxed{\sum_{i=1}^{p}\frac{1}{\hat{\lambda}_i}\hat{v}_i\hat{v}_i^H} + \boxed{\sum_{i=p+1}^{M}\frac{1}{\hat{\lambda}_i}\hat{v}_i\hat{v}_i^H}\right)\hat{c}_{xx}$$

SIGNAL SUBSPACE (COMPONENT)    NOISE SUBSPACE (COMPONENT)

AR PARAMETER
ESTIMATING        $\hat{a}_{PC} = -\hat{C}_{xx}^{\#}\hat{c}_{xx} = -\left(\boxed{\sum_{i=1}^{p}\frac{1}{\hat{\lambda}_i}\hat{v}_i\hat{v}_i^H}\right)\hat{c}_{xx}$    OR    $\hat{a}_{PC} = -\left(\hat{C}_{xx}^{-1} - \sum_{i=p+1}^{M}\frac{1}{\hat{\lambda}_i}\hat{v}_i\hat{v}_i^H\right)\hat{c}_{xx}$
METHOD IN SIGNAL
SUBSPACE          PSEUDO-INVERSE MATRIX
                  OF SIGNAL SUBSPACE
(NOISE SUBSPACE IS REMOVED)

$\hat{a}$ : AR COEFFICIENT
$\hat{C}_{xx}$ : COVARIANCE MATRIX
$\hat{c}_{xx}$ : RIGHT-HAND VECTOR
$M$ : MODEL ORDER
$p$ : SIGNAL WAVE NUMBER
$\hat{\lambda}_i$ : EIGENVALUE
$\hat{v}_i$ : EIGENVECTOR $\hat{a}_{PC}$ : PRINCIPAL COMPONENT DECOMPOSITION

FIG. 14

METHOD OF CALCULATING AR COEFFICIENT
OF SIGNAL WAVE COMPONENT $$\hat{a}_{PC} = -\sum_{i=1}^{p} \frac{1}{\hat{\lambda}_i} \hat{v}_i \hat{v}_i^H \hat{c}_{xx}$$

OR $$\hat{a}_{PC} = -\left(\hat{C}_{xx}^{-1} - \sum_{i=p+1}^{M} \frac{1}{\hat{\lambda}_i} \hat{v}_i \hat{v}_i^H\right) \hat{c}_{xx}$$

MODIFIED COVARIANCE FUNCTION $$c_x(j,k) = \frac{1}{2(N-M)} \left\{ \sum_{n=M}^{N-1} x^*(n-j)x(n-k) + \sum_{n=0}^{N-1-M} x(n+j)x^*(n+k) \right\}$$

$$k, j = 0, 1, \ldots, M \qquad c_x(k,j) = c_x{}^*(j,k)$$

$x(n)$: INPUT DATA
$N$: NUMBER OF DATA
$M$: AR MODEL ORDER a
$*$: COMPLEX CONJUGATE

VARIANCE OF INPUT
WHITE NOISE  $\sigma_v^2 = \hat{c}_x(0,0) + \sum_{k=1}^{M} \hat{a}_{PC}(k)c_x(0,k)$

POWER SPECTRUM $Sxx(\omega) = |H_{AR}(\omega)|^2 S_{vv}(\omega)$ $$= \frac{\sigma_v^2 S_{vv}(\omega)}{\left|1 + \sum_{k=1}^{M} a_{PC}(k)e^{-j\omega k}\right|^2}$$

$$S_{vv}(\omega) = \sigma_v^2$$

FREQUENCY (AZIMUTH ANGLE)

POWER

ASCENDING

|  | ANGLE 1 | ANGLE 2 | ... | FREQUENCY POINT |
|---|---|---|---|---|
| TARGET GROUP 1 | $t_1\_ang_1$ | $t_1\_ang_2$ |  | $f_1$ |
| TARGET GROUP 2 | $t_2\_ang_1$ | $t_2\_ang_2$ |  | $f_2$ |
| TARGET GROUP 3 | $t_3\_ang_1$ | $t_3\_ang_2$ |  | $f_3$ |
| TARGET GROUP 4 | $t_4\_ang_1$ | $t_4\_ang_2$ |  | $f_4$ |
| ⋮ |  |  |  |  |

DESCENDING

|  | ANGLE 1 | ANGLE 2 | ... | FREQUENCY POINT |
|---|---|---|---|---|
| TARGET GROUP 1 | $t_1\_ang_1$ | $t_1\_ang_2$ |  | $f_1$ |
| TARGET GROUP 2 | $t_2\_ang_1$ | $t_2\_ang_2$ |  | $f_2$ |
| TARGET GROUP 3 | $t_3\_ang_1$ | $t_3\_ang_2$ |  | $f_3$ |
| TARGET GROUP 4 | $t_4\_ang_1$ | $t_4\_ang_2$ |  | $f_4$ |
| ⋮ |  |  |  |  |

| TARGET GROUP No. | LONGITUDINAL DISTANCE | LONGITUDINAL POSITION | LATERAL POSITION | RELATIVE VELOCITY | FREQUENCY POINT |
|---|---|---|---|---|---|
| TARGET GROUP 1 | $r_1$ | $long\_d_1$ | $late\_d_1$ | $v_1$ | $f_1$ |
| TARGET GROUP 2 | $r_2$ | $long\_d_2$ | $late\_d_2$ | $v_2$ | $f_2$ |
| TARGET GROUP 3 | $r_3$ | $long\_d_3$ | $late\_d_3$ | $v_3$ | $f_3$ |
| TARGET GROUP 4 | $r_4$ | $long\_d_4$ | $late\_d_4$ | $v_4$ | $f_4$ |
| ⋮ | | | | | |

FIG. 26

COVARIANCE MATRIX (AVERAGE OVER NUMBER OF DATA ACQUISITIONS) Ave_C$_{xx}$(t)

RIGHT-HAND VECTOR (AVERAGE OVER NUMBER OF DATA ACQUISITIONS) Ave_c$_{xx}$(t)

AR COEFFICIENT

EXAMPLE) SECOND MEANS ORDER M: 5TH
FOURTH MEANS ORDER M: 3RD
NUMBER OF DATA ACQUISITIONS P: 2 TIMES

MODIFIED COVARIANCE FUNCTION $$c_x(j,k) = \frac{1}{2(N-M)} \left\{ \sum_{n=M}^{N-1} x^*(n-j)x(n-k) + \sum_{n=0}^{N-1-M} x(n+j)x^*(n+k) \right\}$$

$$k, j = 0, 1, \ldots, M$$

$$\begin{bmatrix} \hat{C}_x(1,1) & \hat{C}_x(1,2) & \cdots & \hat{C}_x(1,M) \\ \hat{C}_x(2,1) & \hat{C}_x(2,2) & \cdots & \hat{C}_x(2,M) \\ \vdots & \vdots & & \vdots \\ \hat{C}_x(M,1) & \hat{C}_x(M,2) & \cdots & \hat{C}_x(M,M) \end{bmatrix} \begin{bmatrix} \hat{a}(1) \\ \hat{a}(2) \\ \vdots \\ \hat{a}(M) \end{bmatrix} = - \begin{bmatrix} \hat{C}_x(1,0) \\ \hat{C}_x(2,0) \\ \vdots \\ \hat{C}_x(M,0) \end{bmatrix}$$

Ave_C$_{xx}$(t) = k1*C$_{xx2}$(t) + k2*C$_{xx1}$(t) + k3*C$_{xx2}$(t-1) + k4*C$_{xx1}$(t-1)

Ave_c$_{xx}$(t) = k1*c$_{xx2}$(t) + k2*c$_{xx1}$(t) + k3*c$_{xx2}$(t-1) + k4*c$_{xx1}$(t-1)

$x(n)$: INPUT DATA
$N$: NUMBER OF DATA
$M$: AR MODEL ORDER
*: COMPLEX CONJUGATE
$c_x(k,j) = c_x^*(j,k)$
$C_x(*,*), \hat{a}$ : COMPLEX NUMBER

CORRESPONDING TO NUMBER OF DATA ACQUISITIONS

PRESENT_2  C$_{xx2}$(t)
$$\begin{bmatrix} \hat{C}_x(1,1) & \hat{C}_x(1,2) & \cdots & \hat{C}_x(1,M) \\ \hat{C}_x(2,1) & \hat{C}_x(2,2) & \cdots & \hat{C}_x(2,M) \\ \vdots & \vdots & & \vdots \\ \hat{C}_x(M,1) & \hat{C}_x(M,2) & \cdots & \hat{C}_x(M,M) \end{bmatrix}$$

PRESENT_1  C$_{xx1}$(t)
$$\begin{bmatrix} \hat{C}_x(1,1) & \hat{C}_x(1,2) & \cdots & \hat{C}_x(1,M) \\ \hat{C}_x(2,1) & \hat{C}_x(2,2) & \cdots & \hat{C}_x(2,M) \\ \vdots & \vdots & & \vdots \\ \hat{C}_x(M,1) & \hat{C}_x(M,2) & \cdots & \hat{C}_x(M,M) \end{bmatrix}$$

PRECEDING_2  C$_{xx2}$(t-1)
$$\begin{bmatrix} \hat{C}_x(1,1) & \hat{C}_x(1,2) & \cdots & \hat{C}_x(1,M) \\ \hat{C}_x(2,1) & \hat{C}_x(2,2) & \cdots & \hat{C}_x(2,M) \\ \vdots & \vdots & & \vdots \\ \hat{C}_x(M,1) & \hat{C}_x(M,2) & \cdots & \hat{C}_x(M,M) \end{bmatrix}$$

PRECEDING_1  C$_{xx1}$(t-1)
$$\begin{bmatrix} \hat{C}_x(1,1) & \hat{C}_x(1,2) & \cdots & \hat{C}_x(1,M) \\ \hat{C}_x(2,1) & \hat{C}_x(2,2) & \cdots & \hat{C}_x(2,M) \\ \vdots & \vdots & & \vdots \\ \hat{C}_x(M,1) & \hat{C}_x(M,2) & \cdots & \hat{C}_x(M,M) \end{bmatrix}$$

AVERAGE

CORRESPONDING TO NUMBER OF DATA ACQUISITIONS

PRESENT_2  c$_{xx2}$(t)
$$\begin{bmatrix} \hat{C}_x(1,0) \\ \hat{C}_x(2,0) \\ \vdots \\ \hat{C}_x(M,0) \end{bmatrix}$$

PRESENT_1  c$_{xx1}$(t)
$$\begin{bmatrix} \hat{C}_x(1,0) \\ \hat{C}_x(2,0) \\ \vdots \\ \hat{C}_x(M,0) \end{bmatrix}$$

PRECEDING_2  c$_{xx2}$(t-1)
$$\begin{bmatrix} \hat{C}_x(1,0) \\ \hat{C}_x(2,0) \\ \vdots \\ \hat{C}_x(M,0) \end{bmatrix}$$

PRECEDING_1  c$_{xx1}$(t-1)
$$\begin{bmatrix} \hat{C}_x(1,0) \\ \hat{C}_x(2,0) \\ \vdots \\ \hat{C}_x(M,0) \end{bmatrix}$$

AVERAGE

FIG. 27

|  |  | t (GROUP) | t (PREDICTION) | t − 1 |
|---|---|---|---|---|
| TARGET 1 | r |  |  |  |
|  | Long_d |  |  |  |
|  | Late_d |  |  |  |
|  | velo |  |  |  |
|  | f_up |  |  |  |
|  | x_up_1 |  |  |  |
|  | x_up_2 |  |  |  |
|  | f_dwn |  |  |  |
|  | x_dwn_1 |  |  |  |
|  | x_dwn_2 |  |  |  |
| TARGET 2 | r |  |  |  |
|  | Long_d |  |  |  |
|  | Late_d |  |  |  |
|  | velo |  |  |  |
|  | f_up |  |  |  |
|  | x_up_1 |  |  |  |
|  | x_up_2 |  |  |  |
|  | f_dwn |  |  |  |
|  | x_dwn_1 |  |  |  |
|  | x_dwn_2 |  |  |  |
| ⋮ | ⋮ | ⋮ | ⋮ | ⋮ | r : DISTANCE
Long_d : LONGITUDINAL POSITION
Late_d : LATERAL POSITION
velo : RELATIVE VELOCITY
f_up : ASCENDING PEAK FREQUENCY
x_up_1 : COMPLEX DATA AT ASCENDING PEAK FREQUENCY (FIRST)
x_up_2 : COMPLEX DATA AT ASCENDING PEAK FREQUENCY (SECOND)
f_dwn : DESCENDING PEAK FREQUENCY
x_dwn_1 : COMPLEX DATA AT DESCENDING PEAK FREQUENCY (FIRST)
x_dwn_2 : COMPLEX DATA AT DESCENDING PEAK FREQUENCY (SECOND)

FIG. 31

| | | t (GROUP) | t (PREDICTION) | t − 1 |
|---|---|---|---|---|
| TARGET 1 | r | | | |
| | Long_d | | | |
| | Late_d | | | |
| | velo | | | |
| | f_up | | | |
| | x_up_1 | | | |
| | x_up_2 | | | |
| | AR_C_up | | | |
| | f_dwn | | | |
| | x_dwn_1 | | | |
| | x_dwn_2 | | | |
| | AR_C_dwn | | | |
| TARGET 2 | r | | | |
| | Long_d | | | |
| | Late_d | | | |
| | velo | | | |
| | f_up | | | |
| | x_up_1 | | | |
| | x_up_2 | | | |
| | AR_C_up | | | |
| | f_dwn | | | |
| | x_dwn_1 | | | |
| | x_dwn_2 | | | |
| | AR_C_dwn | | | |
| ⋮ | ⋮ | ⋮ | ⋮ | ⋮ | r : DISTANCE
Long_d : LONGITUDINAL POSITION
Late_d : LATERAL POSITION
velo : RELATIVE VELOCITY
f_up : ASCENDING PEAK FREQUENCY
x_dwn_1 : COMPLEX DATA AT ASCENDING PEAK FREQUENCY (FIRST)
x_dwn_2 : COMPLEX DATA AT ASCENDING PEAK FREQUENCY (SECOND)
AR_C_up : AR COEFFICIENT AT ASCENDING PEAK FREQUENCY
f_dwn : DESCENDING PEAK FREQUENCY
x_up_1 : COMPLEX DATA AT DESCENDING PEAK FREQUENCY (FIRST)
x_up_2 : COMPLEX DATA AT DESCENDING PEAK FREQUENCY (SECOND)
AR_C_dwn : AR COEFFICIENT AT DESCENDING PEAK FREQUENCY

ASCENDING

|  | ANGLE 1 | ANGLE 2 | ... | FREQUENCY POINT |
|---|---|---|---|---|
| TARGET GROUP 1 | $t_1\_ang_1$ | $t_1\_ang_2$ |  | $f_1$ |
| TARGET GROUP 2 | $t_2\_ang_1$ | $t_2\_ang_2$ |  | $f_2$ |
| TARGET GROUP 3 | $t_3\_ang_1$ | $t_3\_ang_2$ |  | $f_3$ |
| TARGET GROUP 4 | $t_4\_ang_1$ | $t_4\_ang_2$ |  | $f_4$ |
| ⋮ |  |  |  |  |

DESCENDING

|  | ANGLE 1 | ANGLE 2 | ... | FREQUENCY POINT |
|---|---|---|---|---|
| TARGET GROUP 1 | $t_1\_ang_1$ | $t_1\_ang_2$ |  | $f_1$ |
| TARGET GROUP 2 | $t_2\_ang_1$ | $t_2\_ang_2$ |  | $f_2$ |
| TARGET GROUP 3 | $t_3\_ang_1$ | $t_3\_ang_2$ |  | $f_3$ |
| TARGET GROUP 4 | $t_4\_ang_1$ | $t_4\_ang_2$ |  | $f_4$ |
| ⋮ |  |  |  |  |

| TARGET GROUP No. | LONGITUDINAL DISTANCE | LONGITUDINAL POSITION | LATERAL POSITION | RELATIVE VELOCITY | FREQUENCY POINT |
|---|---|---|---|---|---|
| TARGET GROUP 1 | $r_1$ | $long\_d_1$ | $late\_d_1$ | $v_1$ | $f_1$ |
| TARGET GROUP 2 | $r_2$ | $long\_d_2$ | $late\_d_2$ | $v_2$ | $f_2$ |
| TARGET GROUP 3 | $r_3$ | $long\_d_3$ | $late\_d_3$ | $v_3$ | $f_3$ |
| TARGET GROUP 4 | $r_4$ | $long\_d_4$ | $late\_d_4$ | $v_4$ | $f_4$ |
| ⋮ | | | | | |

FIG. 40
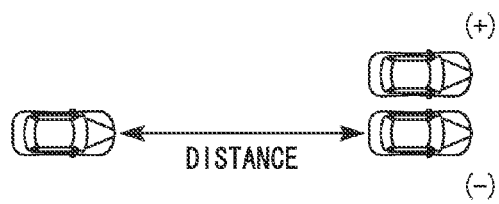
COMPARISON OF THREE OUTPUTS AROUND DISTANCE 55 mm
(a) 5 CH- THIRD ORDER, WAVE NUMBER 2
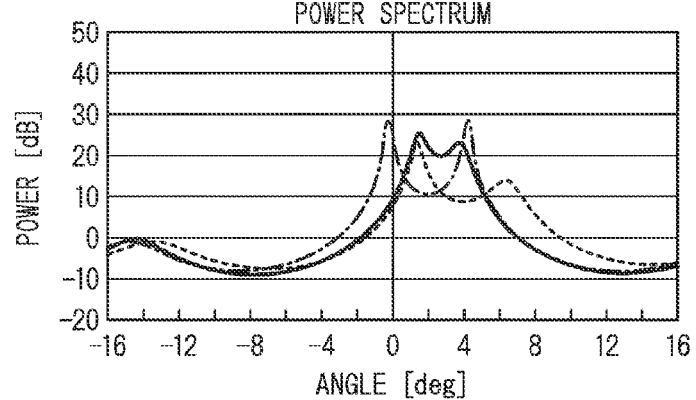
(b) EXTENDED 9 CH- FIFTH ORDER, WAVE NUMBER 2 (FOURTH EMBODIMENT)
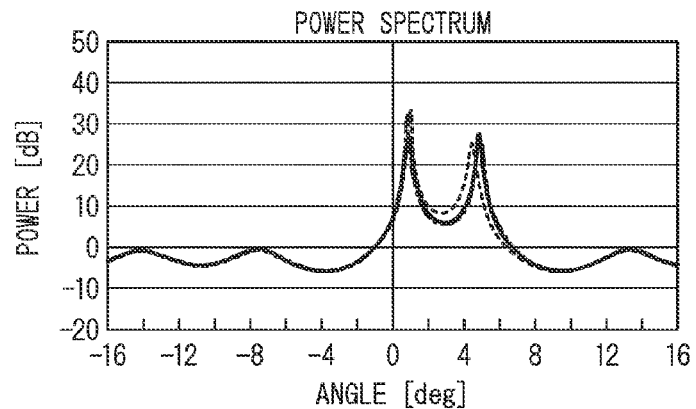
(c) EXTENDED 9 CH- FIFTH ORDER, WAVE NUMBER 2 (SIXTH EMBODIMENT)
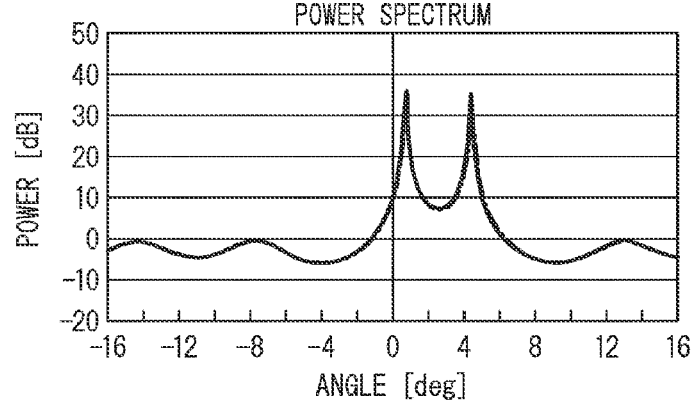

US 8,847,815 B2

ELECTRONIC SCANNING RADAR APPARATUS, RECEIVED WAVE DIRECTION ESTIMATING METHOD, AND RECEIVED WAVE DIRECTION ESTIMATING PROGRAM

CROSS-REFERENCE TO RELATED APPLICATIONS

Priority is claimed on Japanese Patent Application No. 2010-286637, filed Dec. 22, 2010, the contents of which are entirely incorporated herein by reference.

BACKGROUND OF THE INVENTION

1. Field of the Invention

The present invention relates to an electronic scanning radar apparatus and a received wave direction estimating method, which can detect a target using a reflected wave from a target in response to a transmitted wave and which can be suitably used for a vehicle, and a received wave direction estimating program used therein.

2. Background Art

Electronic scanning type radars such as an FMCW (Frequency Modulated Continuous Wave) radar, a multi-frequency CW (Continuous Wave) radar, and a pulse radar have been known as an on-board radar for some time.

In the radars, an arrival wave direction estimating method of an array antenna is used as a technique of detecting the direction of an arrival wave (or a received wave) from a target (a reflecting object).

As such an arrival wave direction estimating method, high-resolution (high-precision) algorithms such as an AR spectrum estimating method (FIG. 41) and a MUSIC (Multiple Signal Classification) method have been used (see JP-A-2006-275840 (Patent Document 1), JP-A-2009-156582 (Patent Document 2), and JP-A-2009-162688 (Patent Document 3)). The AR spectrum estimating method may also be called a maximum entropy method (MEM) or a linear prediction method.

When the direction of an arrival wave from a target (a reflecting object) is estimated using such algorithms, the estimation process is performed after input data (data in which a noise component is mixed into a complex sinusoidal wave) expressed by a complex number is transformed into a matrix format of a correlation matrix.

In a high-resolution arrival wave direction estimating method used in an on-board radar, a correlation matrix in a preceding control cycle is stored and is subjected to an averaging process (or an adding process) with a correlation matrix in the present control cycle and then a direction estimating process is performed, in order to suppress a noise component and to improve estimation precision. This correlation matrix averaging process can provide a great effect for improvement in azimuth detection precision (angular precision or resolution) in an on-board radar having a small number of channels (Patent Document 2).

The high-resolution algorithms have a problem in that the estimation should be performed after an appropriate number of arrival waves (received waves) (model order in the case of the AR spectrum estimating method) is set. It is necessary to set an appropriate value when they are applied to an on-board radar (Patent Document 3).

SUMMARY OF THE INVENTION

In a DBF or a high-resolution algorithm of estimating an azimuth, it is known that as the number of channels which can be acquired from detected information increases, the order of a matrix or a normal equation as a processing source is increased or the precision of elements of the matrix becomes further improved, thereby enhancing the azimuth estimation precision.

On the contrary, in applications such as an on-board radar requiring a decrease in size and cost, there is a demand for constructing a receiving system with a smaller number of channels.

In this manner, when the number of channels cannot be easily increased, there is a problem in that it is difficult to enhance the precision of azimuth estimation.

The invention is made in consideration of these circumstances and an object thereof is to provide an electronic scanning radar apparatus, a received wave direction estimating method, and a received wave direction estimating program, which can enhance azimuth estimation precision without increasing the number of channels to be acquired.

According to a first aspect of the invention, there is provided an electronic scanning radar apparatus mounted on a moving object, including: a receiving unit including a plurality of antennas receiving a received wave arriving from a target having reflected a transmitted wave; a beat signal generating unit configured to generate a beat signal from the transmitted wave and the received wave; a frequency resolving unit configured to resolve the beat signal in beat frequencies having a predetermined frequency bandwidth and to calculate complex data based on the beat signal resolved for each beat frequency; and an azimuth detecting unit configured to calculate a direction of arrival of the received wave based on original complex data which is the complex data calculated based on the beat signal, wherein the azimuth detecting unit includes a data extending unit configured to generate extended complex data by extending the number of data based on the original complex data, and a first computation processing unit configured to calculate the direction of arrival of the received wave based on the extended complex data.

In the electronic scanning radar apparatus, the azimuth detecting unit may further include a second computation processing unit configured to generate a coefficient used to generate the extended complex data in a linear equation created based on the original complex data.

In the electronic scanning radar apparatus, the data extending unit may be configured to generate the extended complex data based on the original complex data and the coefficient.

In the electronic scanning radar apparatus, the first computation processing unit may include: an order-increased matrix creating unit configured to create an order-increased matrix which is increased to a predetermined desired order and which has the extended complex data as elements; an eigenvalue decomposition unit configured to obtain eigenvalues and eigenvectors by applying eigenvalue decomposition to the order-increased matrix; and a wave number estimating unit configured to calculate an estimated wave number by estimating the wave number of the arrival wave based on the obtained eigenvalues and the eigenvectors, and the direction of arrival of the received wave may be calculated based on a subspace determined by the calculated wave number.

In the electronic scanning radar apparatus, the first computation processing unit may further include: a pseudo-inverse matrix calculating unit configured to calculate a pseudo-inverse matrix of a signal subspace included in the subspace determined by the calculated wave number; and a first coefficient calculating unit configured to calculate a first AR coefficient derived from the pseudo-inverse matrix of the signal subspace and a variance value of white noise, and the first computation processing unit may be configured to perform a computational process based on a principal component AR spectrum estimating method.

In the electronic scanning radar apparatus, the coefficient may be calculated based on a linear equation expressing an autoregressive model in a spectrum estimating method using the autoregressive model.

In the electronic scanning radar apparatus, the data extending unit may be configured to generate the extended complex data based on the coefficient calculated in a present detection cycle out of detection cycles in which the process of calculating the direction of arrival of the received wave is repeatedly performed.

The electronic scanning radar apparatus may further include a storage unit configured to store information corresponding to the target in correlation with the number of times of the detection cycles and the data extending unit may be configured to generate the extended complex data based on the coefficient which is stored in the storage unit as the information corresponding to the target and which is calculated in a preceding detection cycle previous to the present detection cycle.

In the electronic scanning radar apparatus, the data extending unit may be configured to generate the extended complex data based on the original complex data calculated in the present detection cycle and the preceding complex data stored in the storage unit as the information corresponding to the target and calculated in the preceding detection cycle previous to the present detection cycle.

The electronic scanning radar apparatus may further include a target linking unit configured to correlate the targets detected in the present detection cycle and the preceding detection cycle and to store the information correlated with the correlated target in the storage unit.

In the electronic scanning radar apparatus, the target linking unit may be configured to correlate the target detected in the present detection cycle and the preceding detection cycle based on a distance and a relative velocity, or a distance, a relative velocity, and an azimuth.

In the electronic scanning radar apparatus, the first computation processing unit may further include a matrix filter unit configured to average the order-increased matrix having the generated extended complex data as elements based on the information corresponding to the target, and the eigenvalue decomposition unit may be configured to obtain eigenvalues and eigenvectors by applying eigenvalue decomposition to the averaged order-increased matrix.

In the electronic scanning radar apparatus, the first computation processing unit may further include a first normal equation filter unit configured to average the order-increased matrices and right-hand vectors which are constituent parts of a first normal equation created based on the extended complex data which is extended based on the complex data acquired in a predetermined number of detection cycles including the present detection cycle.

In the electronic scanning radar apparatus, the second computation processing unit may include: a normal equation creating unit configured to create a second normal equation based on the extended complex data; and a second coefficient calculating unit configured to calculate the coefficient derived based on the second normal equation.

In the electronic scanning radar apparatus, the second computation processing unit may further include a second normal equation filter unit configured to average the second normal equation, and the second coefficient calculating unit may be configured to calculate the coefficient from the averaged second normal equation.

The electronic scanning radar apparatus may further include a peak detecting unit configured to detect a peak value from intensity values of the beat frequencies to detect the presence of the target, and the azimuth detecting unit may be configured to calculate the direction of arrival of the received wave based on the complex data corresponding to the target of which the presence is detected by the peak detecting unit.

The electronic scanning radar apparatus may further include a DBF unit configured to detect the presence and the azimuth of the target through the use of a digital beam forming process of enhancing receiving sensitivity in a desired direction in which the received wave is received based on the complex data, and the peak detecting unit may be configured to detect the azimuth of the target based on the digital beam forming in the beat frequencies in the present detection cycle.

In the electronic scanning radar apparatus, the first computation processing unit may be configured to create a matrix of which precision of elements is enhanced without increasing the order thereof.

According to a second aspect of the invention, there is provided a received wave direction estimating method in an electronic scanning radar apparatus mounted on a moving object, including: a receiving step of causing a receiving unit to receive a received wave arriving from a target having reflected a transmitted wave through the use of a plurality of antennas; a beat signal generating step of causing a beat signal generating unit to generate a beat signal from the transmitted wave and the received wave; a frequency resolving step of causing a frequency resolving unit to resolve the beat signal in beat frequencies having a predetermined frequency bandwidth and calculating complex data based on the beat signal resolved for each beat frequency; and an azimuth detecting step of calculating a direction of arrival of the received wave based on original complex data which is the complex data calculated based on the beat signal, wherein the azimuth detecting step includes a data extending step of generating extended complex data by extending the number of data based on the original complex data, and a first computation processing step of calculating the direction of arrival of the received wave based on the extended complex data.

According to a second aspect of the invention, there is provided a program causing a computer to perform a received wave direction estimating process in an electronic scanning radar apparatus mounted on a moving object, the received wave direction estimating process including: a receiving step of receiving a received wave arriving from a target having reflected a transmitted wave through the use of a plurality of antennas; a beat signal generating step of generating a beat signal from the transmitted wave and the received wave; a frequency resolving step of resolving the beat signal in beat frequencies having a predetermined frequency bandwidth and calculating complex data based on the beat signal resolved for each beat frequency; and an azimuth detecting step of calculating a direction of arrival of the received wave based on original complex data which is the complex data calculated based on the beat signal, wherein the azimuth detecting step includes a data extending step of generating extended complex data by extending the number of data based on the original complex data, and a first computation processing step of calculating the direction of arrival of the received wave based on the extended complex data.

As described above, according to the invention, the receiving unit includes plural antennas receiving a received wave arriving from a target having reflected a transmitted wave. The beat signal generating unit generates a beat signal from the transmitted wave and the received wave. The frequency resolving unit resolves the beat signal in beat frequencies having a predetermined frequency bandwidth and calculates complex data based on the beat signal resolved for each beat frequency. The azimuth detecting unit calculates the direction of arrival of the received wave based on the original complex data which is the complex data calculated based on the beat signal. In the azimuth detecting unit, the data extending unit generates the extended complex data by extending the number of data based on the original complex data. The first computation processing unit calculates the direction of arrival of the received wave based on the extended complex data.

In this manner, the azimuth detecting unit can generate the extended complex data by extending the number of data based on the complex data calculated from the beat signal resolved for each beat frequency in which the presence of a target is detected and can calculate the direction of arrival of the received wave based on the extended complex data.

Accordingly, it is possible to provide an electronic scanning radar apparatus and a received wave direction estimating program which can detect an azimuth with enhanced detection precision which can enhance the azimuth estimation precision without increasing the number of channels to be acquired.

BRIEF DESCRIPTION OF THE DRAWINGS

FIG. 5 is a table illustrating a matrix of beat frequencies of an ascending region and a descending region in a peak combining unit 24 and intersections of the matrix, that is, distances, relative velocities, and peak levels in combinations of beat frequencies in the ascending region and the descending region.

FIG. 6 is a table illustrating a distance, a relative velocity, and a frequency point for each target of which a pair of peaks is fixed in a present detection cycle.

FIG. 13 is a diagram illustrating a computation process of calculating a principal component decopmposition solution AR coefficient $a_{PC}$.

FIG. 14 is a diagram illustrating a computation process of calculating a variance value of white noise and a power spectrum from the principal component decopmposition AR coefficient $a_{PC}$.

FIG. 26 is a diagram illustrating the configuration of an M-th order normal equation based on complex data and an averaging process.

FIG. 27 is a diagram illustrating a table stored in a memory 21.

FIG. 31 is a diagram illustrating a table stored in a memory 21.

FIG. 40 is a diagram illustrating direction estimation characteristics of the electronic scanning radar apparatus according to the eighth embodiment.

DETAILED DESCRIPTION OF THE INVENTION

<AR Spectrum Estimation>

First, an AR spectrum estimating method (AR Spectral Estimation) applied to embodiments of the invention will be described.

An AR spectrum estimating method is known as a spectrum estimating method of estimating a spectrum like a MUSIC method and an estimation process using an AR model (Autoregressive model) is performed. The AR spectrum estimating method is classified into a parametric method if the MUSIC method is classified into a subspace method. The AR spectrum estimating method may also be called a maximum entropy method or a linear prediction method.

Figure 41:
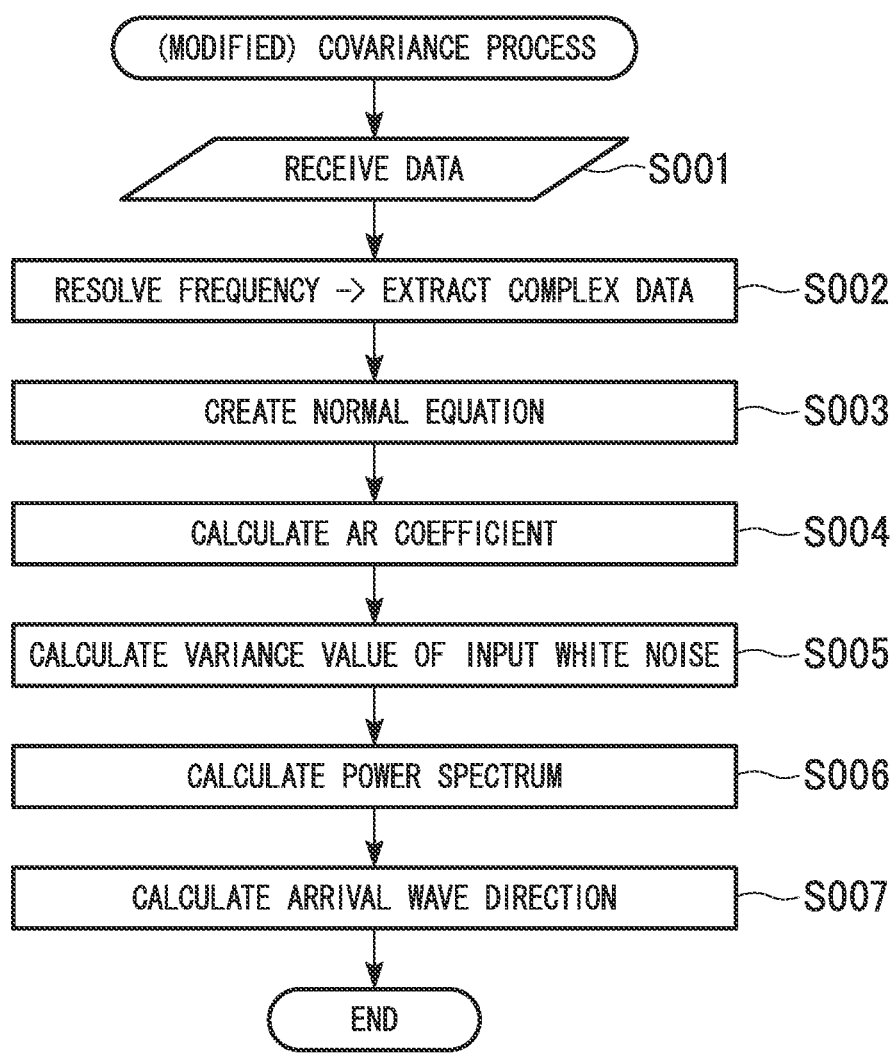
FIG. 41 is a diagram illustrating an AR spectrum estimating process according to the background art.

In the AR spectrum estimating method, first, an object is modeled using an AR model expressed by a linear equation and a normal equation (which includes a matrix referred to as an autocorrelation matrix or a covariance matrix and a vector referred to as a right-hand vector or a cross-correlation vector) which is a linear equation based on input data is created. The coefficients of an AR filter (AR coefficients) and the variance values of input white noise are calculated based on the normal equation and then a power spectrum is calculated and estimated using the AR coefficients and the variance values of the input white noise (see FIG. 41). Channel data in spatial directions like the radar in the below-described embodiments as well as time-series data can be used as the input data. The AR spectrum estimating method is roughly classified into a method using an autocorrelation matrix and a method using a covariance matrix. Examples of the method using an autocorrelation matrix include an autocorrelation method (or a Yule-Walker method) and a Burg method. Examples of the method using a covariance matrix include a covariance method and a modified covariance method. The modified covariance method is also referred to as a forward and backward linear prediction method.

Since the AR spectrum estimating methods (hereinafter, referred to as a "standard AR spectrum estimating method") does not perform eigenvalue decompostion, they have a relatively light computational load.

In the AR spectrum estimating method used in the below-described embodiments, a detected signal is resolved into a signal subspace and a noise subspace and then a detection process is performed. By extracting the signal subspace, the detection characteristics in the spectrum estimating process can be adapted to the wave number of a received wave even when the order of an AR model is fixed.

In this AR spectrum estimating method, a principal component AR spectrum estimating method (Principal Component AR Parameter Estimator) is applied to a signal subspace of a covariance matrix expressed based on the modified covariance method (or the covariance method). The principal component AR spectrum estimating method is a technique of combining the parametric method and the subspace method. In the AR spectrum estimating method, the result of the eigenvalue decompostion of a covariance matrix can be applied to a spectrum-estimating computation process by employing the principal component AR spectrum estimating method. The concept of this AR spectrum estimating method is described in a reference document (Principal Component AR Spectral Estimator, Steven M. Kay/Modern Spectral Estimation Theory & Application/Prentice Hall/1988, pp. 426-428 (13.8.1 AR Frequency Estimation)). The signal subspace is extracted by creating a pseudo-inverse covariance matrix corresponding to the signal subspace.

In this manner, the principal component AR spectrum estimating method can reduce the generation of a spurious peak even when the wave number of a received signal is smaller than the set order and the noise component is large. Accordingly, it is possible to increase the order so as to enhance the estimation precision in the AR spectrum estimation.

First Embodiment

Hereinafter, an electronic scanning radar apparatus (FMCW millimeter wave radar) according to a first embodiment of the invention will be described with reference to the accompanying drawings.

Figure 1:
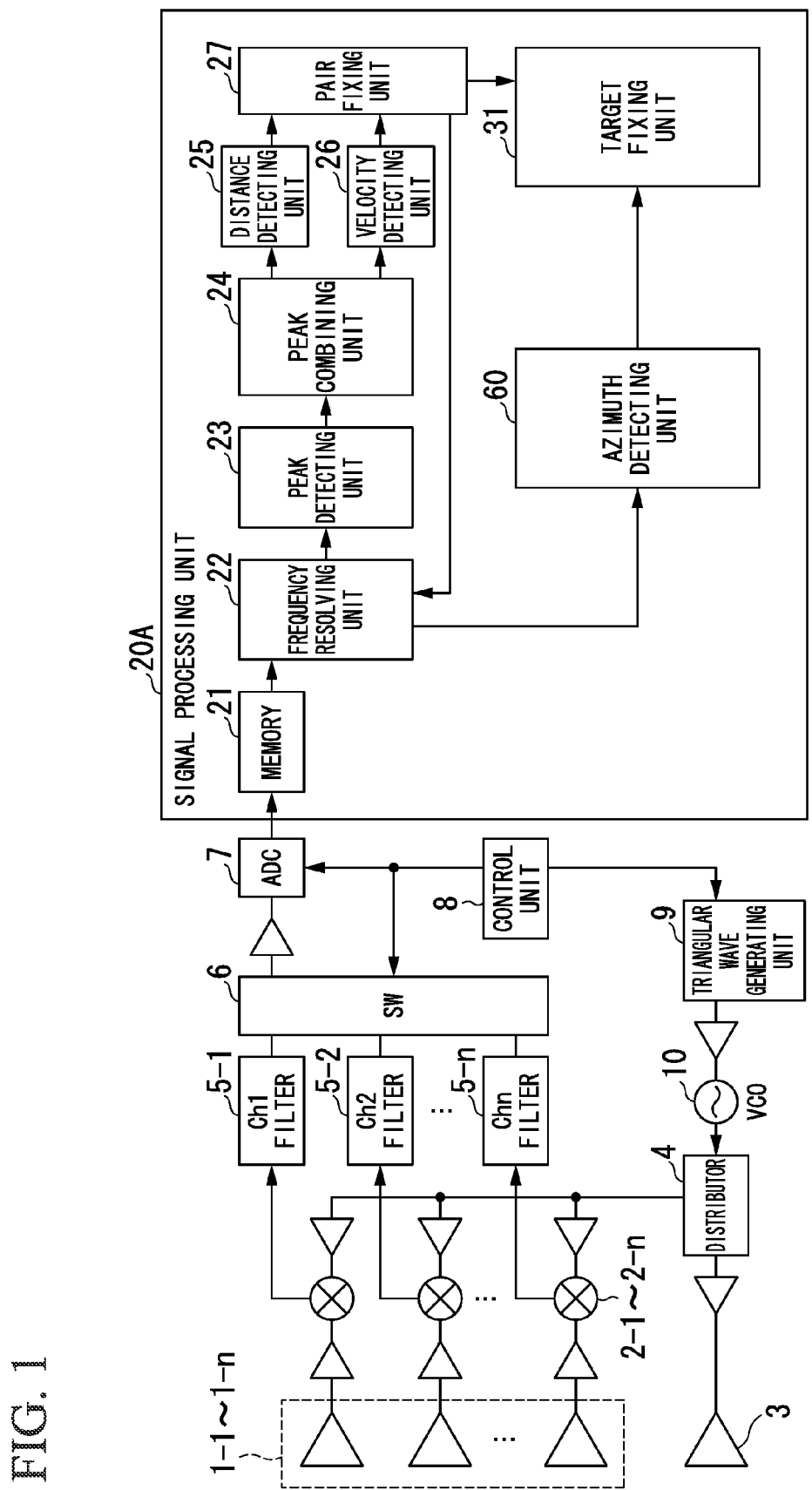
FIG. 1 is a block diagram illustrating the configuration of an electronic scanning radar apparatus according to a first embodiment of the invention.

FIG. 1 is a block diagram illustrating the configuration of the electronic scanning radar apparatus according to the first embodiment.

In the drawing, the electronic scanning radar apparatus according to the first embodiment includes receiving antennas 1-1 to 1-n, mixers 2-1 to 2-n, a transmitting antenna 3, a distributor 4, filters 5-1 to 5-n, a SW (switch) 6, an ADC (A/D converter) 7, a control unit 8, a triangular wave generating unit 9, a VCO 10, and a signal processing unit 20A.

The signal processing unit 20A includes a memory 21, a frequency resolving unit 22, a peak detecting unit 23, a peak combining unit 24, a distance detecting unit 25, a velocity detecting unit 26, a pair fixing unit 27, a target fixing unit 31, and an azimuth detecting unit 60.

The operation of the electronic scanning radar apparatus according to the first embodiment will be described below with reference to FIG. 1.

The receiving antennas 1-1 to 1-n receive a reflected wave arriving from a target by causing a transmitted wave to be reflected by the target, that is, a received wave.

The mixers 2-1 to 2-n mix signals acquired by amplifying the transmitted wave transmitted from the transmitting antenna 3 and the received wave received by the receiving antennas 1-1 to 1-n through the use of an amplifier and generate beat signals corresponding to frequency differences.

The transmitting antenna 3 transmits a transmission signal, which is acquired by frequency-modulating a triangular wave signal generated by the triangular wave generating unit 9 by the use of the VCO (Voltage-Controlled Oscillator) 10, to a target as the transmitted wave.

The distributor 4 distributes the frequency-modulated transmission signal from the VCO 10 to the mixers 2-1 to 2-n and the transmitting antenna 3.

The filters 5-1 to 5-n limit bands of the beat signals of Ch1 to Chn, which are generated by the mixers 2-1 to 2-n, corresponding to the receiving antennas 1-1 to 1-n and output the band-limited beat signals to the SW (switch) 6.

The SW 6 sequentially switches the beat signals of Ch1 to Chn, which have passed through the filters 5-1 to 5-n, corresponding to the receiving antennas 1-1 to 1-n and outputs the switched beat signals to the ADC (A/D converter) 7, in response to a sampling signal input from the control unit 8.

The ADC 7 A/D-converts the beat signals of Ch1 to Chn, which are input from the SW 6 in synchronization with the sampling signal, corresponding to the receiving antennas 1-1 to 1-n into digital signals in synchronization with the sampling signal and sequentially stores the digital signals in a waveform storage area of the memory 21 in the signal processing unit 20.

The control unit 8 is constructed by a microcomputer or the like and controls the entire electronic scanning radar apparatus shown in FIG. 1 based on a control program stored in a ROM (not shown) or the like.

(Principle of Detecting Distance, Relative Velocity, Angle (Azimuth))

The principle of detecting a distance, a relative velocity, and an angle (azimuth), which are used in the signal processing unit 20 according to the first embodiment, between the electronic scanning radar apparatus and a target will be described in detail below with reference to the accompanying drawings.

Figure 2A:
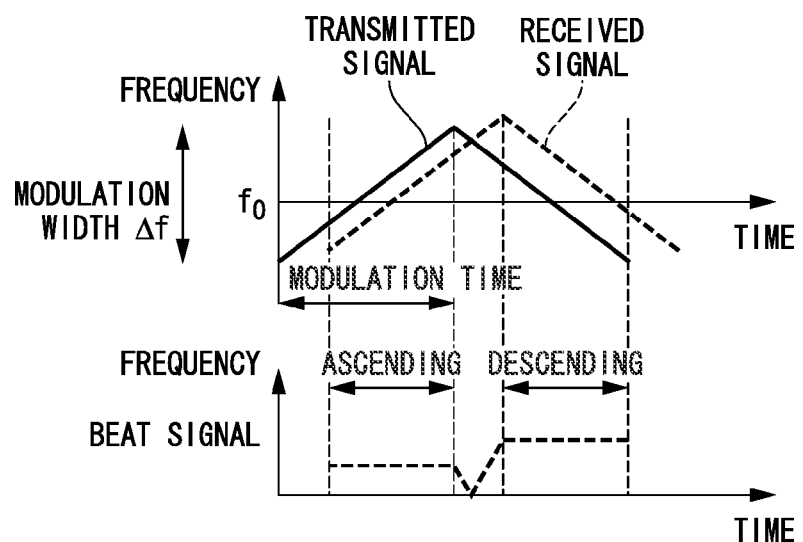
FIGS. 2A and 2B are diagrams illustrating a state where a transmitted signal and a received signal reflected from a target are input.
Figure 2B:
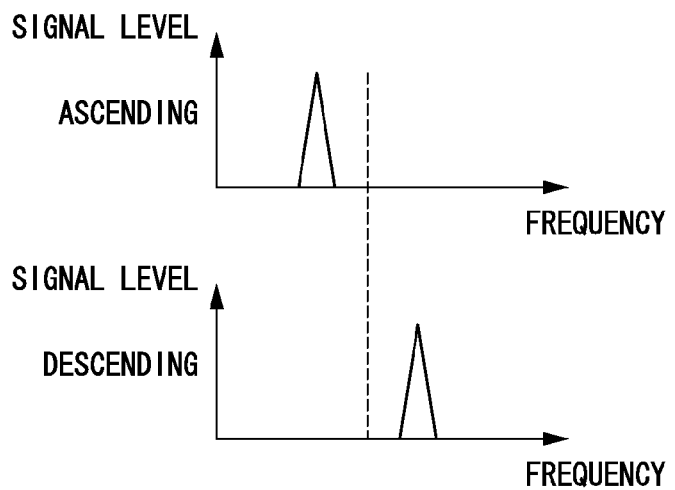

FIGS. 2A and 2B are diagrams illustrating a state in which a transmitted signal and a received signal reflected from a target are input.

The signals shown in the drawings are the transmitted signal acquired by frequency-modulating a signal generated by the triangular wave generating unit 9 shown in FIG. 1 by the use of the VCO 10 and the received signal received by causing the transmitted signal to be reflected by the target. In the example shown in the drawings, the number of targets is one.

As can be seen from FIG. 2A, the received signal which is a reflected wave from the target is received with a delay in a right-hand direction (time delay direction) with respect to the transmitted signal in proportion to the distance from the target. The received signal is shifted with respect to the transmitted signal in the vertical direction (frequency direction) in proportion to the relative velocity between the electronic scanning radar apparatus and the target. When the beat signals acquired in FIG. 2A are frequency-transformed (through the use of a Fourier transform, a DTC, a Hadamard transform, a wavelet transform, or the like), one peak value is generated in each of an ascending region and a descending region in the case of a single target. In FIG. 2A, the horizontal axis represents the frequency and the vertical axis represents the intensity.

The frequency resolving unit 22 frequency-resolves sampled data of the beat signals stored in the memory 21 in the ascending part (ascending) and the descending part (descending) of the triangular wave at discrete times, for example, through the use of the Fourier transform. That is, the frequency resolving unit 22 resolves the beat signals in frequencies having a predetermined frequency bandwidth and calculates complex data based on the beat signals resolved for each beat frequency.

As a result, as shown in FIG. 2B, a graph of signal levels for the resolved beat frequencies in the ascending region and the descending region is obtained.

The peak detecting unit 23 detects the peak value from the signal level for each beat frequency shown in FIG. 2B to detect the presence of a target and outputs the beat frequency (both the ascending part and the descending part) of the peak value as a target frequency.

The distance detecting unit 25 calculates the distance r through the use of the following equation based on the target frequency fu of the ascending part and the target frequency fd of the descending part input from the peak combining unit 24. In the equation, "·" represents a multiplication.

$$r = \{C \cdot T/(2 \cdot \Delta f)\} \cdot \{(fu+fd)/2\}$$

The velocity detecting unit 26 calculates the relative velocity v through the use of the following equation based on the target frequency fu of the ascending part and the target frequency fd of the descending part input from the peak combining unit 24.

$$v = \{C/(2 \cdot f0)\} \cdot \{(fu-fd)/2\}$$

In the equations for calculating the distance r and the relative velocity v, C represents the light velocity, $\Delta f$ represents the frequency modulation width of a triangular wave, f0 represents the central frequency of the triangular wave, T represents the modulation time (ascending part/descending part), fu represents the target frequency of the ascending part, and fd represents the target frequency of the descending part.

The receiving antennas 1-1 to 1-n in the first embodiment will be described below.

Figure 3:
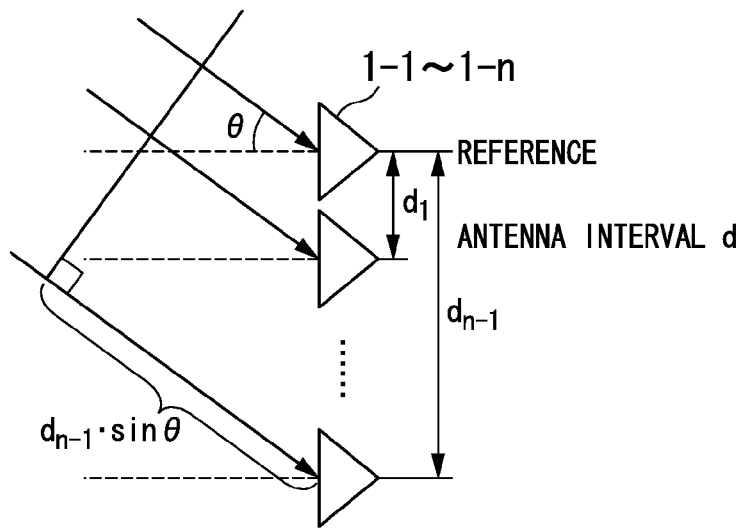
FIG. 3 is a conceptual diagram illustrating received waves in receiving antennas.

FIG. 3 is a conceptual diagram illustrating the received wave in the receiving antennas.

As shown in the drawing, the receiving antennas 1-1 to 1-n are arranged in an array at an interval d. An arrival wave from a target (an incident wave or a reflected wave from the target in response to the transmitted wave transmitted from the transmitting antenna 3) is incident on the receiving antennas 1-1 to 1-n from the direction of angle θ about the axis perpendicular to the plane in which the antennas are arranged. At this time, the arrival wave from the target is received at the same angle by the receiving antennas 1-1 to 1-n. A phase difference "$d_{n-1} \cdot \sin \theta$" calculated by the same angle, for example, the angle θ and the interval d between the antennas, appears between the adjacent receiving antennas.

The angle θ can be detected through the use of a signal process such as a digital beam forming (DBF) or a high-resolution algorithm of additionally Fourier-transforming the values, which are subjected to the frequency resolution in the time direction for each antenna, in the antenna direction using the phase difference.

<Signal Process on Received Wave in Signal Processing Unit 20>

The signal process on a received wave in the signal processing unit 20A will be described below.

The memory 21 includes a waveform storage area. The memory 21 stores the time-series data (the ascending part and the descending part) of the received signal, which is subjected to the A/D conversion by the ADC 7, in the waveform storage area in correlation with the receiving antennas 1-1 to 1-n. For example, when 256 pieces of data are sampled from the ascending part and the descending part, data pieces of 2×256× antenna number are stored in the waveform storage area.

The frequency resolving unit 22 transforms the beat signals corresponding to Ch1 to Chn (the antennas 1-1 to 1-n) into frequency components with a predetermined resolution, for example, through the use of the Fourier transform and thus outputs frequency points indicating the beat frequencies and complex data of the beat frequencies. For example, when each of the ascending part and the descending part of each antenna has 256 sampled data pieces, the frequency resolving unit 22 transforms the data pieces in the beat frequencies as complex frequency-domain data of the antennas and generates 128 pieces of complex data for each of the ascending part and the descending part (data pieces of 2×128×antenna number). The beat frequencies are indicated by the frequency points.

Here, a phase difference based on the angle θ exists between the complex data pieces for the antennas. The absolute values (receiving intensities or amplitudes) of the complex data pieces in the complex plane are equivalent to each other.

The peak detecting unit 23 detects the beat frequencies having a peak value greater than a predetermined value from the peaks of the signal intensities (or amplitudes) using the peak values of the intensities in the ascending region and the descending region of the triangular wave of the frequency-transformed beat frequencies and the complex data. Accordingly, the presence of a target for each beat frequency is detected and the target frequency is selected.

Therefore, the peak detecting unit 23 can detect the peak value of the spectrum as the presence of a target depending on the beat frequency, that is, the distance, by converting the complex data for any one antenna or the sum of the complex data of all the antennas into a frequency spectrum. By adding the complex data of all the antennas, the noise components are averaged and the S/N ratio is thus improved.

Figure 4:
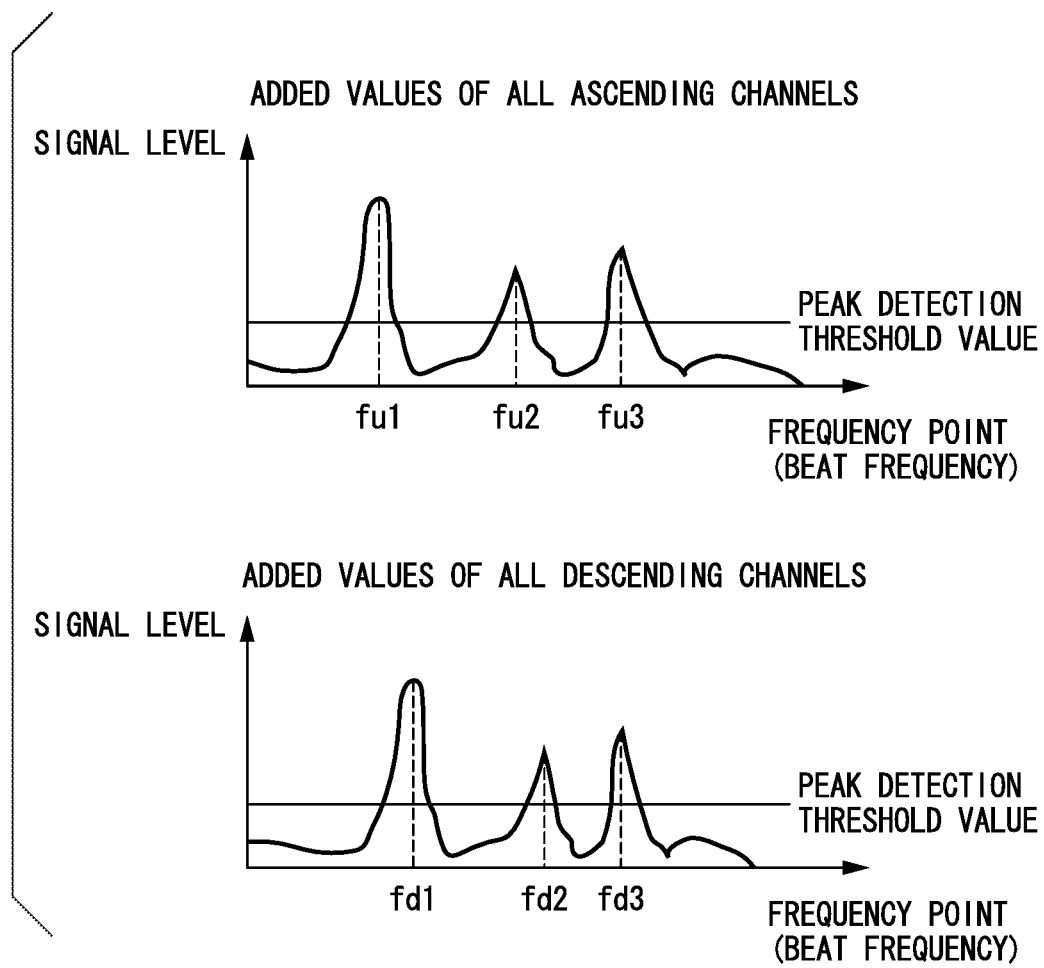
FIG. 4 is a graph illustrating the result of resolution of a beat signal in frequencies, where beat frequencies (horizontal axis) and peak values (vertical axis) thereof are shown.

The peak combining unit 24 totally combines the beat frequencies of the ascending region and the descending region and the peak values thereof in a matrix shape based on the beat frequencies and the peak values thereof input from the peak detecting unit 23 and shown in FIG. 4, that is, combines all the beat frequencies of the ascending region and the descending region, and sequentially outputs the combinations to the distance detecting unit 25 and the velocity detecting unit 26. In FIG. 4, the horizontal axis represents the frequency point of the beat frequency and the vertical axis represents the signal level (intensity).

The distance detecting unit 25 calculates the distance r from the target based on the values obtained by adding the beat frequencies of the combinations of the ascending region and the descending region sequentially input thereto.

The velocity detecting unit 26 calculates the relative velocity v to the target based on the difference between the beat frequencies of the combinations of the ascending region and the descending region sequentially input thereto.

The pair fixing unit 27 creates a table shown in FIG. 5 based on the input distance r, the input relative velocity v, and the input peak levels pu and pd of the ascending region and the descending region, determines a suitable combination of the peaks of the ascending region and the descending region for each target, fixes the pair of the peaks of the ascending region and the descending region using a table shown in FIG. 6, and outputs a target group number indicating the fixed distance r and the fixed relative velocity v to the target fixing unit 31. The pair fixing unit sends the frequency point in which the pair is fixed to the frequency resolving unit 22 and determines the complex data to be sent to the azimuth detecting unit 60. In FIG. 6, the distance, the relative velocity, and the frequency point (the ascending region or the descending region) are stored in correspondence to the target group number. The tables shown in FIGS. 5 and 6 are stored in an internal storage unit of the pair fixing unit 27. Here, since the directions of the respective target groups are not determined, the positions in the lateral direction parallel to the arrangement direction of the receiving antennas 1-1 to 1-n with respect to the axis perpendicular to the arrangement direction of the antenna array in the electronic scanning radar apparatus have not been determined.

Here, the pair fixing unit 27 may employ a method of selecting the combination of the target groups preferentially using the values predicted in the present detection cycle out of the distances r and the relative velocities v from and to the targets, which are finally fixed in the preceding detection cycle.

The configuration in which the AR spectrum estimating method known as a high-resolution algorithm is used for the spectrum estimating process will be described below in more detail.

The azimuth detecting unit 30 performs a spectrum estimating process using an AR spectrum estimating process as a high-resolution algorithm, detects the azimuth of the corresponding target based on the result of the spectrum estimation, and outputs the detected azimuth to the target fixing unit 31.

The azimuth detecting unit 60 generates extended complex data of which the number of data is extended based on the complex data calculated based on the beat signals, and estimates the wave number of the received wave based on the eigenvalues of a matrix which is a constituent part of a normal equation having the extended complex data as elements. The azimuth detecting unit 60 calculates as an AR coefficient a solution to the normal equation based on the pseudo-inverse matrix of the signal subspace created based on the eigenvalues and eigenvectors corresponding to the estimated wave number and calculates the direction of arrival of the received wave based on the calculated AR coefficients.

The target fixing unit 31 correlates the azimuth of a target detected by the azimuth detecting unit 60 with the distance r, the relative velocity v, and the frequency point input from the pair fixing unit 27 and shown in FIG. 6 and then fixes and outputs the present status.

Figure 7:
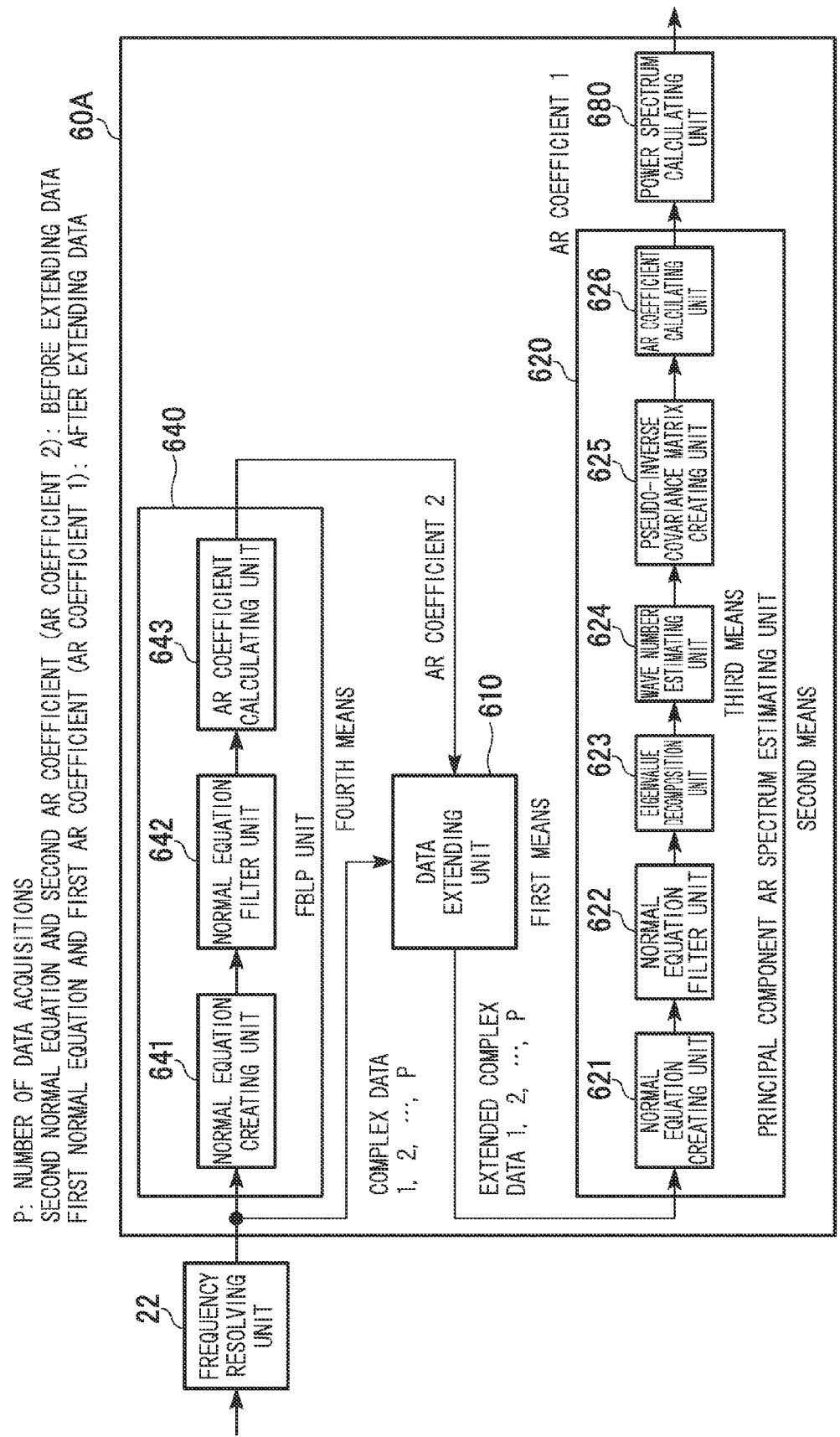
FIG. 7 is a block diagram illustrating the configuration of an azimuth detecting unit according to the first embodiment.

FIG. 7 is a block diagram illustrating the configuration of the azimuth detecting unit in the first embodiment.

The azimuth detecting unit 60A shown in FIG. 7 is an example of the azimuth detecting unit 60 shown in FIG. 1.

The azimuth detecting unit 60A includes a data extending unit 610, a principal component AR spectrum estimating unit 620, an FBLP unit 640, and a power spectrum calculating unit 680.

The data extending unit 610 generates extended complex data of which the number of data is extended from the plural pieces of complex data and the AR coefficients acquired in the present detection cycle out of detection cycles in which the process of calculating the direction of arrival of a received wave is repeatedly performed.

The plural pieces of complex data $(1, \ldots, P)$ acquired in the present detection cycle are complex data corresponding to the beat frequencies (one or both of the ascending and the descending) resolved in frequencies by the frequency resolving unit 22.

The data extending unit 610 increases the number of data based on a secondary order AR coefficient (AR coefficient 2) which can be set based on the original complex data to be extended and generates the extended complex data.

The AR coefficient 2 in the data extending unit 610 is calculated by the FBLP unit 640 to be described later.

The principal component AR spectrum estimating unit 620 (first computation processing unit) calculates the direction of arrival of a received wave based on the extended complex data. For example, the principal component AR spectrum estimating unit 620 calculates a primary order AR coefficient (AR coefficient 1) and the variance value of white noise using the solution to the normal equation (first normal equation) created from the extended complex data.

The principal component AR spectrum estimating unit 620 includes a normal equation creating unit 621, a normal equation filter unit 622, an eigenvalue decomposition unit 623, a wave number estimating unit 624, a pseudo-inverse covariance matrix calculating unit 625, and an AR coefficient calculating unit 626.

The normal equation creating unit 621 (order-increased matrix creating unit) creates plural normal equations (first normal equations) derived from the extended complex data acquired from the data extending unit 610 in the "present detection cycle". The order of the created first normal equations is the same as the order used to estimate an AR spectrum by the AR coefficient calculating unit 626.

The normal equation filter unit 622 performs an averaging process on the normal equations in the "present detection cycle" created by the normal equation creating unit 621.

The eigenvalue decomposition unit 623 performs an eigenvalue decomposition process based on a covariance matrix of the averaged normal equation in the "present detection cycle" having been subjected to the averaging process by the normal equation filter unit 622. The eigenvalue decomposition process is a process of calculating eigenvalues and eigenvectors from a characteristic equation based on the covariance matrix. The eigenvalue decomposition process can employ any solution program. Iterative type algorithms such as a Jacobi method, a Householder method, and a QR method may be employed in addition to the direct calculation of a solution to the characteristic equation.

The wave number estimating unit 624 determines an eigenvalue indicating the maximum value from the eigenvalues (and the eigenvectors) calculated through the eigenvalue decomposition process by the eigenvalue decomposition unit 623. The wave number estimating unit 624 normalizes the calculated eigenvalues based on the calculated maximum value of the eigenvalues. The wave number estimating unit 624 determines the normalized eigenvalues based on a predetermined threshold value and selects the wave number in the subsequent stage based on the determination result. The signal subspace in the subsequent stage is determined by the selected wave number.

The pseudo-inverse covariance matrix calculating unit 625 creates a pseudo-inverse covariance matrix of the signal subspace included in the subspaces from the eigenvalues and the eigenvectors calculated by the eigenvalue decomposition unit 623. By creating the pseudo-inverse covariance matrix of the signal subspace, it is possible to remove the noise component.

The AR coefficient calculating unit 626 calculates the AR coefficients derived from the pseudo-inverse covariance matrix of the signal subspace created by the pseudo-inverse covariance matrix calculating unit 625 and the variance $\sigma^2$ of the input white noise. In this manner, the AR coefficient calculating unit 626 can derive the AR coefficients based on the complex data of a detection beat frequency which is a beat frequency in which the presence of a target is detected and the variance $\sigma^2$ of the input white noise depending on the detection cycle. The AR coefficient calculating unit 626 outputs the derived AR coefficients and variance $\sigma^2$ of the input white noise to the power spectrum calculating unit 680.

The power spectrum calculating unit 680 calculates the direction of arrival of the received wave from the power spectrum derived based on the AR coefficients and the variance $\sigma^2$ of the input white noise.

The FBLP unit 640 (second computation processing unit) creates coefficients for generating the extended complex data through the use of a linear equation created based on the original complex data. For example, the FBLP unit 640 calculates the AR coefficients (coefficients) based on the normal equation (second normal equation) created from the acquired complex data.

The FBLP unit 640 includes a normal equation creating unit 641, a normal equation filter unit 642, and an AR coefficient calculating unit 643.

The normal equation creating unit 641 creates a secondary order normal equation (second normal equation) used in the AR spectrum estimation from the complex data corresponding to the beat frequencies (one or both of the ascending and the descending) into which the frequency is resolved by the frequency resolving unit 22.

The normal equation filter unit 642 performs the averaging process on the second normal equation in the "present detection cycle" created by the normal equation creating unit 641.

The AR coefficient calculating unit 643 calculates the secondary order AR coefficient (AR coefficient 2) derived from the second normal equation having been subjected to the averaging process by the normal equation filter unit 642. In this manner, the AR coefficient calculating unit 643 acquires the AR coefficients calculated based on the complex data corresponding to the beat frequencies of the received wave detected in the present detection cycle and sets the acquired AR coefficients as the coefficients for extending the data in the subsequent stage.

In this manner, the azimuth detecting unit 60A calculates the direction of arrival of the received wave based on the pseudo-inverse matrix of the signal subspace through the use of the spectrum estimating method using an autoregressive model.

In the first embodiment, the data extending unit 610 serves as a first means. The normal equation creating unit 621, the normal equation filter unit 622, the eigenvalue decomposition unit 623, the pseudo-inverse covariance matrix calculating unit 625, and the AR coefficient calculating unit 626 serve as second means. The wave number estimating unit 624 serves as third means. The FBLP unit 640 serves as fourth means.

Figure 8:
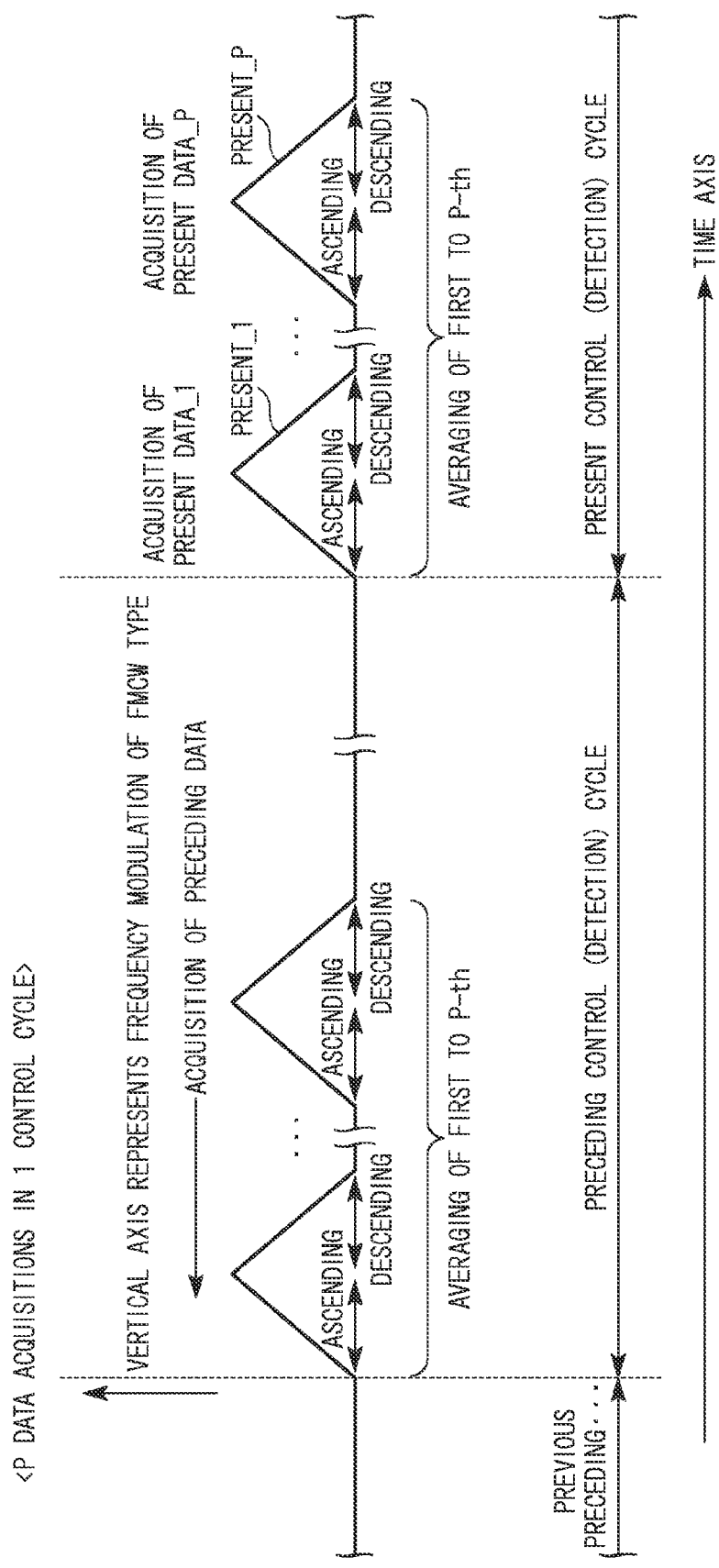
FIG. 8 is a timing diagram illustrating a data acquiring process in a detection cycle.

FIG. 8 is a timing diagram illustrating the data acquiring process in a detection cycle.

FIG. 8 shows preceding control (detection) cycles in the past previous to the present control (detection) cycle.

In each cycle, at least one time of data acquisition is performed and one time of data acquisition is indicated by a triangular waveform. The triangular waveform represents a signal modulated through the FMCW method, and ascending at the ascending time to the right hand and descending at the descending time to the right hand are detected.

The individual data acquisitions are repeatedly performed at a time interval enough to cause no interference with each other and the frequency modulation period of the triangular wave may not be constant.

P data acquisitions are performed in the present control (detection) cycle, the first data acquisition is represented by "present data_1 acquisition", and the P-th data acquisition is represented by "present data_P acquisition". The number of data acquisitions can be set to any predetermined number.

The averaging process of the normal equations is performed based on the data acquired in the same cycle (which will be described later in detail).

The control (detection) cycle in which data is presently acquired is referred to as a "present control (detection) cycle" and the control (detection) cycle in which data was acquired previous to the "present control (detection) cycle" is referred to as "preceding control (detection) cycle".

<Principle of Creating Normal Equation using AR Model>

The modified covariance method (forward and backward linear prediction method) will be described in detail below as an example of a normal equation creating process using an AR model.

A normal equation using a covariance matrix is expressed by Equations (1).

$$C_{xx} a = -c_{xx} \tag{1}$$

$$C_{xx} = \begin{bmatrix} \hat{C}x(1,1) & \hat{C}x(1,2) & \cdots & \hat{C}x(1,M) \\ \hat{C}x(2,1) & \hat{C}x(2,2) & \cdots & \hat{C}x(2,M) \\ \vdots & \vdots & \ddots & \vdots \\ \hat{C}x(M,1) & \hat{C}x(M,2) & \cdots & \hat{C}x(M,M) \end{bmatrix}$$

$$a = \begin{bmatrix} \hat{a}(1) \\ \hat{a}(2) \\ \vdots \\ \hat{a}(M) \end{bmatrix}$$

$$c_{xx} = \begin{bmatrix} Cx(1,0) \\ Cx(2,0) \\ \vdots \\ Cx(M,0) \end{bmatrix}$$

In Equations (1), the left-hand side represents the product of a covariance matrix $C_{xx}$ and an AR coefficient vector a and the right-hand side represents a right-hand vector $c_{xx}$.

Elements of the covariance matrix $C_{xx}$ are derived by the use of a relational equation of Equation (2).

$$c_x(j,k) = \frac{1}{2(N-M)}\left\{\sum_{n=M}^{N-1} x^*(n-j)x(n-k) + \sum_{n=0}^{N-1-M} x(n+j)x^*(n+k)\right\} \quad (2)$$

$$k, j = 0, 1, \ldots, M$$

In Equation (2), x(n) represents complex data and "*" represents a complex conjugate.

The elements of the right-hand vector $c_{xx}$ are derived by setting the value of k to "0" in Equation (2).

An example where a third-order process is performed using data of five channels will be described below as a specific configuration. The model order can be set to any value, but in the case of data of five channels, the third order is the maximum model order in the modified covariance method. When the number of data channels can be increased, the order applicable to the normal equations can also be increased, thereby enhancing the flexibility of the model order to be applied.

When the model order is set to 3, the covariance matrix $C_{xx}$ can be expressed by a determinant of 3 rows and 3 columns. The matrix is expressed by Expression (3).

$$\begin{bmatrix} \hat{C}_{x3}(1,1) & \hat{C}_{x3}(1,2) & \hat{C}_{x3}(1,3) \\ \hat{C}_{x3}(2,1) & \hat{C}_{x3}(2,2) & \hat{C}_{x3}(2,3) \\ \hat{C}_{x3}(3,1) & \hat{C}_{x3}(3,2) & \hat{C}_{x3}(3,3) \end{bmatrix} \quad (3)$$

In Expression (3), elements $C_{x3}(k,j)$ of the matrix represent complex numbers. x(n), that is, (x(0), x(1), x(2), x(3), and x(4)), in Equation (2) each represent complex data.

The covariance matrix $C_{xx}$ expressed by Expression (3) has the relationship expressed by Equation (4) and thus is a Hermitian matrix (complex symmetric matrix).

$$c_{x3}(k,j) = c_{x3}^*(j,k) \quad (4)$$

Similarly, the right-hand vector $c_{xx}$ used to perform the third-order process is expressed by Expression (5).

$$\begin{bmatrix} \hat{C}_{x3}(1,0) \\ \hat{C}_{x3}(2,0) \\ \hat{C}_{x3}(3,0) \end{bmatrix} \quad (5)$$

The normal equation creating unit 621 of the principal component AR spectrum estimating unit 620 and the normal equation creating unit 641 of the FBLP 640 create normal equations through the use of Equations (1) and (2).

<Principle of Linear Prediction Process (Data extension method) of Extending Detected Complex Data>

Subsequently, a data extension method of extending the detected complex data will be described with reference to FIG. 9 and FIG. 10.

The AR spectrum estimating method can enhance the detection precision by increasing the number of data (data length) and the order.

In the first embodiment, data extension is performed using a linear prediction process and the number of data is extended from the original complex data.

Figure 9:
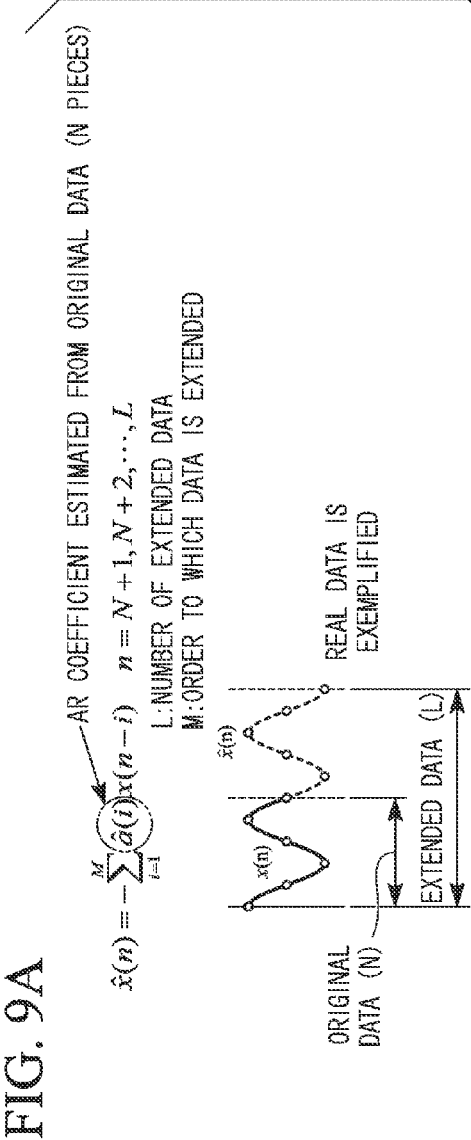
FIGS. 9A and 9B are diagrams illustrating a data extension method applied to the first embodiment.

FIG. 9 is a diagram illustrating the data extension method used in the first embodiment.

Data of the area adjacent to the area of the existing original data is extended from the existing N pieces of original data through the use of a computational equation of Equation (6).

$$\hat{x}(n) = -\sum_{i=1}^{M} \hat{a}(i)x(n-i), \quad (6)$$

$$n = N+1,$$

$$n = N+2, \ldots, L$$

In Equation (6), x-hat (n) represents data to be created (created data), a-hat (i) represents an AR coefficient, and x(n−i) represents the original data. Here, L represents the number of extended data, M represents the order to which data is extended, and n represents an integer in the range of (N+1) to L.

As shown in FIG. 9A, the data (extended data) to which the existing N pieces of original data means a case where extended data extended to L pieces of data including the existing original data is obtained. It has been reported that this data extension method is applied to the Burg method (data-extending Burg method) (see Reference Document: "Data Prediction for Burg Method", Shimamura and Suzuki, Journal of Institute of Electronics, Information and Communication Engineers, "94/8, Vol. J77-A, No. 8).

In the first embodiment, the data extension method described above is applied to the FBLP method and the principal component AR spectrum estimating method to be described later with complex data as target data.

The normal equation in the first embodiment is expressed by Equation (7).

$$A^H A g = -A^H h \quad (7)$$

In Equation (7), $A^H A$ represents a matrix and corresponds to a covariance matrix. g represents a coefficient vector and corresponds to an AR coefficient. $A^H h$ represents a vector and corresponds to a right-hand vector. $A^H$ represents a complex conjugate transposed matrix of a data matrix A. In this manner, the description of the normal equations of Equations (1) and (2) may be expressed by Equation (7).

Figure 10:
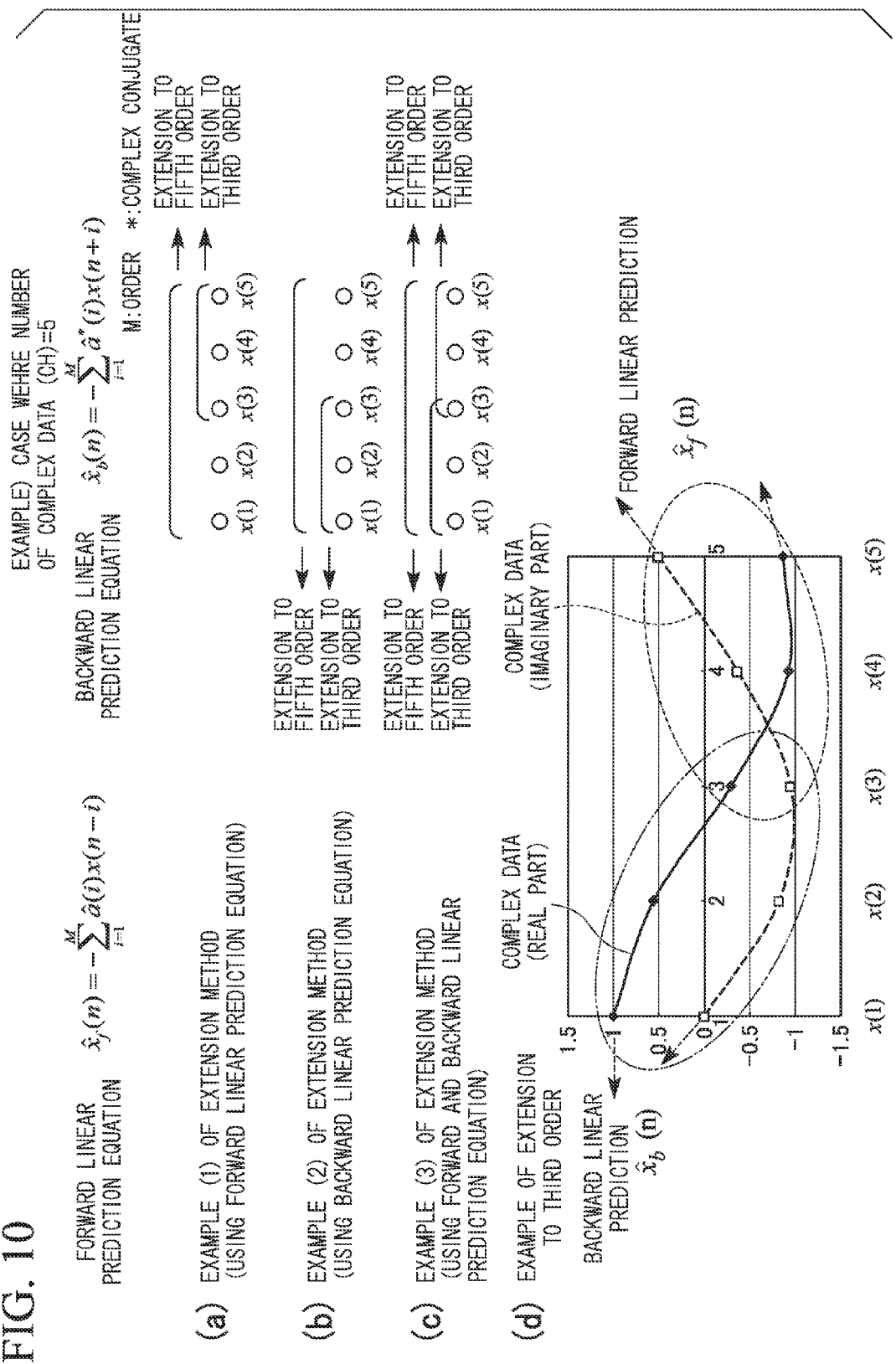
FIG. 10 is a diagram illustrating a process of extending complex data.

The data extension method in the first embodiment can be applied to the complex data as shown in FIG. 9B and can extend the data forward and backward by performing the backward linear prediction as well as the forward linear prediction as shown in FIG. 10. As the results of studies such as computation tests using a computer, it has been verified that it is possible to maintain stable estimation precision even using the method according to the first embodiment in addition to the Burg method based on real data, which is described in a reference document.

In the first embodiment, an example where the modified covariance method is used as the AR spectrum estimating method will be described below.

The process of extending complex data will be described below in more detail with reference to the drawings.

FIG. 10 is a diagram illustrating the process of extending complex data.

First, the process of extending complex data using a forward linear prediction equation is shown in part (a) of FIG. 10.

Data x(1), x(2), x(3), x(4), and x(5) shown in the drawing are complex data which are a target of the extending process (original data).

The original data is extended to continuous data thereof.

Here, the process of linearly predicting data in the direction from data x(1) to x(5) is defined as a forward process and the process in the reversed direction is defined as a backward process.

First, a computational equation (forward linear prediction equation) used to perform the forward linear prediction process is defined by Equation (8).

$$\hat{x}_f(n) = -\sum_{i=1}^{M} \hat{a}(i) x(n-i) \qquad (8)$$

In Equation (8), $x_f$-hat (n) represents data to be created (created data), a-hat (i) represents an AR coefficient, and x(n−i) represents the original data. Here, M represents the order to which data is extended.

The original data which is a target of the forward linear prediction process is any of (x(3), x(4), x(5)) when the order is 3 and (x(1), x(2), x(3), x(4), x(5)) when the order is 5.

By applying the original data of the above-mentioned groups to Equation (8), it is possible to acquire forward predicted data.

By reversing the order of data in each group and employing the computational equation used to perform the forward linear prediction process expressed by Equation (8), it may be possible to acquire backward predicted data.

Then, the process of generating complex data using a backward linear prediction equation is shown in part (b) of FIG. 10.

A computational equation (backward linear prediction equation) used to perform the backward linear prediction process using the same original data is defined by Equation (9).

$$\hat{x}_b(n) = -\sum_{i=1}^{M} \hat{a}^*(i) x(n-i) \qquad (9)$$

In Equation (9), $x_b$-hat (n) represents data to be created (created data), a*-hat (i) represents a complex conjugate of an AR coefficient, and x(n+i) represents the original data. Here, M represents the order to which data is extended.

The original data which is a target of the backward linear prediction process is any of (x(1), x(2), x(3)) when the order is 3 and (x(1), x(2), x(3), x(4), x(5)) when the order is 5.

By applying the original data of the above-mentioned groups to Equation (9), it is possible to acquire backward predicted data.

By reversing the order of data in each group and employing the computational equation used to perform the forward linear prediction process expressed by Equation (9), it may be possible to acquire forward predicted data.

A process of generating complex data using a forward linear prediction equation and a backward linear prediction equation is shown in part (c) of FIG. 10.

This process employs a computational equation used to perform the forward linear process expressed by Equation (8) and a computational equation used to perform the backward linear process expressed by Equation (9).

By employing two computational equations, it is possible to perform the forward prediction process and the backward prediction process without reversing the order of the original data.

When the data is extended to the third order, the original data which is a target of the forward linear process is (x(3), x(4), x(5)) and the original data which is a target of the backward linear process is (x(1), x(2), x(3)).

When the data is extended to the fifth order, the original data which are a target of the forward linear process and a target of the backward linear process both are (x(1), x(2), x(3), x(4), x(5)).

Part (d) of FIG. 10 shows an example where data is extended through the use of a third-order forward linear process and backward linear process.

The complex data (x(1), x(2), x(3), x(4), x(5)) including a real part and an imaginary part is expressed by two curves. The solid line represents the variation of the real part and the broken line indicates the variation of the imaginary part. As shown in part (c) of FIG. 10, two sets of three continuous pieces of data can be acquired in each of the real part and the imaginary part when performing the third-order data extending process based on the data of 5 channels. The complex data (the real part and the imaginary part) of each set are substituted into complex data x(n−1) or x(n+1) of the forward and backward linear prediction equations expressed by Equations (8) and (9).

It is possible to perform the forward data extending process and the backward data extending process by employing any one of three prediction computation processes described above.

The configuration of an M-th order normal equation based on complex data and an averaging process will be described below with reference to the accompanying drawings.

Figure 11:
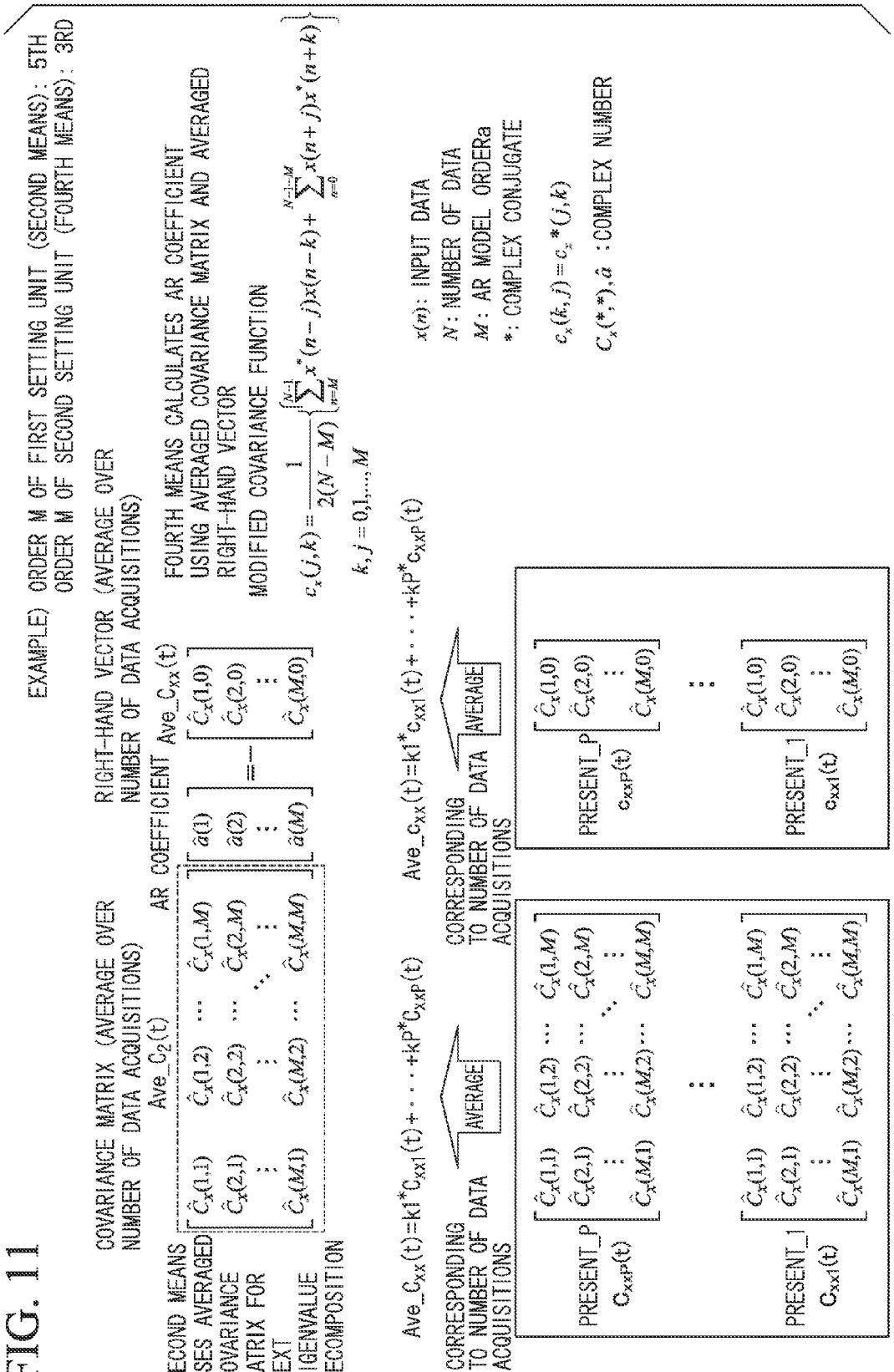
FIG. 11 is a diagram illustrating the configuration of an M-th order normal equation based on complex data and an averaging process.

FIG. 11 is a diagram illustrating the configuration of an M-th order normal equation based on complex data and an averaging process.

The M-th order normal equation shown in FIG. 11 includes a covariance matrix which is an M-th order square matrix, an AR coefficient of M rows and 1 column, and a right-hand vector of M rows and 1 column.

The principal component AR spectrum estimating unit 620 (FIG. 7) creates a first covariance matrix and a first right-hand vector based on the extended complex data. A first AR coefficient is calculated by solving a first normal equation having the first covariance matrix and the first right-hand vector as constituent parts.

The FBLP unit 640 (FIG. 7) creates a second covariance matrix and a second right-hand vector based on the acquired complex data. A second AR coefficient is calculated by solving a second normal equation having the second covariance matrix and the second right-hand vector as constituent parts.

The process of averaging the second normal equation in the FBLP unit 640 will be described below.

As shown in FIG. 8, the data acquisition are performed plural times in a single control (detection) cycle. The covariance matrix $C_{xxk}(t)$ and the right-hand vector $c_{xxk}(t)$ are created in the order in which the complex data is acquired.

In FIG. 8, the number of data acquisitions in a single control (detection) cycle is set to P.

In the order of "present_1", ..., and "present_P" corresponding to the acquisitions, the covariance matrices $C_{xxk}(t)$ are expressed as from a covariance matrix $C_{xx1}(t)$ to a covariance matrix $C_{xxP}(t)$ and the right-hand vectors $c_{xxk}(t)$ are expressed as from a right-hand vector $c_{xx1}(t)$ to a right-hand vector $c_{xxP}(t)$.

In the first embodiment, the averaging process of the normal equation to be described later is performed based on the data acquired in the same control (detection) cycle, and the averaging process is performed by averaging elements of the covariance matrices $C_{xxk}(t)$ and the right-hand vectors $c_{xxk}(t)$ from "present_1" to "present_P". A computational equation used to calculate an averaged covariance matrix Ave_$C_{xx}(t)$ is expressed by Equation (10).

$$\text{Ave\_}C_{xx}(t) = k1 * C_{xx1}(t) + k2 * C_{xx2}(t) + \ldots + kP * C_{xxP}(t) \quad (10)$$

In Equation (10), k1 to kP represent a weighting coefficient used to calculate a weighted average.

A computational equation used to calculate the averaged right-hand vector Ave_$c_{xx}(t)$ is expressed by Equation (11).

$$\text{Ave\_}c_{xx}(t) = k1 * c_{xx1}(t) + k2 * c_{xx2}(t) + \ldots + kP * c_{xxP}(t) \quad (11)$$

In Equation (11), k1 to kP represent a weighting coefficient used to calculate a weighted average.

In the averaging process of the second normal equation in the normal equation filter unit 642 of the FBLP unit 640, a second averaged covariance matrix Ave_$C_{xx}(t)$ and a second averaged right-hand vector Ave_$c_{xx}(t)$ are calculated through the above-mentioned operation.

The AR coefficient calculating unit 643 calculates a second AR coefficient from the second averaged covariance matrix Ave_$C_{xx}(t)$ and the second averaged right-hand vector Ave_$c_{xx}(t)$. The order (M) of the second normal equation is set to, for example, 3.

In the averaging process of the first normal equation in the normal equation filter unit 622 of the principal component AR spectrum estimating unit 620, a first averaged covariance matrix Ave_$C_{xx}(t)$ is calculated through the above-mentioned operation.

The eigenvalue decomposition unit 623 calculates eigenvalues and eigenvectors by performing an eigenvalue decomposition process based on the first averaged covariance matrix Ave_$C_{xx}(t)$. The order (M) of the first normal equation is set to, for example, 5.

Figure 12:
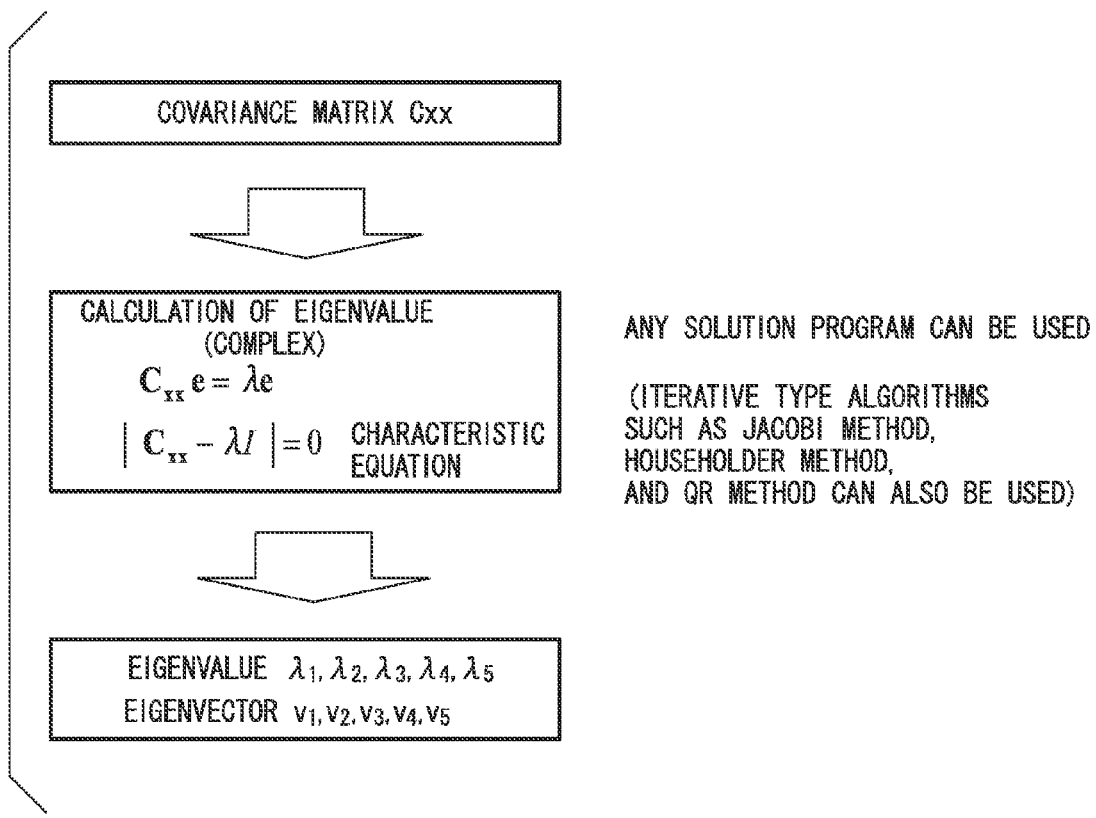
FIG. 12 is a diagram illustrating eigenvalue decompostion.

FIG. 12 is a diagram illustrating the eigenvalue decomposition.

As described in the first embodiment, when the order of the normal equation is increased to, for example, 5 in the eigenvalue decompostion, eigenvalues $\lambda_i$ ($\lambda_1$ to $\lambda_5$) and eigenvectors $v_i$ ($v_1$ to $v_5$) can be calculated through the eigenvalue decompostion by the use of the equations such as Equation (12) and Equation (13).

$$C_{xx} e = \lambda e \quad (12)$$

$$|C_{xx} - \lambda I| = 0 \quad (13)$$

In addition to the direct solving of the characteristic equation of Equation (13), any solution algorithm can be applied to the eigenvalue decompostion. Iterative calculation type algorithms such as a Jacobi method, a Householder method, and a QR method can be applied. In the eigenvalue decompostion based on a small covariance matrix as in the first embodiment, it is possible to reduce the computational load.

FIG. 13 is a diagram illustrating the computation process of calculating a principal component decopmposition AR coefficient $a_{PC}$.

A computation process of creating a pseudo-inverse covariance matrix $C_{xx}^{\#}$ of the signal subspace from the eigenvalues $\lambda_i$ and the eigenvectors $v_i$ will be described below.

A computational equation used to estimate a standard AR parameter for calculating an AR coefficient a is expressed by Equation (14).

$$\hat{a} = -\hat{C}_{xx}^{-1} \hat{c}_{xx} \quad (14)$$

As shown in Equation (14), since the AR coefficient a is calculated by calculating the inverse matrix of the covariance matrix $C_{xx}$ with respect to the right-hand vector $c_{xx}$, the precondition is that the covariance matrix $C_{xx}$ is a regular matrix (the determinant of which is not 0, that is, detCxx≠0: full rank). Here, when the noise subspace can be ideally removed from the covariance matrix $C_{xx}$ but the number of signals is smaller than the matrix order, rank deficiency occurs and thus the solution accuracy is not guaranteed.

Therefore, it is not possible to ideally remove the noise subspace by the use of the equation of the standard AR spectrum estimating method.

The inverse matrix ($C_{xx}^{-1}$) of the covariance matrix $C_{xx}$ expressed by Equation (14) can be resolved in spectra (resolution in eigenvalues) and can be expressed by Equation (15) (where it is assumed that the covariance matrix $C_{xx}$ is positive definite and regular).

$$\hat{a} = -\sum_{i=1}^{M} \frac{1}{\hat{\lambda}_i} \hat{v}_i \hat{v}_i^H \hat{c}_{xx} \quad (15)$$

In Equation (15), M represents the model order. In this manner, the AR coefficient can be resolved in the eigenvalues $\lambda_i$ and the eigenvectors $v_i$.

As shown in Equation (16), Equation (15) can conceptually divide the AR coefficient into the signal subspace of i=1 to i=P and the noise subspace of i=P+1 to i=M. In the noise subspace, most of the values of the eigenvalues are zero.

$$\hat{a} = -\left( \sum_{i=1}^{P} \frac{1}{\hat{\lambda}_i} \hat{v}_i \hat{v}_i^H + \sum_{i=p+1}^{M} \frac{1}{\hat{\lambda}_i} \hat{v}_i \hat{v}_i^H \right) \hat{c}_{xx} \quad (16)$$

In Equation (16), the first term represents the signal subspace (signal component) and the second term represents the noise subspace (noise component).

The principal component decopmposition AR coefficient $a_{PC}$ causes a result in which the term of the noise subspace is removed from Equation (16), and thus can be expressed by Equation (17).

$$\hat{a}_{PC} = -\hat{C}_{xx}^{\#} \hat{c}_{xx} = -\sum_{i=1}^{P} \frac{1}{\hat{\lambda}_i} \hat{v}_i \hat{v}_i^H \hat{c}_{xx} \quad (17)$$

In the computation process expressed by Equation (17), since the computation process is performed using the pseudo-inverse matrix $C_{xx}^{\#}$ of the signal subspace, the computation is possible even in the state where the rank is low. Accordingly, even when the signal wave number is much smaller than the model order, it is possible to enhance the AR spectrum estimation precision by setting the order of the computational equation to be great.

Equation (17) may subtract the noise subspace from the total space through the use of the computational equation expressed by Equation (18).

$$\hat{a}_{PC} = -\left(\hat{C}_{xx}^{-1} - \sum_{i=p+1}^{M} \frac{1}{\hat{\lambda}_i} \hat{v}_i \hat{v}_i^H\right) \hat{c}_{xx} \quad (18)$$

In the first embodiment, the model order is set to 5 (M=5). Accordingly, when the estimated wave number is in the range of 1 to 4, the AR coefficient from which the noise subspace is removed is obtained. When the estimated wave number is 5, the same result as in the standard AR spectrum estimation is obtained. As a result, when the number of data channels can be increased and the model order can be increased, the effect of this method becomes greater.

FIG. 14 is a diagram illustrating the computation process of calculating the variance value of white noise and the power spectrum from the principal component decopmposition AR coefficient (principal component AR coefficient) $a_{PC}$.

In the principal component AR spectrum estimating method shown in FIG. 14, the process after the AR coefficient is calculated can be basically derived from the same computation process as in the standard AR spectrum estimation.

The relational equation for deriving the variance $\sigma_v^2$ (hat) of input white noise based on the estimated AR parameter value (AR coefficient $a_{PC}$) derived by Equation (17) is expressed by Equation (19).

$$\hat{\sigma}_v^2 = \hat{c}_x(0, 0) + \sum_{k=1}^{M} \hat{a}_{pc}(k) c_x(0, k) \quad (19)$$

In the linear prediction using an AR model, the normal equation is derived under the conditions that the mean square error or the least square error of a difference (prediction error) between a predicted value and a measured value is the minimum.

By solving this normal equation through the use of general techniques, the AR coefficient is derived.

The computational equation for calculating the power spectrum $Sxx(\omega)$ based on the variance $\sigma_v^2$ (hat) of input white noise calculated through the use of Equation (19) is expressed by Equation (20).

$$Sxx(\omega) = |H_{AR}(\omega)|^2 S_{vv}(\omega) \quad (20)$$
$$= \frac{\sigma_v^2}{\left|1 + \sum_{k=1}^{M} a_{pc}(k) e^{-j\omega k}\right|^2}$$

In Equation (20), $\omega$ represents the angular velocity, $H_{AR}(\omega)$ represents the frequency characteristic in a transfer function of an AR filter at the angular velocity $\omega$, and $S_{vv}(\omega)$ represents the power spectrum of the input white noise at the angular velocity $\omega$, which can be expressed by $S_{vv}(\omega) = \sigma_v^2$. The angular velocity $\omega$ is converted into a phase difference of the received wave when it is used for the direction detection like the radar apparatus according to the first embodiment.

By using the above-mentioned computational equations, it is possible to derive a spectrum having peak characteristics matching the direction of a target.

It may be possible to estimate a power spectrum distribution by the use of the created spectra without multiplying the variance value of the input white noise. Since the power spectrum distribution (the spectrum shape) is not changed, the operation of multiplying the variance value of the input white noise may be skipped.

The flow of processes will be described with reference to FIG. 15.

Figure 15:
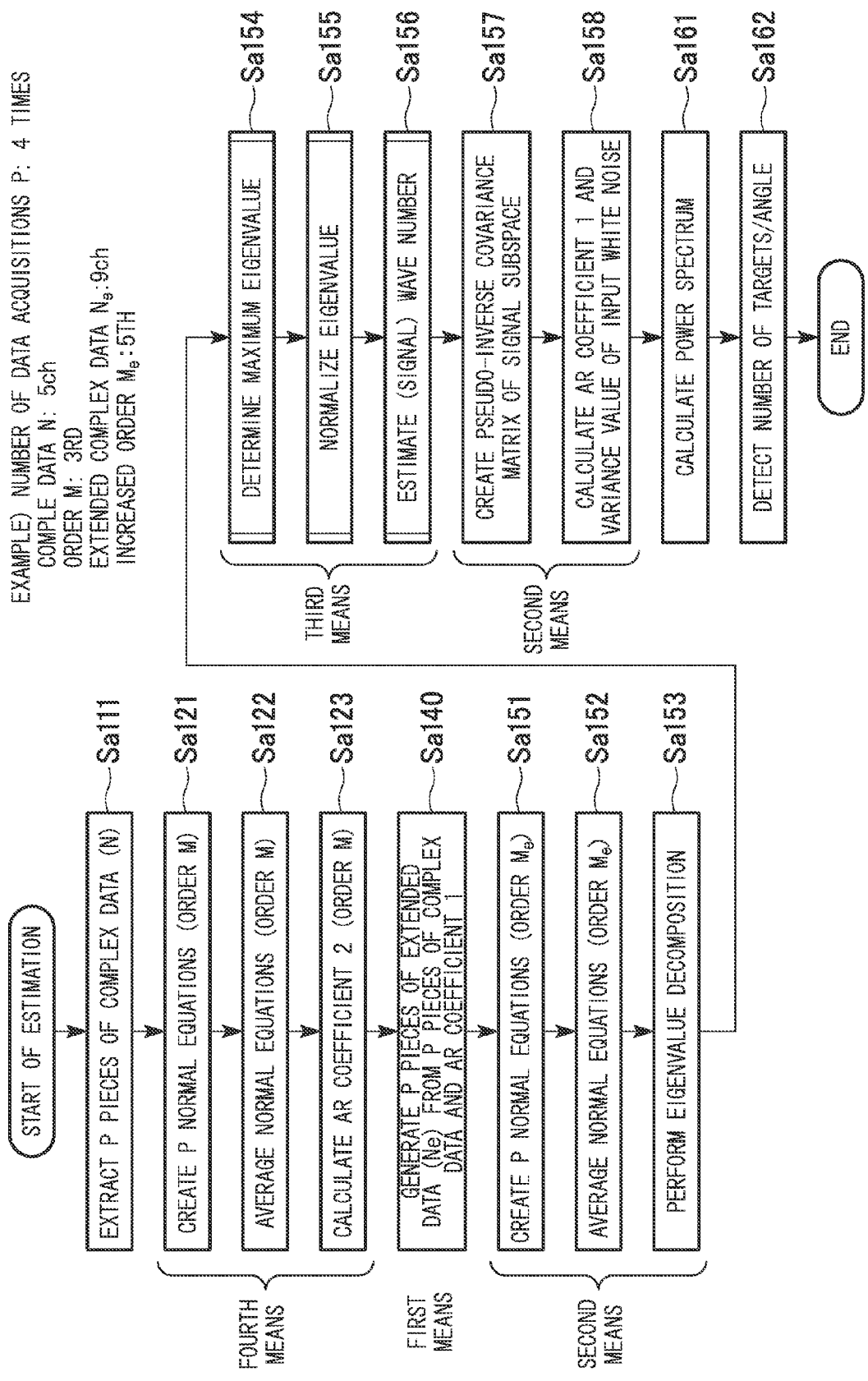
FIG. 15 is a flowchart illustrating the flow of processes in the first embodiment.

FIG. 15 is a flowchart illustrating the flow of processes in the first embodiment.

The preconditions in the flow of processes to be described below are arranged, for example, as follows.

The number of data acquisitions P which is the number of times of acquiring data in a single control cycle is set to 4. The number of channels N (the number of data) included in the complex data detected through the single data acquisition is set to 5 ch. The order M with which the complex data detected through the data acquisition is treated is set to 3. The order (increased order) $M_e$ to which data is increased through the data extension is set to 5. It is assumed that these values are preliminarily determined.

The flow of processes shown in FIG. 15 is repeatedly performed for each control cycle (see FIG. 8) and for each of plural targets selected through the detection of peaks in the entire configuration of the radar.

In step Sa111, complex data is acquired one or more times in the same control cycle for each channel (CH). P present complex data pieces can be extracted by acquiring the complex data by P times.

In accordance with the above-mentioned preconditions, the number of data acquisitions P is set to 4. That is, four complex data pieces (N) are extracted. The number of channels N (number of data) of the complex data is 5 ch.

The frequency resolving unit 22 reads beat signals based on the received wave stored in the memory 21 and frequency-transforms the beat signals for each antenna.

The acquired complex data may be processed separately in the ascending part and the descending part by individually using one or both of the ascending data and the descending data of the frequency-modulated triangular wave.

In step Sa121, the normal equation creating unit 641 creates an M-th order normal equation to be applied to an AR model for each acquisition based on the complex data acquired in the present detection cycle. Accordingly, P normal equations are created.

In step Sa122, the normal equation filter unit 642 performs an averaging process on the P normal equations created in step Sa121. That is, the normal equation filter unit 642 averages the elements of the covariance matrices and the right-hand vectors (cross-correlation vectors) of the P normal equations.

In step Sa123, the AR coefficient calculating unit 643 calculates the M-th order second AR coefficient (AR coefficient 2) from the normal equation (second averaged normal equation) having been subjected to the averaging process in step Sa122.

In step Sa140, the data extending unit 610 generates P extended complex data pieces from the P complex data pieces (corresponding to P acquisitions) acquired in the present detection cycle and the second AR coefficient (AR coefficient 2) calculated in step Sa123. In accordance with the above-mentioned preconditions, the number of channels $N_e$ (the number of data) included in the complex data pieces is 9 ch. The number of channels N (5 ch) is extended to the number of channels $N_e$ (9 ch) through the data extension in the data extending unit 610.

In step Sa151, the normal equation creating unit 621 creates (P) normal equations (first normal equations) corresponding to the number of acquisitions in step Sa111. In accordance with the above-mentioned preconditions, the order $M_e$ of the first normal equations is set to 5.

In step Sa152, the normal equation filter unit 622 averages elements of the covariance matrices and the right-hand vectors (cross-correlation vectors) of the normal equations created in step Sa151.

The covariance matrices of the modified covariance method averaged in step Sa152 is used for the eigenvalue decompostion in the subsequent step. The covariance matrix of the AR model is a Hermitian matrix (complex symmetric matrix). Accordingly, the eigenvalue decompostion is performed with the order of the AR model.

In step Sa153, the eigenvalue decomposition unit 623 performs the eigenvalue decomposition process based on the covariance matrix of the averaged normal equation in the "present detection cycle" created by the normal equation filter unit 622. The eigenvalue decomposition unit 623 calculates the eigenvalues and the eigenvectors from the characteristic equation based on the covariance matrix through the use of the eigenvalue decomposition process.

Any solution program can be used for the eigenvalue decompostion and iterative type algorithms such as a Jacobi method, a Householder method, and a QR method may be employed in addition to the direct solving of the characteristic equation.

In step Sa154, the wave number estimating unit 624 determines the eigenvalue (maximum eigenvalue) indicating the maximum value out of the eigenvalues of the covariance matrix $C_{xx}$ calculated in step Sa123.

The wave number estimating unit 624 determines whether the wave number estimation in the subsequent steps for the corresponding target group should be performed based on the determination result. The wave number estimating unit 624 stops the wave number estimating process in the subsequent steps for the corresponding target group, when it is determined through the use of the maximum eigenvalue determining process that the value of the maximum eigenvalue is smaller than a predetermined threshold value.

In step Sa155, the wave number estimating unit 624 normalizes the calculated eigenvalues based on the maximum value of the calculated eigenvalues. In the eigenvalue normalizing process, the values obtained by dividing the eigenvalues by the maximum eigenvalue are defined as normalized eigenvalues. Like a radar, when the eigenvalues (signal intensities) vary depending on the distance from a target, the values of the eigenvalues also vary. Accordingly, by normalizing the values of the eigenvalues and relatively determining the magnitude relationship between the eigenvalues, it is possible to easily estimate the wave number.

In step Sa156, the wave number estimating unit 624 determines the normalized eigenvalues based on a predetermined threshold value and selects the wave number to be used in the subsequent processes based on the determination result.

Figure 17:
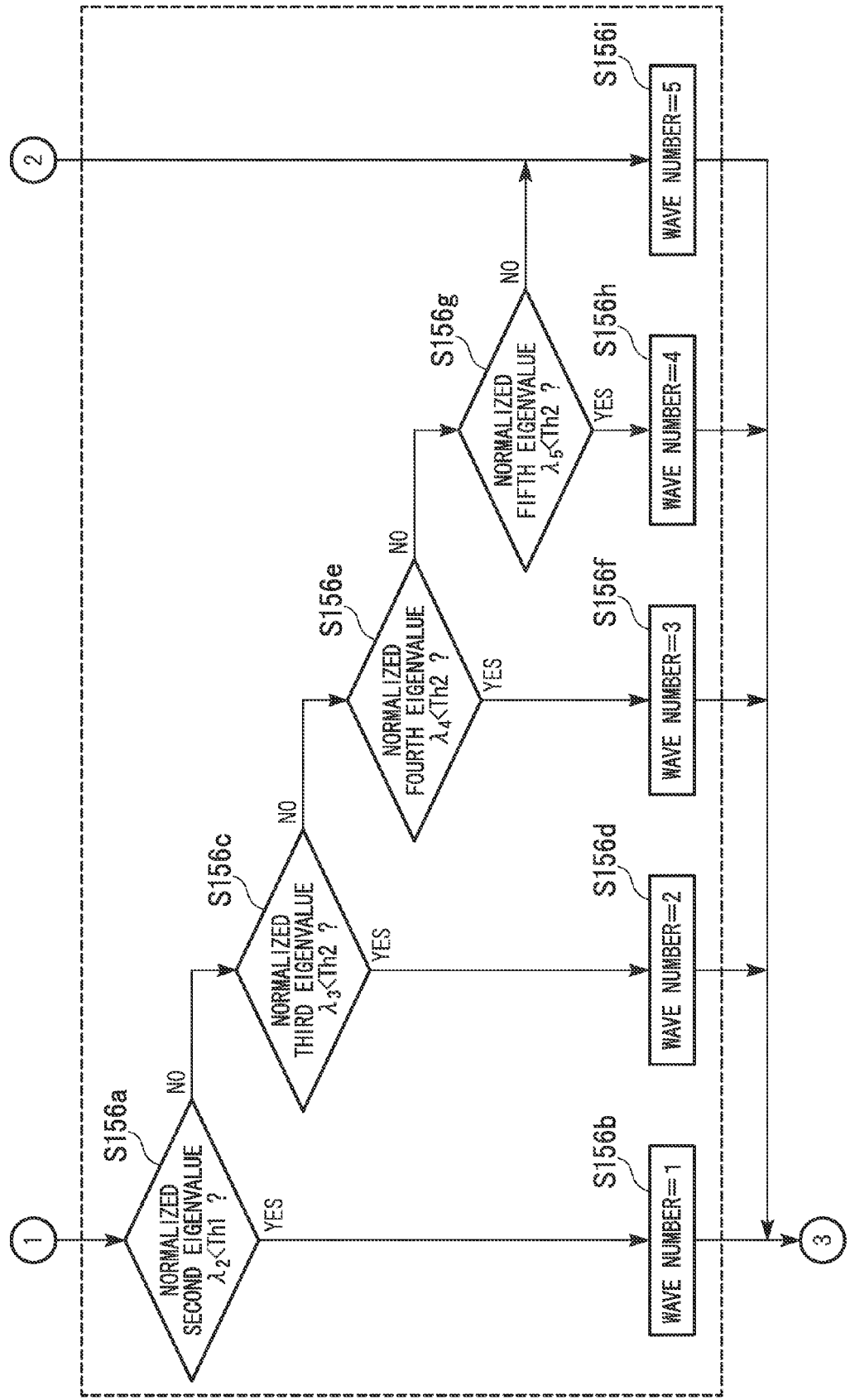
FIG. 17 is a diagram (the second half) illustrating the details of a signal wave number estimating process of step 154 to step S156 in FIG. 15.

In the wave number estimating step, four threshold values are used for the determination, as shown in FIG. 17. By setting plural threshold values In this manner, it is possible to flexibly adjust the wave number estimation result.

Figure 16:
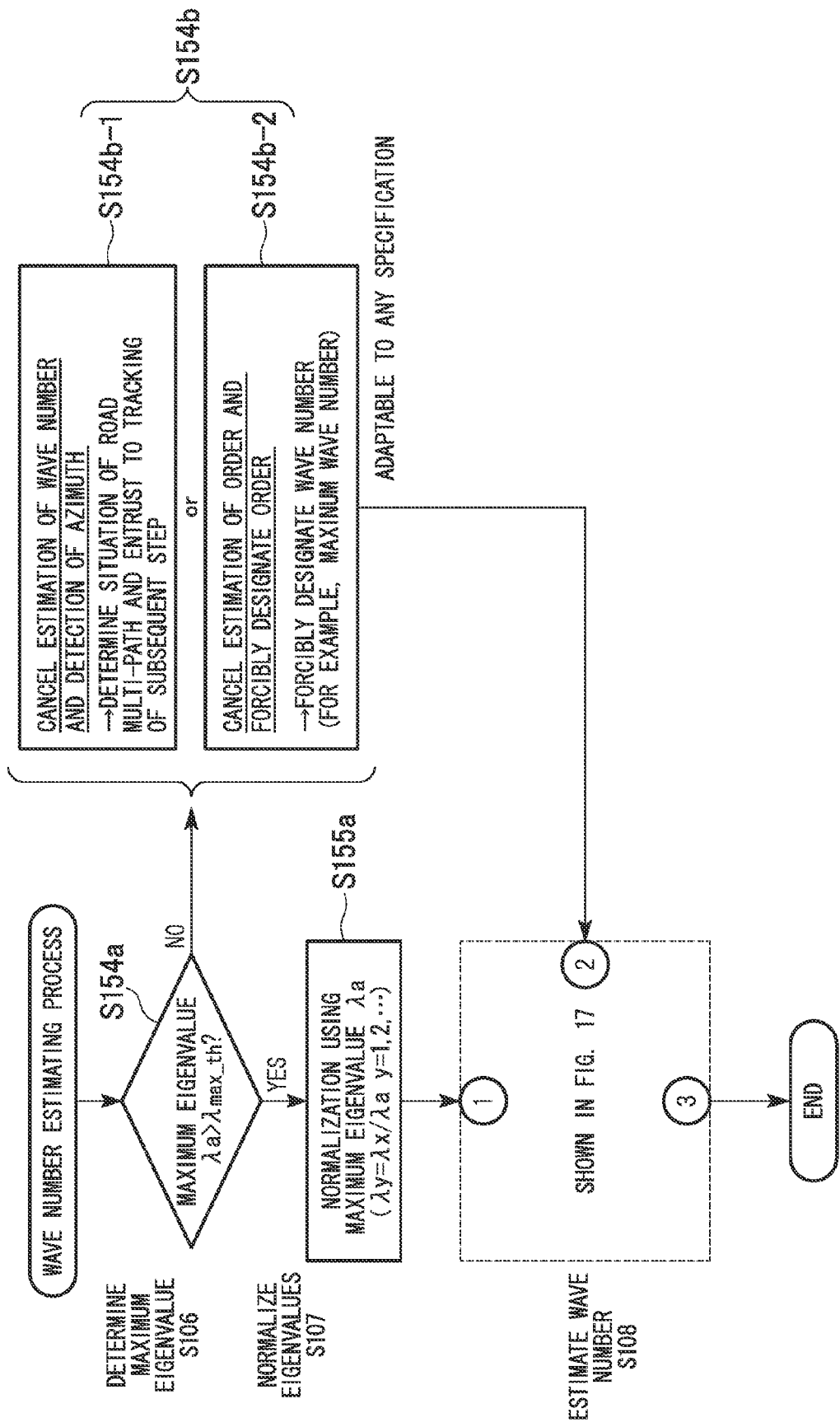
FIG. 16 is a diagram (the first half) illustrating the details of a signal wave number estimating process of step Sa154 to step Sa156 in FIG. 15.

FIGS. 16 and 17 are diagrams illustrating an example of the signal wave number estimating process of steps Sa154 to Sa156 in FIG. 15.

The process of step S154a is a process of determining the maximum eigenvalue, which corresponds to step Sa154 (FIG. 15). By determining whether the value ($\lambda$a) of the maximum eigenvalue is greater than a predetermined threshold value ($\lambda$max_th) through the process of step S154a, the wave number estimating unit 624 determines that the acquired reliability of the information (complex data) is low in step S154b and the wave number estimating process in the subsequent steps for the corresponding target, when it is determined that the value ($\lambda$a) of the maximum eigenvalue is not greater than a predetermined threshold value ($\lambda$max_th) (No in step S154a).

The maximum eigenvalue is equivalent (proportional) to the intensity of an input signal. Accordingly, even when a signal is received under a clutter such as a road multi-path specific to an on-board radar, it is possible to suppress erroneous azimuth estimation by determining the value of the maximum eigenvalue.

For example, in step S154b, both the wave number estimation and the azimuth detection can be cancelled as shown in step S154b-1. As shown in step S154b-2, the wave number estimation may be cancelled and any wave number (for example, the maximum wave number) may be forcibly designated. In this case, the process of step S156i (FIG. 17) is performed.

The wave number estimating unit 624 performs the process of step S155a when it is determined in step S154a that the value of the maximum eigenvalue is greater than the predetermined threshold value (Yes in step S154a). In step S155a, the wave number estimating unit 624 performs the eigenvalue normalizing process corresponding to step S154a and sets the value obtained by dividing the eigenvalues $\lambda$x by the maximum eigenvalue $\lambda$a as the normalized eigenvalues $\lambda$y.

The processes of steps S156a to S156i in FIG. 17 are the wave number estimating process corresponding to step Sa156 (FIG. 15) performed by the wave number estimating unit 624.

In step S156a, the second largest eigenvalue (normalized second eigenvalue $\lambda_2$) is selected out of the eigenvalues normalized in step Sa155 (FIG. 15) and it is determined whether the normalized second eigenvalue $\lambda_2$ is smaller than a predetermined threshold value Th1.

When it is determined in step S156a that the normalized second eigenvalue $\lambda_2$ is not smaller than the predetermined threshold value Th1 (No in step S156a), the process of step S156c is performed.

When it is determined in step S156a that the normalized second eigenvalue $\lambda_2$ is smaller than the predetermined threshold value Th1 (Yes in step S156a), the estimated wave number is set to 1 and is stored in a storage area (not shown) for storing estimated wave number information in step S156b, and the wave number estimating process is ended.

In step S156c, the third largest eigenvalue (normalized third eigenvalue $\lambda_3$) is selected out of the eigenvalues normalized in step Sa155 and it is determined whether the normalized third eigenvalue $\lambda_3$ is smaller than a predetermined threshold value Th2. When it is determined that the normalized third eigenvalue $\lambda_3$ is not smaller than the predetermined threshold value Th2 (No in step S156c), the process of step S156e is performed.

When it is determined in step S156c that the normalized third eigenvalue $\lambda_3$ is smaller than the predetermined threshold value Th2 (Yes in step S156c), the estimated wave number is set to 2 and is stored in a storage area (not shown) for storing estimated wave number information in step S156d, and the wave number estimating process is ended.

In step S156e, the fourth largest eigenvalue (normalized fourth eigenvalue $\lambda_4$) is selected out of the eigenvalues normalized in step Sa155 and it is determined whether the normalized fourth eigenvalue $\lambda_4$ is smaller than a predetermined threshold value Th3. When it is determined that the normalized fourth eigenvalue $\lambda_4$ is not smaller than the predetermined threshold value Th3 (No in step S156e), the process of step S156g is performed.

When it is determined in step S156e that the normalized fourth eigenvalue $\lambda_4$ is smaller than the predetermined threshold value Th3 (Yes in step S156e), the estimated wave number is set to 3 and is stored in a storage area (not shown) for storing estimated wave number information in step S156f, and the wave number estimating process is ended.

In step S156g, the fifth largest eigenvalue (normalized fifth eigenvalue $\lambda_5$) is selected out of the eigenvalues normalized in step Sa155 and it is determined whether the normalized fifth eigenvalue $\lambda_5$ is smaller than a predetermined threshold value Th4. When it is determined that the normalized fifth eigenvalue $\lambda_5$ is not smaller than the predetermined threshold value Th4 (No in step S156g), the process of step S156i is performed.

When it is determined in step S156g that the normalized fifth eigenvalue $\lambda_5$ is smaller than the predetermined threshold value Th4 (Yes in step S156g), the estimated wave number is set to 4 and is stored in a storage area (not shown) for storing estimated wave number information in step S156h, and the wave number estimating process is ended.

When it is determined in step S156g that the normalized fifth eigenvalue $\lambda_5$ is not smaller than the predetermined threshold value Th4 (No in step S156g), the estimated wave number is set to 5 and is stored in a storage area (not shown) for storing estimated wave number information in step S156i, and the wave number estimating process is ended.

In this manner, the determination threshold values in the wave number estimating process of steps S156a to S156i include four values of the threshold value Th1 for distinguishing the wave number of 1 from the wave number of 2 or more, the threshold value Th2 for distinguishing the wave number of 2 from the wave number of 3 or more, the threshold value Th3 for distinguishing the wave number of 3 from the wave number of 4 or more, and the threshold value Th4 for distinguishing the wave number of 4 from the wave number of 5.

Referring to FIG. 15 again, in step Sa157, the pseudo-inverse covariance matrix creating unit 625 performs a process of creating the pseudo-inverse covariance matrix of the signal subspace in the present detection cycle based on the wave number estimated by the wave number estimating unit 624 in step Sa156.

The pseudo-inverse covariance matrix creating unit 625 creates a pseudo-inverse covariance matrix through the use of the above-mentioned computational equation based on the eigenvalues and the eigenvectors calculated by the eigenvalue decomposition unit 623 in step Sa153.

In step Sa158, the AR coefficient calculating unit 626 calculates the AR coefficient and the variance value of the input white noise based on the eigenvalues and the eigenvectors calculated in step Sa153.

In step Sa161, the power spectrum calculating unit 680 calculates a power spectrum based on the AR coefficient and the variance of the input white noise which are calculated in step Sa158.

In step Sa162, the power spectrum calculating unit 680 detects the number of targets and the angles indicating the directions of the targets based on the calculated power spectrum.

Through the above-mentioned sequence of processes, the electronic scanning radar apparatus can detect an azimuth with enhanced detection precision.

The data extending process described in the first embodiment can be applied to all the spectrum estimating methods such as the standard AR spectrum estimating method and the MUSIC method from the DBF (Digital Beam Forming), in addition to the principal component AR spectrum estimating method as the second means. An example where the MUSIC method is employed as the second means is shown in FIG. 7. The details of the processes in the blocks are referred to Patent Document 2.

Figure 18:
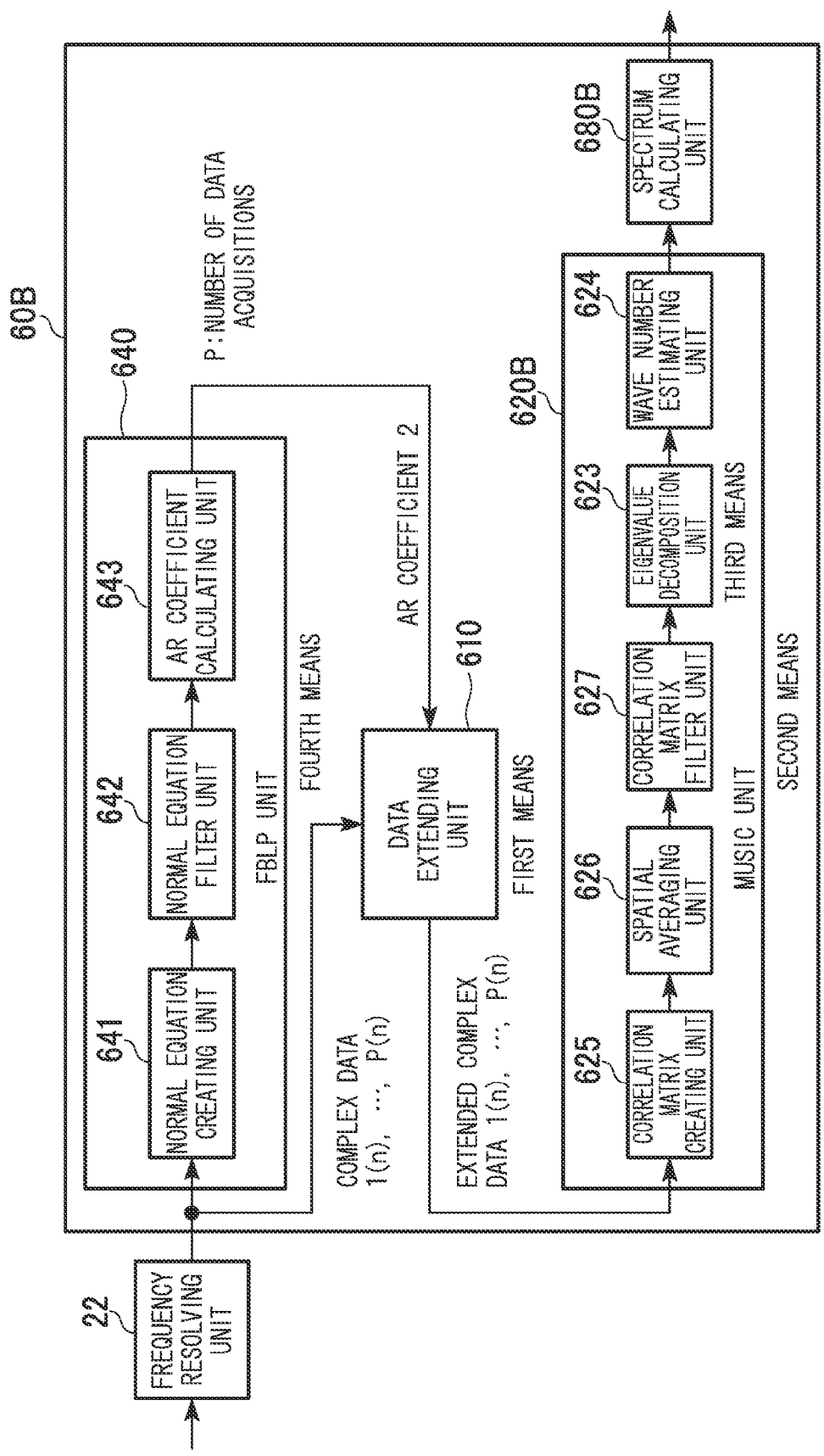
FIG. 18 is a block diagram illustrating the configuration when a MUSIC method is applied to the azimuth detecting unit according to the first embodiment.

FIG. 18 is a block diagram illustrating the configuration of an example where the azimuth detecting unit in the first embodiment employs the MUSIC method.

The azimuth detecting unit 60B shown in FIG. 18 is an example of the azimuth detecting unit 60 shown in FIG. 1.

The same elements as shown in FIG. 1 are referenced by the same reference numerals.

The azimuth detecting unit 60B includes a data extending unit 610, a MUSIC unit 620B, an FBLP unit 640, and a spectrum calculating unit 680B.

The MUSIC unit 620B (first computation processing unit) calculates eigenvalues and eigenvectors from the correlation matrix created based on the extended complex data and calculates an estimated wave number.

The MUSIC unit 620B includes a correlation matrix creating unit 625, a spatial averaging unit 626, a correlation filter unit 627, an eigenvalue decomposition unit 623, and a wave number estimating unit 624.

The correlation matrix creating unit 625 creates a correlation matrix for each piece of extended complex data to which data is extended. The created correlation matrix is a Hermitian matrix with a size of (number of data pieces×number of data pieces) and the order of the matrix is also increased with an increase in the number of data pieces. When the correlation matrix is created with a larger order, the number of eigenvectors of the noise subspace calculated through the eigenvalue decomposition process in the subsequent step can be increased, thereby improving the detection precision based on the MUSIC method. That is, in the spectrum estimation based on the MUSIC method, a combined vector in which the eigenvectors of the noise subspace of the acquired subspaces is calculated and the signal included in the signal subspace is detected based on the orthogonality between the combined vector and a mode vector. By increasing the precision of the noise subspace due to the combination with the increase in the number of eigenvectors of the noise subspace, it is possible to improve the detection precision of a signal.

The spatial averaging unit 626 performs a spatial averaging process for each created correlation matrix to suppress the cross-correlation of the signal components in the correlation matrix. The received signal (wave) in the electronic scanning radar apparatus has a cross-correlation property. Since the effect of suppressing the cross-correlation property can be enhanced by performing the averaging process, it is preferable from the viewpoint of performance that an averaging process of spatially averaging values be performed. This averaging process is classified into a forward spatial averaging process, a backward spatial averaging process, and a forward and backward spatial averaging process depending on the range of the computation process. Since the averaging process in the spatial averaging unit 626 uses a range divided into subarrays as the target range of the averaging process, the order is smaller than that of the original correlation matrix.

On the other hand, in the first embodiment, the order of the original correlation matrix is increased in advance by causing the data extending unit 610 to extend the data. Accordingly, the order after the spatial averaging process is higher than the order when the data is not extended. By increasing the number of subarrays as the order of the original correlation matrix is increased, it is possible to enhance the suppression effect based on the spatial averaging. In this case, the order of the matrix is lowered.

The correlation matrix filter unit 627 (matrix filter unit) further averages the spatially-averaged matrix in the time axis direction. In the process in the correlation matrix filter unit 627, the same effects as in the normal equation filter unit 622 in the AR spectrum estimating method. The process of causing the correlation matrix filter unit 627 to perform the averaging process in the time axis direction may be performed on the original correlation matrix before causing the spatial averaging unit 626 to perform the spatial averaging, or may be performed after the conversion into a real correlation matrix through a unitary transform to be described later.

The eigenvalue decomposition unit 623 calculates all the eigenvalues and the eigenvectors, similarly to the technique described in the principal component AR spectrum estimating method (see Patent Documents 2 and 3).

Before the calculation in the eigenvalue decompostion, the correlation matrix created based on the complex data may be converted into a real correlation matrix through the unitary transform. In this manner, by conversion into the real correlation matrix, it is possible to reduce the load of the eigenvalue decomposition process.

The wave number estimating unit 624 estimates a wave number, similarly to the technique described in the principal component AR spectrum estimating method (see Patent Document 3).

The spectrum calculating unit 680B performs an inner product operation of a combined eigenvector of the noise subspace into which the calculated eigenvectors are combined and the mode vector having the azimuth angle θ as a variable and calculates a MUSIC spectrum.

The precision (resolution, angle) of the MUSIC spectrum is improved by extending the data.

As described hitherto, when another spectrum estimating method other than the AR spectrum estimating method which is known as a high-resolution algorithm is used, it is possible to improve the detection precision by extending data based on the original complex data.

In second, third, and fourth embodiments to be described below, a spectrum estimating method other than the AR spectrum estimating method may be used, similarly to the first embodiment, and the AR spectrum estimating method will be representatively described below.

Second Embodiment

An electronic scanning radar apparatus according to a second embodiment of the invention will be described with reference to the accompanying drawings.

Figures 19, 20:
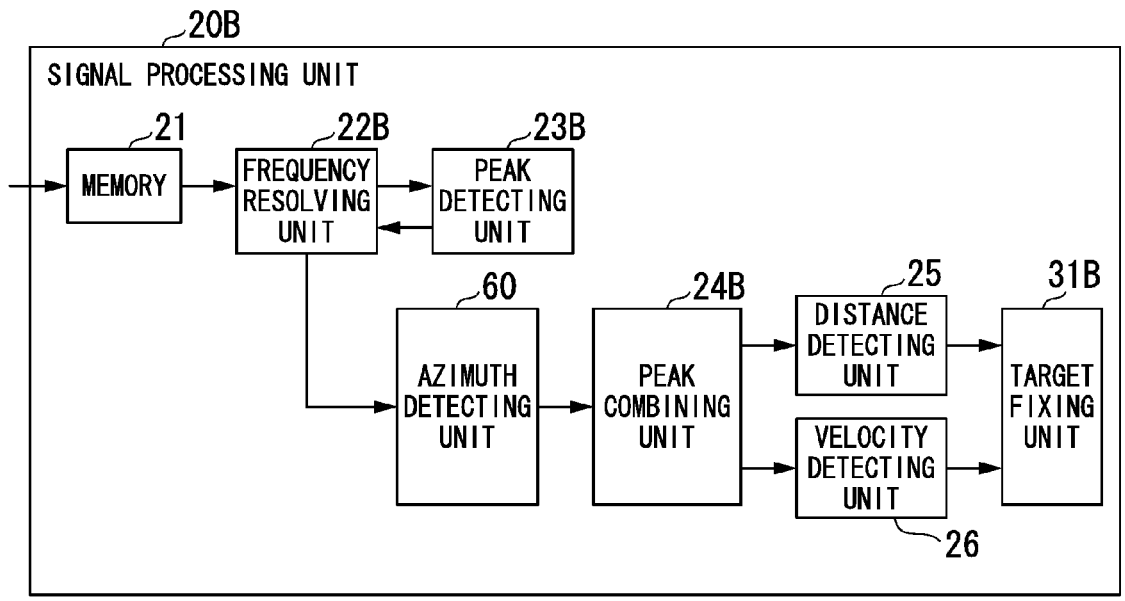
FIG. 19 is a block diagram illustrating the configuration of an azimuth detecting unit according to a second embodiment of the invention.
FIG. 20 is a diagram illustrating a table used to combine peaks in the ascending region and the descending region.

FIG. 19 is a block diagram illustrating the configuration of the electronic scanning radar apparatus according to the second embodiment.

A signal processing unit 20B in the second embodiment estimates an azimuth through the use of a high-resolution algorithm, similarly to the first embodiment. The same constituents as in the first embodiment shown in FIG. 1 will be referenced by the same reference numerals and differences from the first embodiment will be described below.

A frequency resolving unit 22B of the signal processing unit 20B converts beat signals of the ascending region and the descending region for each antenna into complex data and outputs frequency points indicating the beat frequencies and the complex data to a peak detecting unit 23B.

The peak detecting unit 23B detects the peak values of the ascending region and the descending region and the frequency points at which the peak values are present, and outputs the frequency points to the frequency resolving unit 22B.

The frequency resolving unit 22B outputs the corresponding complex data for each of the ascending region and the descending region to the azimuth detecting unit 60.

The complex data is the target group (the beat frequencies having a peak in the ascending region and the descending region) of each of the ascending region and the descending region.

The azimuth detecting unit 60 performs the same process as in the first embodiment based on the supplied complex data.

Here, the peak detecting unit 23B can perform the same function as the maximum eigenvalue determining process (step S155a) in the model order estimating process in the azimuth detecting unit and thus may be deleted.

The azimuth detecting unit 60 detects the angles θ of the AR coefficient in the ascending region and the AR coefficient in the descending region and outputs the detected angles as the table shown in FIG. 20 to a peak combining unit 24B.

FIG. 20 is a diagram illustrating a table used to combine the peaks of the ascending region and the descending region.

The peak combining unit 24B combines the peaks having the same angle based on the information of the table shown in FIG. 20 and outputs the combination of beat frequencies of the ascending region and the descending region to the distance detecting unit 25 and the velocity detecting unit 26.

The distance detecting unit 25 calculates the distance based on the combination of beat frequencies of the ascending region and the descending region, similarly to the first embodiment.

The velocity detecting unit 26 calculates the relative velocity based on the combination of beat frequencies of the ascending region and the descending region, similarly to the first embodiment.

Here, the distance detecting unit 25 and the velocity detecting unit 26 calculate the values of the distance and the relative velocity based on the combination of beat frequencies of the ascending region and the descending region.

A target fixing unit 31B determines a pair of peaks of the ascending region and the descending region and fixes a target.

Through the above-mentioned sequence of processes, the electronic scanning radar apparatus can detect an azimuth with enhanced detection precision.

Third Embodiment

An electronic scanning radar apparatus according to a third embodiment of the invention will be described below with reference to the accompanying drawings.

Figures 21, 22:
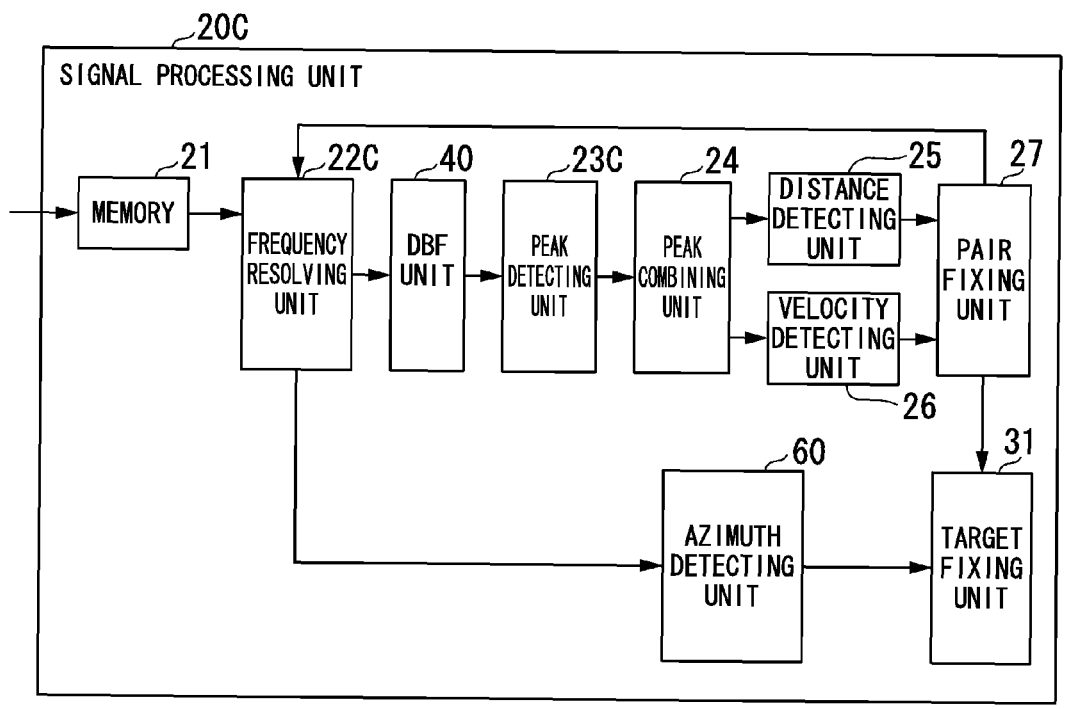
FIG. 21 is a block diagram illustrating the configuration of an electronic scanning radar apparatus according to a third embodiment of the invention.
FIG. 22 is a table in which pairs of peaks in the ascending region and the descending region are fixed.

FIG. 21 is a block diagram illustrating the configuration of an electronic scanning radar apparatus according to the third embodiment.

A signal processing unit 20C in the third embodiment has the configuration in which the azimuth estimation is performed first using the DBF (Digital Beam Forming) process with a resolution lower than that of the high-resolution algorithm such as an AR spectrum estimating process and the azimuth estimation is then performed using the high-resolution algorithm based on the AR spectrum estimating process using an AR coefficient, unlike the first embodiment. The same constituents as in the first embodiment shown in FIG. 1 will be referenced by the same reference numerals and differences from the first embodiment will be described below.

As shown in the drawing, this embodiment is different from the first embodiment, in that a DBF unit 40 is disposed between a frequency resolving unit 22C and a peak detecting unit 23C in the first embodiment shown in FIG. 1 and the azimuth in which a received wave arrives is detected first using the DBF as described above.

The frequency resolving unit 22C frequency-transforms sampled data of the beat signals stored in the memory 21 in the ascending part (ascending) and the descending part (descending) of a triangular wave at discrete times through the use of the frequency resolution. That is, the frequency resolving unit 22C resolves the beat signals in frequencies having a predetermined frequency bandwidth, calculates complex data based on the beat signals resolved for each beat frequency, and outputs the calculated complex data to the DBF unit 40.

The DBF unit 40 Fourier-transforms the input complex data corresponding to the antennas in the arrangement direction of the antennas, that is, performs a spatial-axis Fourier transform.

The DBF unit 40 calculates spatial complex data depending on the angle, that is, for each angular channel corresponding to the angular resolution, and outputs the calculated spatial complex data to the peak detecting unit 23C for each beat frequency.

Accordingly, a spectrum indicated by the spatial complex data (in the units of beat frequencies) for each angular channel output from the DBF unit 40 depends on the estimation of a direction of arrival of a received wave based on the beam scanning resolution.

Since the complex data is Fourier-transformed in the arrangement direction of the antennas, the same effect as adding the complex data of the angular channels can be obtained and the complex data for each angular channel is improved in the S/N ratio. Accordingly, it is possible to enhance the precision in detection of a peak value, similarly to the first embodiment.

Similarly to the first embodiment, the complex data and the spatial complex data are both calculated from both the ascending region and the descending region of a triangular wave.

The peak detecting unit 23C detects the peak for each angular channel based on the DBF result and outputs the detected peak values of the channels to the next-stage peak combining unit 24 for each angular channel, after the process in the DBF unit 40 is performed. That is, in the case of the spatial axis Fourier transform with a resolution of 16, the number of angular channels is 15.

Similarly to the first embodiment, the peak combining unit 24 combines the beat frequencies having a peak value in the ascending region and the descending region and the peak values and outputs the combinations to the distance detecting unit 25 and the velocity detecting unit 26 for each angular channel.

The pair fixing unit 27 generates the table shown in FIG. 5 for each angular channel based on the distance r and the relative velocity v sequentially input from the distance detecting unit 25 and the velocity detecting unit 26, and determines the appropriate combination of peaks in the ascending region and the descending region corresponding to each target for each angular channel, similarly to the first embodiment. Here, since the presence of a target appears over plural angular channels with the resolution of the DBF, it is possible to appropriately combine the peaks of the ascending region and the descending region for each angular channel in consideration of the coincidence with adjacent angular channels (matrices).

The pair fixing unit fixes the pair of peaks of the ascending region and the descending region, generates a target group number indicating the fixed distance r and the fixed relative velocity v, and generates the table shown in FIG. 22.

FIG. 22 is a diagram illustrating a table in which the pair of peaks of the ascending region and the descending region is fixed.

Since the information on the angular channels of each target is obtained in addition to the distance r and the relative velocity v and the longitudinal position and the lateral position of the target can be acquired, the pair fixing unit 27 generates the table shown in FIG. 22 in which the longitudinal position and the lateral position included in the table shown in FIG. 6 and the results corresponding to the target groups in the present detection cycle are included. The pair fixing unit sends the frequency points of which the pair is fixed to the frequency resolving unit 22C and determines the complex data to be sent to the azimuth detecting unit 60.

The DBF unit 40 in the third embodiment detects the presence and the azimuth of a target through the use of the digital beam forming (DBF) which enhances the receiving sensitivity in a desired direction in which a received wave is received based on the complex data. The azimuth detecting unit 60 detects the azimuth of a target using the AR spectrum estimating process as a high-resolution algorithm.

Accordingly, by performing the azimuth detection based on the DBF which is low in resolution but exhibits a stable spectrum before the azimuth detecting unit 60 detects the azimuth with high precision, it is possible to enhance the estimation precision.

By estimating the azimuth through the use of a logical product (AND logic) based on the azimuth information from the azimuth detecting unit 60 and the azimuth information from the DBF unit 40, it is possible to improve the reliability of the direction detection, or to share the azimuth information each other, or to utilize the angular information of the DBF, for example, because the angular resolution may be low within a short range.

Fourth Embodiment

A fourth embodiment of the invention is an example of the configuration of the electronic scanning radar apparatus shown in FIG. 1.

Figure 23:
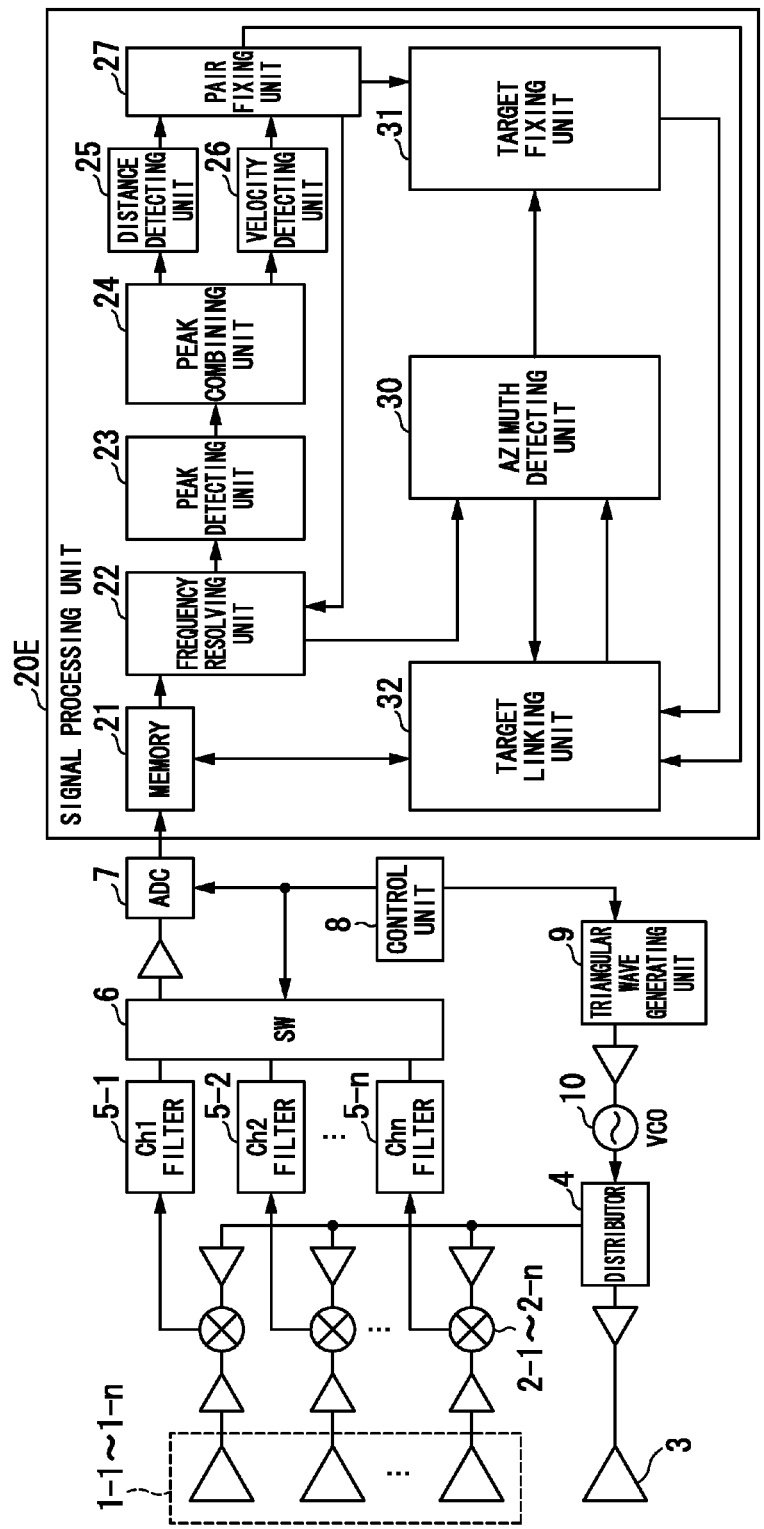
FIG. 23 is a block diagram illustrating the configuration of an electronic scanning radar apparatus according to a fourth embodiment of the invention.

FIG. 23 is a block diagram illustrating the configuration of an electronic scanning radar apparatus according to the fourth embodiment.

The electronic scanning radar apparatus shown in FIG. 23 includes a signal processing unit 20E instead of the signal processing unit 20A shown in FIG. 1. The same constituents as shown in FIG. 1 are referenced by the same reference numerals.

The signal processing unit 20E includes a memory 21, a frequency resolving unit 22, a peak detecting unit 23, a peak combining unit 24, a distance detecting unit 25, a velocity detecting unit 26, a pair fixing unit 27, an azimuth detecting unit 30, a target fixing unit 31, and a target linking unit 32.

The target fixing unit 31 correlates the distance r, the relative velocity v, and the frequency point shown in FIG. 6 and input from the pair fixing unit 27 with the azimuth of a target detected by the azimuth detecting unit 30 and outputs the correlation result to the target linking unit 32.

The target linking unit 32 links the targets in the preceding detection cycles stored in the memory 21 and outputs the complex data recorded in the preceding detection cycles (FIG. 25) to the azimuth detecting unit 30 for each target.

The target linking unit 32 gives identification information of the distance, the relative velocity, and the azimuth output from the target fixing unit 31 to the complex data acquired in the present detection cycle (FIG. 25) and records the resultant information in the memory 21.

The azimuth detecting unit 30 performs a spectrum estimating process using the AR spectrum estimating process as a high-resolution algorithm, detects the azimuth of the corresponding target based on the result of the spectrum estimating process, and outputs the detected azimuth to the target fixing unit 31.

The azimuth detecting unit 30 generates extended complex data in which the number of data pieces is extended based on the plural pieces of complex data acquired in the present detection cycle and the preceding detection cycle as the complex data calculated based on the beat signals. The azimuth detecting unit 30 estimates the wave number of a received wave based on the eigenvalues of a matrix which is a constituent part of a normal equation having the extended complex data as elements. The azimuth detecting unit 30 calculates an AR coefficient by a solution to a normal equation based on a pseudo-inverse matrix of a signal subspace created based on the eigenvalues and the eigenvectors corresponding to the estimated wave number, and calculates the direction of arrival of the received wave based on the calculated AR coefficient.

The azimuth detecting unit 30 generates the extended complex data based on the complex data acquired in the present detection cycle and the preceding detection cycle and the AR coefficient.

The configuration in which the AR spectrum estimating method known as a high-resolution algorithm is used in the spectrum estimating process will be described in more detail below.

Figure 24:
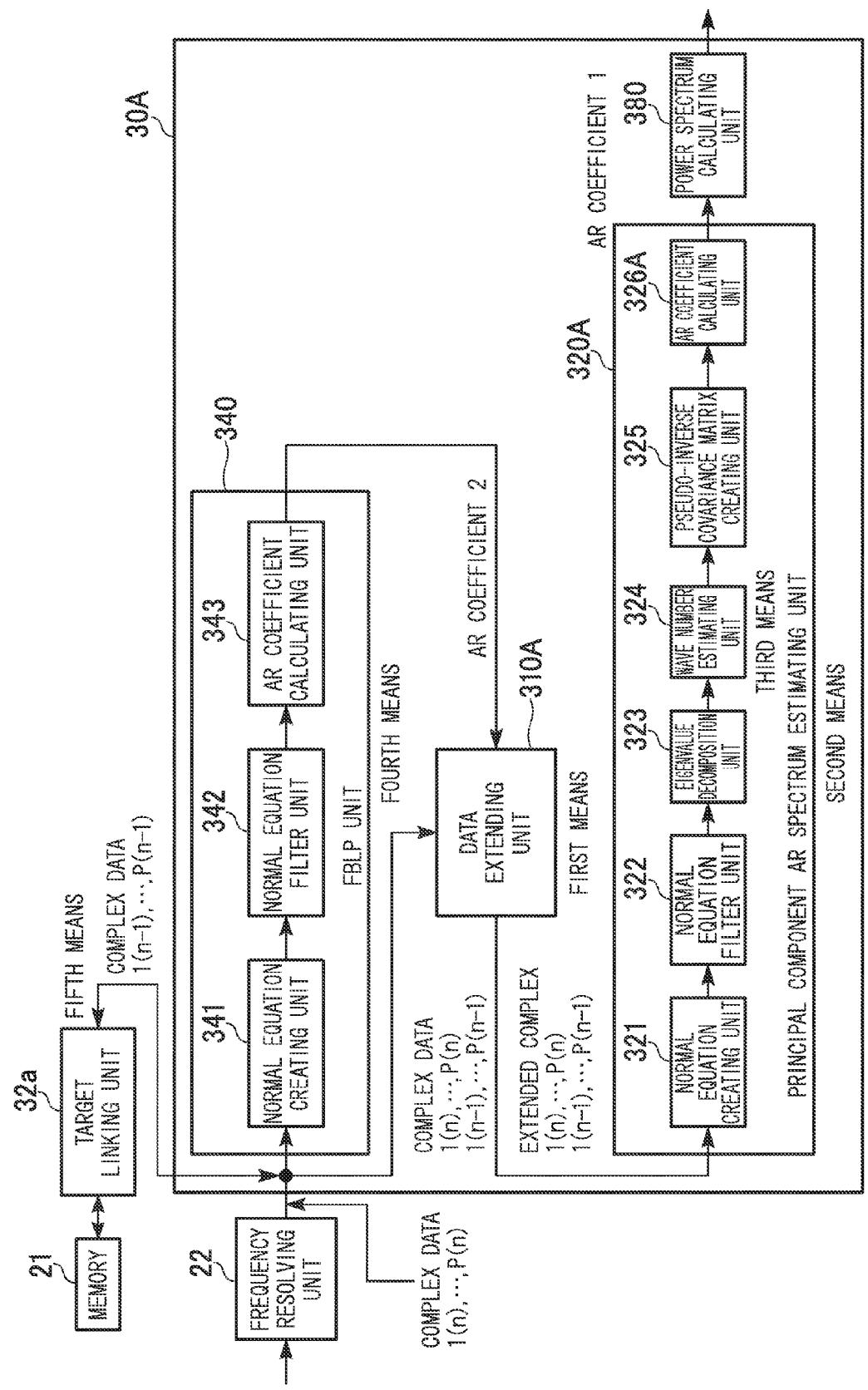
FIG. 24 is a block diagram illustrating the configuration of an azimuth detecting unit according to the fourth embodiment.

FIG. 24 is a block diagram illustrating the configuration of the azimuth detecting unit according to the fourth embodiment.

The azimuth detecting unit 30A shown in FIG. 24 is an example of the azimuth detecting unit 30 shown in FIG. 23.

The azimuth detecting unit 30A includes a data extending unit 310A, a principal component AR spectrum estimating unit 320, an FBLP unit 340, and a power spectrum calculating unit 380.

The data extending unit 310A generates extended complex data in which the number of data is extended from plural pieces of complex data and AR coefficients which are acquired in a predetermined number of detection cycles including the present detection cycle out of the detection cycles in which the process of calculating the direction of arrival of a received wave is repeatedly performed.

The plural pieces of complex data (1(n), ..., P(n)) acquired in the present detection cycle are complex data corresponding to the beat frequencies (one or both of the ascending and the descending) resolved by the frequency resolving unit 22.

The data extending unit 310A generates the extended complex data by increasing the number of data by the use of a secondary order AR coefficient (AR coefficient 2) which can be set based on the original complex data to be extended.

The data extending unit 310A acquires the complex data (1(n), ..., P(n)) of the present detection cycle from the frequency resolving unit 22 and generates the extended complex data (1(n), ..., P(n)). The data extending unit 310A further acquires the complex data (1(n−1), ..., P(n−1)) of a preceding detection cycle stored in the memory 21 through the use of the target linking unit 32a. The data extending unit 310A acquires the complex data (1(n−1), ..., P(n−1)) of the preceding detection cycle and generates the extended complex data (1(n−1), ..., P(n−1)).

Accordingly, the data extending unit 310A generates the extended complex data corresponding to the respective pieces of complex data from the complex data acquired in the "present detection cycle" and the "preceding detection cycle".

The target linking unit 32a is the target linking unit 32 of the signal processing unit 20E (FIG. 23). The target linking unit 32a stores the complex data acquired in the present detection cycle in the memory 21. When the complex data stored in the memory 21 by the target linking unit 32a is called out in the present detection cycle which is a subsequent detection cycle (n-th cycle), the complex data is called out as the complex data (1(n−1), ..., P(n−1)) of the previous (preceding) cycle.

The AR coefficient 2 used in the data extending unit 310A is calculated by the FBLP unit 340 to be described later.

The principal component AR spectrum estimating unit 320 (first computation processing unit) calculates the direction of arrival of the received wave based on the extended complex data. For example, the principal component AR spectrum estimating unit 320 calculates the AR coefficient and the variance value of white noise by a solution to a normal equation (first normal equation) created from the extended complex data.

The principal component AR spectrum estimating unit 320 includes a normal equation creating unit 321, a normal equation filter unit 322, an eigenvalue decomposition unit 323, a wave number estimating unit 324, a pseudo-inverse covariance matrix calculating unit 325, and an AR coefficient calculating unit 326.

The normal equation creating unit 321 (order-increased matrix creating unit) creates plural normal equations (first normal equations) derived from the extended complex data to which data is extended by the data extending unit 310A in the "present detection cycle". The order of the created first normal equations is the same as the order in the AR spectrum estimation of the AR coefficient calculating unit 326A.

The normal equation filter unit 322 averages the normal equations of the "present detection cycle" and the normal equations of the "preceding detection cycle" which are created by the normal equation creating unit 321.

The eigenvalue decomposition unit 323 performs an eigenvalue decomposition process based on covariance matrices of the averaged normal equations of the "present detection cycle" and the "preceding detection cycle" created by the normal equation filter unit 322. The eigenvalue decomposition process is a process of calculating eigenvalues and eigenvectors from characteristic equations based on the covariance matrices. The eigenvalue decomposition process can employ any solution program. Iterative type algorithms such as a Jacobi method, a Householder method, and a QR method may be employed in addition to the direct calculation of solutions to the characteristic equations.

The wave number estimating unit 324 determines an eigenvalue indicating the maximum value from the eigenvalues (and the eigenvectors) calculated through the eigenvalue decomposition process by the eigenvalue decomposition unit 323. The wave number estimating unit 324 normalizes the calculated eigenvalues based on the calculated maximum value of the eigenvalues. The wave number estimating unit 324 determines the normalized eigenvalues based on a predetermined threshold value and selects the wave number in the subsequent stage based on the determination result. The signal subspace in the subsequent stage is determined by the selected wave number.

The pseudo-inverse covariance matrix calculating unit 325 creates a pseudo-inverse covariance matrix of the signal subspace included in the subspaces from the eigenvalues and the eigenvectors calculated by the eigenvalue decomposition unit 323. By creating the pseudo-inverse covariance matrix of the signal subspace, it is possible to remove the noise component.

The AR coefficient calculating unit 326A calculates the AR coefficient derived from the pseudo-inverse covariance matrix of the signal subspace created by the pseudo-inverse covariance matrix calculating unit 625 and the variance $\sigma^2$ of the input white noise. In this manner, the AR coefficient calculating unit 326A can derive the AR coefficient based on the complex data of a detection beat frequency which is a beat frequency in which the presence of a target is detected and the variance $\sigma^2$ of the input white noise depending on the detection cycle. The AR coefficient calculating unit 326A outputs the derived AR coefficients and variance $\sigma^2$ of the input white noise to the power spectrum calculating unit 380.

The power spectrum calculating unit 380 calculates the direction of arrival of the received wave from the power spectrum derived based on the AR coefficients and the variance $\sigma^2$ of the input white noise.

The FBLP unit 340 (second computation processing unit) creates the coefficient for generating the extended complex data through the use of a linear equation created based on the original complex data. For example, the FBLP unit 340 calculates the AR coefficient based on the normal equation (second normal equation) created from the acquired complex data.

The FBLP unit 340 includes a normal equation creating unit 341, a normal equation filter unit 342, and an AR coefficient calculating unit 343.

The normal equation creating unit 341 creates a secondary order normal equation (second normal equation) to be used in the AR spectrum estimation from the complex data corresponding to the beat frequencies (one or both of the ascending and the descending) into which the frequency is resolved by the frequency resolving unit 22. The normal equation creating unit 341 creates a second normal equation from the complex data corresponding to the beat frequencies (one or both of the ascending and the descending) into which the frequency is resolved by the frequency resolving unit 22.

The normal equation filter unit 342 performs the averaging process on the second normal equation in the "present detection cycle" and the "preceding detection cycle" created by the normal equation creating unit 341.

The AR coefficient calculating unit 343 calculates the secondary order AR coefficient (AR coefficient 2) derived from the second normal equation having been subjected to the averaging process by the normal equation filter unit 342. In this manner, the AR coefficient calculating unit 343 acquires the AR coefficients 2 (second coefficients) calculated based on the complex data of the present detection cycle and the preceding detection cycle and sets the acquired AR coefficients as the coefficients for extending data in the subsequent stage. In this manner, the azimuth detecting unit 30A calculates the direction of arrival of the received wave based on the pseudo-inverse matrix of the signal subspace through the use of the spectrum estimating method using an autoregressive model.

In the fourth embodiment, the data extending unit 310A serves as a first means. The normal equation creating unit 321, the normal equation filter unit 322, the eigenvalue decomposition unit 323, the pseudo-inverse covariance matrix calculating unit 325, and the AR coefficient calculating unit 326A serve as a second means. The wave number estimating unit 324 serves as a third means. The FBLP unit 340 serves as a fourth means. The target linking unit 32A serves as a fifth means.

Figure 25:
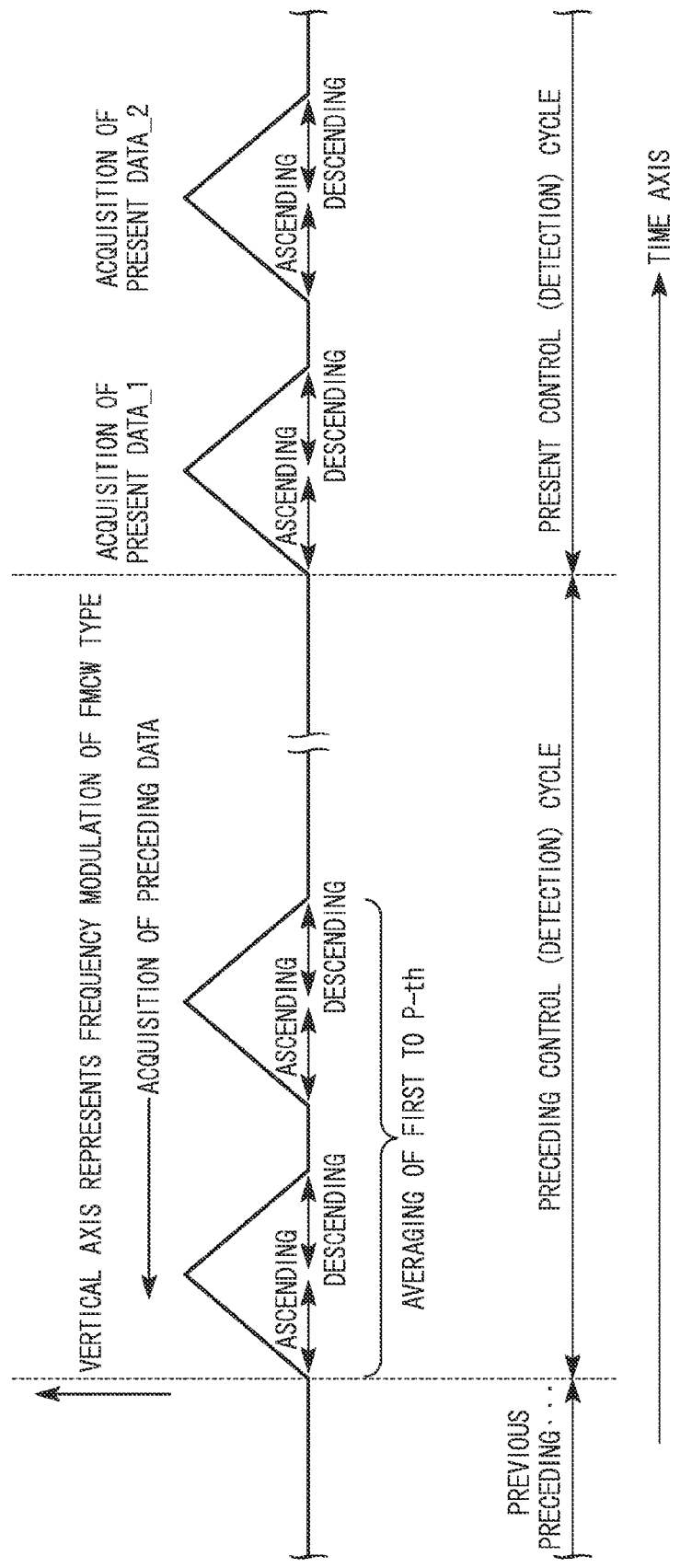
FIG. 25 is a timing diagram illustrating a data acquiring process in a detection cycle.

FIG. 25 is a timing diagram illustrating the data acquiring process in a detection cycle.

FIG. 25 shows preceding control (detection) cycles in the past previous to the present control (detection) cycle.

In each cycle, at least one time of data acquisition is performed and one time of data acquisition is indicated by a triangular waveform. The triangular waveform represents a signal modulated through the FMCW method, and the ascending at the ascending time to the right hand and the descending at the descending time to the right hand are detected.

The individual data acquisitions are repeatedly performed at a time interval enough to cause no interference with each other and the frequency modulation period of the triangular wave may not be constant.

For example, P data acquisitions are performed in the present control (detection) cycle, the first data acquisition is represented by "present data_1 acquisition", and the P-th data acquisition is represented by "present data_P acquisition". P data acquisitions are performed in the preceding control (detection) cycle, the first data acquisition is represented by "preceding data_1 acquisition", and the P-th data acquisition is represented by "preceding data_P acquisition".

In the fourth embodiment, various averaging processes to be described later are performed based on the complex data acquired plural times in the same cycle in the present detection cycle and the preceding detection cycle. The number of data acquisitions can be set to any predetermined number.

The control (detection) cycle in which data is presently acquired is referred to as a "present control (detection) cycle" and a control (detection) cycle previous to the "present control (detection) cycle" is referred to as a "preceding control (detection) cycle". Here, the number of preceding cycles can be set to any number. In the fourth embodiment, the number of preceding cycles is set to 1 and "previous" is mentioned as "preceding".

In the fourth embodiment, it is assumed that two data acquisitions are performed in a single control (detection) cycle.

The number of data acquisitions may be increased by distributing the computational load of the processes from the process of acquiring data to the process of extracting complex data (FFT and detection of peaks) to plural devices or processors (FPGA, DSP, microcomputers).

The configuration of an M-th order normal equation based on complex data and the averaging process will be described below with reference to the accompanying drawings.

FIG. 26 is a diagram illustrating the configuration of an M-th order normal equation based on complex data and the averaging process.

The M-th order normal equation shown in FIG. 26 includes a covariance matrix which is an M-th order square matrix, an AR coefficient of M rows and 1 column, and a right-hand vector of M rows and 1 column.

The principal component AR spectrum estimating unit 320A (FIG. 24) creates a first covariance matrix and a first right-hand vector based on the extended complex data. A first AR coefficient is calculated by solving a first normal equation having the first covariance matrix and the first right-hand vector as constituent parts.

The FBLP unit 340 (FIG. 24) creates a second covariance matrix and a second right-hand vector based on the acquired complex data. A second AR coefficient is calculated by solving a second normal equation having the second covariance matrix and the second right-hand vector as constituent parts.

The process of averaging the second normal equation in the FBLP unit 340 will be described below.

As shown in FIG. 25, the data acquisition are performed plural times in plural control (detection) cycles. The covariance matrix $C_{xxk}(t)$ and the right-hand vector $c_{xxk}(t)$ are created in the order in which the complex data are acquired.

In FIG. 25, the number of data acquisitions in a single control (detection) cycle is set to 2 and the order is set to M. The covariance matrices $C_{xx1}(t)$ and $C_{xx2}(t)$ and the right-hand vectors $c_{xx1}(t)$ and $c_{xx2}(t)$ are expressed in the order of "present_1" and "present_2" corresponding to the acquisitions in the present control (detection) cycle. The covariance matrices $C_{xx1}(t-1)$ and $C_{xx2}(t-1)$ and the right-hand vectors $c_{xx1}(t-1)$ and $c_{xx2}(t-1)$ are expressed in the order of "preceding_1" and "preceding_2" corresponding to the acquisitions in the preceding control (detection) cycle.

In the fourth embodiment, the averaging process of the normal equations to be described later is performed based on the complex data acquired in the same control (detection) cycle of each of the present control (detection) cycle and the preceding control (detection) cycle, and the averaging process is performed by averaging elements of the covariance matrices $C_{xxk}(t)$ and the right-hand vectors $c_{xxk}(t)$ corresponding to four data acquisitions from "present_1", "present_2", "preceding_1", and "preceding_2" in total.

A computational equation used to calculate an averaged covariance matrix $Ave\_C_{xx}(t)$ through the averaging process of the normal equations is expressed by Equation (21).

$$Ave\_C_{xx}(t)=k1*C_{xx2}(t)+k2*C_{xx1}(t)+k3*C_{xx2}(t-1)+k4*C_{xx1}(t-1) \quad (21)$$

In Equation (21), k1 to k4 represent a weighting coefficient.

A computational equation used to calculate the averaged right-hand vector $Ave\_c_{xx}(t)$ through the averaging process of the normal equations is expressed by Equation (22).

$$Ave\_c_{xx}(t)=k1*c_{xx2}(t)+k2*c_{xx1}(t)+k3*c_{xx2}(t-1)+k4*c_{xx1}(t-1) \quad (22)$$

In Equation (22), k1 to k4 represent a weighting coefficient.

In the averaging process of the second normal equation in the normal equation filter unit 342 of the FBLP unit 340, a second averaged covariance matrix $Ave\_C_{xx}(t)$ and a second averaged right-hand vector $Ave\_c_{xx}(t)$ are calculated through the above-mentioned operation.

The AR coefficient calculating unit 343 calculates a second AR coefficient from the second averaged covariance matrix $Ave\_C_{xx}(t)$ and the second averaged right-hand vector $Ave\_c_{xx}(t)$. The order (M) of the second normal equation is set to, for example, 3.

In the averaging process of the first normal equation in the normal equation filter unit 322 of the principal component AR spectrum estimating unit 320, a first averaged covariance matrix $Ave\_C_{xx}(t)$ is calculated through the above-mentioned operation.

The eigenvalue decomposition unit 323 calculates eigenvalues and eigenvectors by performing an eigenvalue decomposition process based on the first averaged covariance matrix $Ave\_C_{xx}(t)$. The order (M) of the first normal equation is set to, for example, 5.

The specific process of averaging the normal equations of the present detection cycle and the preceding detection cycle in the fourth embodiment will be described below.

This averaging process is mainly performed by the normal equation filter unit 342 of the azimuth detecting unit 30A and the target linking unit 32a in FIG. 24.

FIG. 27 is a diagram illustrating a table installed in the memory 21.

In order to cause the normal equation filter unit 342 to perform the process of averaging the normal equations, the target linking unit 32a performs the following process for linking a present target group (t), a target (t) predicted from the fixed preceding target data, and a target (t−1) fixed in the past in the table shown in FIG. 27 for each target.

The column of item (t−1) in FIG. 27 represents the result of a (preceding) detection cycle previous by one cycle.

As the results of the detection cycles, a distance r, the longitudinal position long_d (a position in the direction perpendicular to the arrangement direction of antennas), a lateral position late_d (a position in the direction parallel to the arrangement direction of antennas), a relative velocity velo (that is, v) to a target, an ascending peak frequency point f_up, complex data x_up_1 and x_up_2 at an ascending peak frequency, a descending peak frequency point f_dwn, and complex data x_dwn_1 and x_dwn_2 at a descending peak frequency are stored in the memory 21 in the format of the table shown in FIG. 27 for each fixed target (more specifically, the storage areas of the complex data x_up_1 and x_up_2 at an ascending peak frequency and the complex data x_dwn_1 and x_dwn_2 at a descending peak frequency are larger than those of the other, but are assumed to be equal thereto for the purpose of convenience for drawing a table). Here, the longitudinal position long_d and the lateral position late_d of a target are calculated from the angle about the target (the angle of the direction of arrival of the received wave) and the distance r. When the distance is r and the angle is θ, the longitudinal position long_d is calculated by r·cos θ and the lateral position late_d is calculated by r·sin θ.

The target linking unit 32a predicts the distance r, the longitudinal position long_d, the lateral position late_d, the relative velocity, and the peak frequency point of each target in the present cycle from the distance r, the longitudinal position long_d, the lateral position late_d, and the relative velocity velo of the target fixed in the preceding detection time.

For example, in the prediction of the longitudinal position long_d, the lateral position late_d, and the peak frequency point, a movable range after the detection cycle is calculated based on the distance r, the longitudinal position long_d, the lateral position late_d, and the relative velocity of the preceding cycle. The relative velocity can be predicted by calculating a slope of a variation in the relative velocity in any preceding cycle.

For example, the target linking unit 32a prepares a predetermined movable range, a frequency point range, and a relative velocity range to correspond to the distance r, the longitudinal position long_d, the lateral position late_d, the peak frequency point, and the relative velocity predicted from the previously-fixed results, links the targets depending on whether the values calculated in the present cycle are in the ranges, and determines that they are different targets when the values are not in the ranges.

The target linking unit 32a transfers the results of the present detection cycle to the results of (t−1) and calculates the prediction results of the subsequent detection cycle, when the target in the present detection cycle is coupled to the target in the preceding detection cycle in the table of FIG. 27.

The target linking unit 32a clears the information of all the previous targets when the previous target which cannot be coupled to the target group in the present detection cycle is present.

Therefore, when a target is within a distance range affected by a multi-path and a detection cycle in which no peak is detected at beat frequencies comes in, the filter effect using the results of the preceding target group is reset. In the fourth embodiment shown in FIG. 27, the results of the targets of a preceding detection cycle are stored in the memory 21.

Even when a previous target which cannot be coupled to the target in the present detection cycle is detected, the target linking unit 32a may continuously store the results of the fixed previous target by a predetermined number of cycles.

Since the stored results are sequentially updated, the prediction results estimated based on the previous results are sequentially updated. When a target is not detected in the present detection cycle due to the influence of a multi-path or the like but the target is linked subsequently to the next detection cycle, the target linking unit 32a can be made to use the previous data other than the number of cycles in which no peak is detected due to the influence of a multi-path or the like for a filtering process.

Like an extrapolation method in tracking control, in a detection cycle in which a peak value is not detected, the presence of a target may be maintained using the prediction results as the result of the present detection cycle.

In the method of calling complex data shown in the drawing, the target linking unit 32a can select an estimation range based on distance point information corresponding to a previously-detected target, thereby enhancing the processing efficiency. That is, the target linking unit 32a can define the estimation range based on the relative velocity and the angle about a target with reference to the stored complex data. In the subsequent detection cycle, it is possible to select the estimation range based on the distance point information corresponding to the previously-detected target. Accordingly, the target linking unit 32a can enhance the processing efficiency. Therefore, the target linking unit 32a can refer to the complex data corresponding to the distance point within the defined range, thereby enhancing the calling precision.

Figure 28:
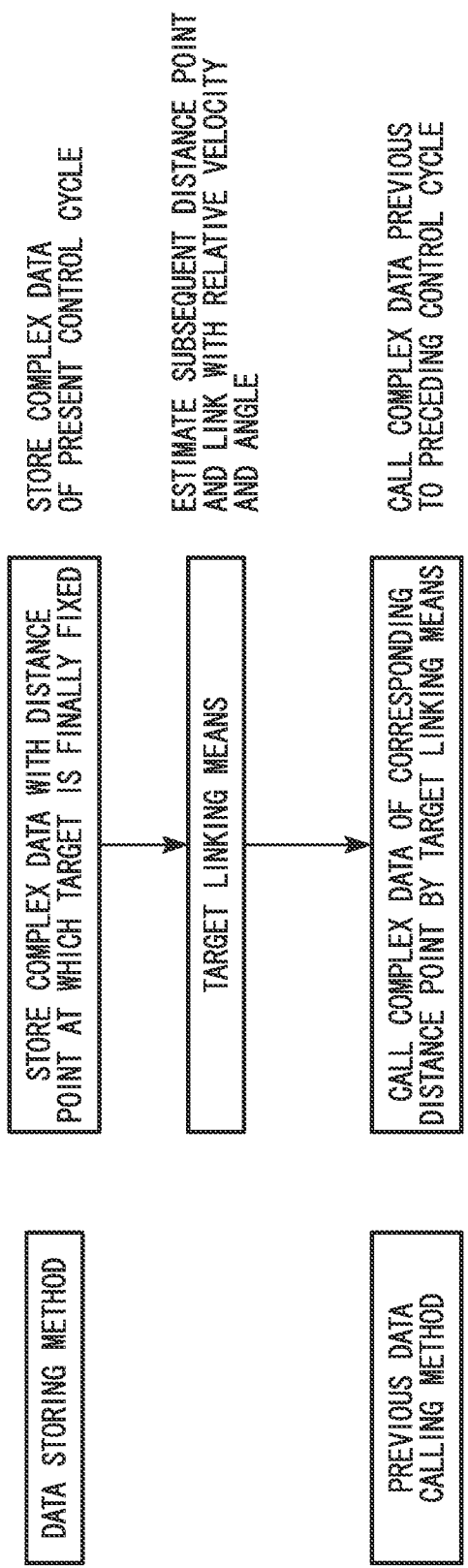
FIG. 28 is a diagram illustrating methods of storing and calling complex data.

FIG. 28 is a diagram illustrating the method of storing and calling complex data.

In the method of storing an AR coefficient shown in the drawing, the target linking unit 32a performs a correlation with the distance point finally fixed as a target and stores the complex data in the memory 21. The complex data stored in the memory 21 is information in the present control cycle.

The target linking unit 32a calls the complex data stored in the memory 21 with reference to the distance point information as a key. The complex data called from the memory 21 is information in the preceding control cycle.

The processes other than the above-mentioned processes in the fourth embodiment are similar to those in the first embodiment.

As a result, the azimuth detecting unit 30A can make a correlation with a target using the distance point information as a key.

The flow of processes will be described with reference to FIG. 29.

Figure 29:
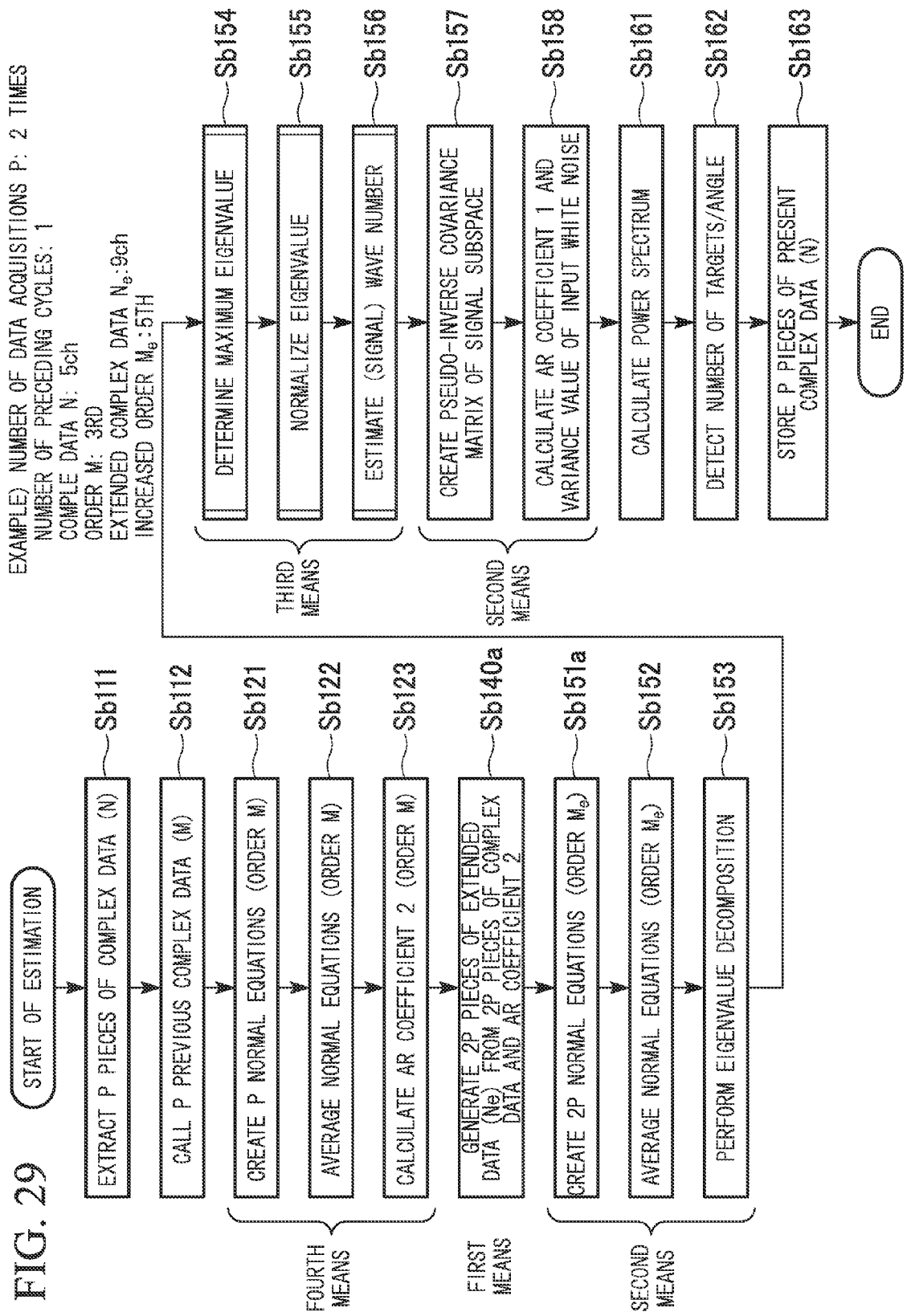
FIG. 29 is a flowchart illustrating the flow of processes in the fourth embodiment.

FIG. 29 is a flowchart illustrating the sequence (flow) of processes.

The preconditions in the flow of processes to be described below are arranged, for example, as follows.

The number of data acquisitions P which is the number of times of acquiring data in a single control cycle is set to 2. The number of preceding detection cycles to be referred to other than the present detection cycle is set to 1. The number of channels N (the number of data) included in the complex data detected through the single data acquisition is set to 5 ch. The order M with which the complex data detected through the data acquisition is treated is set to 3. The number of channels N2 (the number of data) included in the extended complex data to which data is extended is set to 9 ch. The order (increased order) $M_e$ to which the order of the data is increased through the data extension is set to 5. It is assumed that these values are preliminarily determined.

The flow of processes shown in FIG. 29 is repeatedly performed for each control cycle (see FIG. 25) and for each of plural targets selected through the detection of peaks in the entire configuration of the radar.

In step Sb111, complex data for each channel (CH) is acquired one or more times in the same control cycle. P pieces of present complex data can be extracted by performing the data acquisition by P times.

In accordance with the above-mentioned preconditions, the number of data acquisitions P is set to 2. That is, two complex data pieces (N) are extracted. The number of channels N (number of data) included in the complex data is 5 ch.

The frequency resolving unit 22 reads beat signals based on the received wave and stored in the memory 21 and frequency-transforms the beat signals for each antenna.

The acquired complex data is complex data subjected to the frequency transformation in the present detection cycle, and may be processed separately in the ascending part and the descending part by individually using one or both of the ascending data and the descending data of a frequency-modulated triangular wave.

In step Sb112, the target linking unit 32a calls P pieces of previous (preceding) complex data stored in the memory 21.

In step Sb121, the normal equation creating unit 341 creates an M-th order normal equation to be applied to an AR model for each acquisition based on the complex data acquired in the present detection cycle. Accordingly, P normal equations are created.

The normal equation creating unit 341 creates an M-th order normal equation to be applied to an AR model for each acquisition based on the called complex data acquired in the preceding detection cycle. Accordingly, P normal equations are created. That is, the normal equation creating unit 341 creates 2P normal equations in step Sb121.

In step Sb122, the normal equation filter unit 342 averages the elements of the covariance matrices and the right-hand vectors (cross-correlation vectors) of the normal equations created in step Sb121.

In step Sb123, the AR coefficient calculating unit 343 calculates an M-th order second AR coefficient (AR coefficient 2) from the normal equation (second averaged normal equation) averaged in step Sb122.

In step Sb140a, the data extending unit 310 generates 2P pieces of extended complex data from the 2P complex data pieces (corresponding to 2P acquisitions) acquired in a predetermined number of detection cycles including the present detection cycle out of the detection cycles in which the process of calculating the direction of arrival of a received wave is repeatedly performed and the second AR coefficient (AR coefficient 1) calculated in step Sb123. In accordance with the above-mentioned preconditions, the number of channels $N_e$ (the number of data) included in the complex data pieces is 9 ch. The number of channels N (5 ch) can be extended to the number of channels $N_e$ (9 ch) through the data extension in the data extending unit 610.

In step Sb151a, the normal equation creating unit 321 creates 2P normal equations (first normal equations) from the 2P pieces of extended complex data generated in step Sb140. In accordance with the above-mentioned preconditions, the order $M_e$ of the normal equations to be applied to an AR model is set to 5.

In step Sb152, the normal equation filter unit 322 averages elements of the covariance matrices and the right-hand vectors (cross-correlation vectors) of the normal equations created in step Sb151.

The covariance matrices of the modified covariance method averaged in step Sb152 is used for the eigenvalue decompostion in the subsequent step. The covariance matrix of the AR model is a Hermitian matrix (complex symmetric matrix). Accordingly, the eigenvalue decompostion is performed with the order of the AR model.

In step Sb153, the eigenvalue decomposition unit 323 performs the eigenvalue decomposition process based on the covariance matrices of the averaged normal equations in the "present detection cycle" and the "preceding detection cycle" created by the normal equation filter unit 322. The eigenvalue decomposition unit 323 calculates the eigenvalues and the eigenvectors from the characteristic equations based on the covariance matrices through the use of the eigenvalue decomposition process.

Any solution program can be used for the eigenvalue decompostion and iterative type algorithms such as a Jacobi method, a Householder method, and a QR method may be employed in addition to the direct solving of the characteristic equation.

In step Sb154, the wave number estimating unit 324 determines the eigenvalue (maximum eigenvalue) indicating the maximum value out of the eigenvalues of the covariance matrix $C_{xx}$ calculated in step Sb153.

The wave number estimating unit 324 determines whether the wave number estimation in the subsequent steps for the corresponding target group should be performed based on the determination result. The wave number estimating unit 324 stops the wave number estimating process in the subsequent steps for the corresponding target group, when it is determined through the use of the maximum eigenvalue determining process that the value of the maximum eigenvalue is smaller than a predetermined threshold value.

In step Sb155, the wave number estimating unit 324 normalizes the calculated eigenvalues based on the calculated maximum value of the eigenvalues. In the eigenvalue normalizing process, the values obtained by dividing the eigenvalues by the maximum eigenvalue are defined as normalized eigenvalues. Like a radar, when the eigenvalues (signal intensities) vary depending on the distance from a target, it is possible to easily estimate the wave number by normalizing the values of the eigenvalues and relatively determining the magnitude relationship between the eigenvalues.

In step Sb156, the wave number estimating unit 324 determines the normalized eigenvalues based on a predetermined threshold value and selects the wave number to be used in the subsequent processes based on the determination result.

In the wave number estimating step, four threshold values are used for the determination, as shown in FIG. 18. By setting plural threshold values In this manner, it is possible to flexibly adjust the wave number estimation result.

The details of the processes of steps Sb154 to Sb156 are similar to those shown in FIGS. 17 and 18.

In step Sb157, the pseudo-inverse covariance matrix creating unit 325 performs a process of creating a pseudo-inverse covariance matrix of the signal subspace based on the wave number estimated by the wave number estimating unit 324 in step Sb156.

The pseudo-inverse covariance matrix creating unit 325 creates a pseudo-inverse covariance matrix through the use of the above-mentioned computational equation based on the eigenvalues and the eigenvectors calculated by the eigenvalue decomposition unit 323 in step Sb153.

In step Sb158, the AR coefficient calculating unit 326 calculates the AR coefficient and the variance value of the input white noise based on the eigenvalues and the eigenvectors calculated in step Sb153.

In step Sb161, the power spectrum calculating unit 380 calculates a power spectrum based on the AR coefficient and the variance of the input white noise which are calculated in step Sb158.

In step Sb162, the power spectrum calculating unit 380 detects the number of targets and the angles indicating the directions of the targets based on the calculated power spectrum.

In step Sb163, the target linking unit 32a stores P pieces of present complex data (N) in the memory 21.

Through the above-mentioned sequence of processes, the electronic scanning radar apparatus can detect an azimuth with enhanced detection precision.

The fourth embodiment can be applied to all the spectrum estimating methods such as the standard AR spectrum estimating method and the MUSIC method from the DBF (Digital Beam Forming), in addition to the principal component AR spectrum estimating method as the second means (see FIG. 18).

Fifth Embodiment

Another example where the AR spectrum estimating method known as a high-resolution algorithm is used in the spectrum estimating method will be described in more detail below with reference to FIG. 1 and FIGS. 23 to 33.

Figure 30:
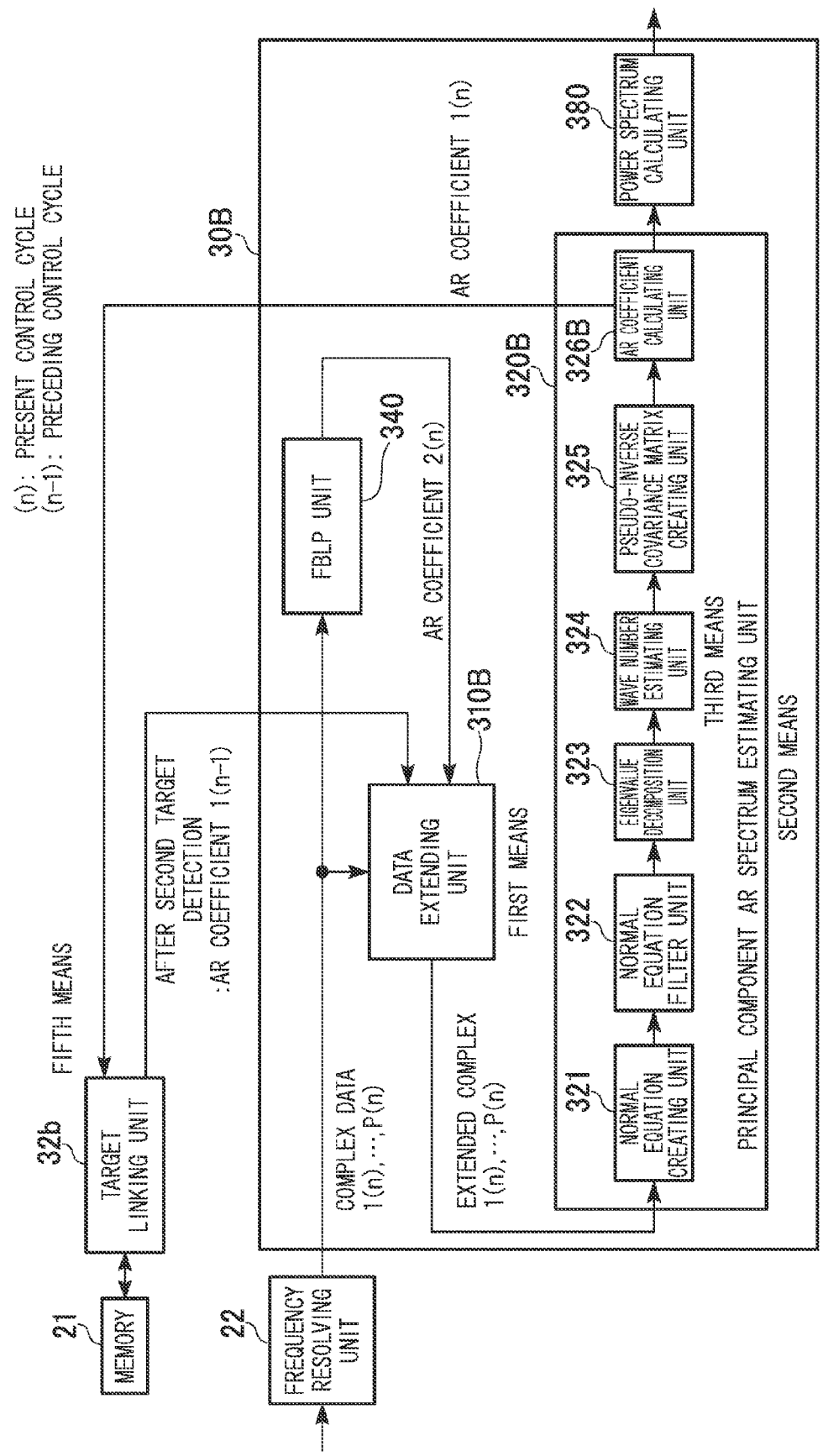
FIG. 30 is a block diagram illustrating the configuration of an azimuth detecting unit according to a fifth embodiment of the invention.

FIG. 30 is a block diagram illustrating the configuration of an azimuth detecting unit according to a fifth embodiment of the invention.

The azimuth detecting unit 30B shown in FIG. 30 is an example of the azimuth detecting unit 30 shown in FIG. 23. The same constituents as shown in FIGS. 23 and 24 will be referenced by the same reference numerals.

The azimuth detecting unit 30B and the target linking unit 32b shown in FIG. 30 are the azimuth detecting unit 30 and the target linking unit 32 of the signal processing unit 20E (FIG. 23), respectively.

The target linking unit 32b writes and stores the AR coefficient 1(n) calculated in the present detection cycle in the memory 21. The AR coefficient 1(n) is derived from the complex data (extended complex data) extended in the present detection cycle by the principal component AR spectrum estimating unit 320B.

When the AR coefficient 1 written to the memory 21 by the target linking unit 32b is called in the present detection cycle (n-th time of acquisition) which is a subsequent detection cycle, the AR coefficient 1 is called as a previous (preceding) AR coefficient 1(n−1).

That is, the fifth embodiment is different from the fourth embodiment in the information stored in the memory 21. The information stored in the memory 21 is the AR coefficient of which the order is increased. The AR coefficient (AR coefficient 1) is calculated by the principal component AR spectrum estimating unit 320B.

The azimuth detecting unit 30B includes a data extending unit 310B, a principal component AR spectrum estimating unit 320B, an FBLP unit 340, and a spectrum calculating unit 380.

The data extending unit 310B generates extended complex data in which the number of data is extended from plural pieces of complex data and called AR coefficients which are acquired in the present detection cycle out of the detection cycles in which the process of calculating the direction of arrival of a received wave is repeatedly performed.

The plural pieces of complex data (1(n), . . . , P(n)) acquired in the present detection cycle are complex data corresponding to the beat frequencies (one or both of the ascending and the descending) resolved by the frequency resolving unit 22.

The data extending unit 310B generates a predetermined number of extended complex data (1(n), . . . , P(n)) based on the original complex data of which the number of data should be extended and the AR coefficients.

The data extending unit 310B generates the extended complex data (1(n), . . . , P(n)) based on the complex data (1(n), . . . , P(n)) of the present detection cycle.

When generating the extended complex data, the data extending unit 310B acquires the complex data (1(n), . . . , P(n)) of the present detection cycle from the frequency resolving unit 22. The data extending unit 310B acquires the AR coefficient 1(n−1) of the preceding detection cycle stored in the memory 21 through the use of the target linking unit 32a. The data extending unit 310B generates the extended complex data (1(n), . . . , P(n)) based on the complex data (1(n), . . . , P(n)) of the present detection cycle and the AR coefficient 1(n−1) of the preceding detection cycle.

Accordingly, the data extending unit 310B can generate the extended complex data corresponding to the respective pieces of complex data from the complex data acquired in the "present detection cycle" and the AR coefficient 1(n−1) calculated in the "preceding detection cycle".

Here, when generating the extended complex data for a new target not linked to the preceding detection cycle as the determination result of the target linking unit 32b, the data extending unit 310B acquires the AR coefficient 2(n) of the present detection cycle from the FBLP unit 340. The data extending unit 310B generates the extended complex data (1(n), . . . , P(n)) based on the complex data (1(n), . . . , P(n)) and the AR coefficient 2(n) acquired in the present detection cycle.

The target linking unit 32b stores the AR coefficient 1(n) calculated by the AR coefficient calculating unit 326B in the present detection cycle in the memory 21. When the AR coefficient 1 stored in the memory 21 is called out by the target linking unit 32b in a subsequent detection cycle, the AR coefficient is called out as the AR coefficient 1(n−1) (the preceding (n−1) AR coefficient) calculated in the preceding cycle.

The principal component AR spectrum estimating unit 320B (first computation processing unit) calculates the AR coefficient and the variance value of white noise by a solution to a normal equation (first normal equation) created from the extended complex data.

The principal component AR spectrum estimating unit 320B includes a normal equation creating unit 321, a normal equation filter unit 322, an eigenvalue decomposition unit 323, a wave number estimating unit 324, a pseudo-inverse covariance matrix calculating unit 325, and an AR coefficient calculating unit 326B.

The AR coefficient calculating unit 326B calculates the AR coefficient (AR coefficient 1(n)) derived from the pseudo-inverse covariance matrix and the right-hand vector of the signal subspace created by the pseudo-inverse covariance matrix calculating unit 325 and the variance $\sigma^2$ of the input white noise. In this manner, the AR coefficient calculating unit 326B can derive the AR coefficient based on the complex data of a detection beat frequency which is a beat frequency in which the presence of a target is detected and the variance $\sigma^2$ of the input white noise depending on the detection cycle. The AR coefficient calculating unit 326B outputs the derived AR coefficient and variance $\sigma^2$ of the input white noise to the power spectrum calculating unit 380. The AR coefficient calculating unit 326B outputs the derived AR coefficient to the target linking unit 32b.

The FBLP unit 340 (FIG. 24) in the fifth embodiment creates the AR coefficient 2(n) based on the complex data acquired in a detection cycle in which a new target is detected.

FIG. 31 is a diagram illustrating a table installed in the memory 21.

In the table shown in FIG. 31, the following items are added to the table shown in FIG. 27.

The additional items include an AR coefficient AR_C_up at an ascending peak frequency and an AR coefficient AR_C_dwn at a descending peak frequency which store an AR coefficient corresponding to the peak frequency point. In the fifth embodiment, the complex data to be stored is not necessary.

The AR coefficients at the peak frequencies are stored in the memory 21 in the table format shown in FIG. 31 (more specifically, the storage areas of the items are larger than the other items, but are assumed to be equal thereto for the purpose of convenience to drawing a table). The memory 21 stores the AR coefficient AR_C_up at an ascending peak frequency and the AR coefficient AR_C_dwn at a descending peak frequency. In the following description, the AR coefficient AR_C_up at an ascending peak frequency and the AR coefficient AR_C_dwn at a descending peak frequency are arranged as "AR coefficient 1".

The flow of processes will be described below with reference to FIGS. 32 and 33.

Figure 32:
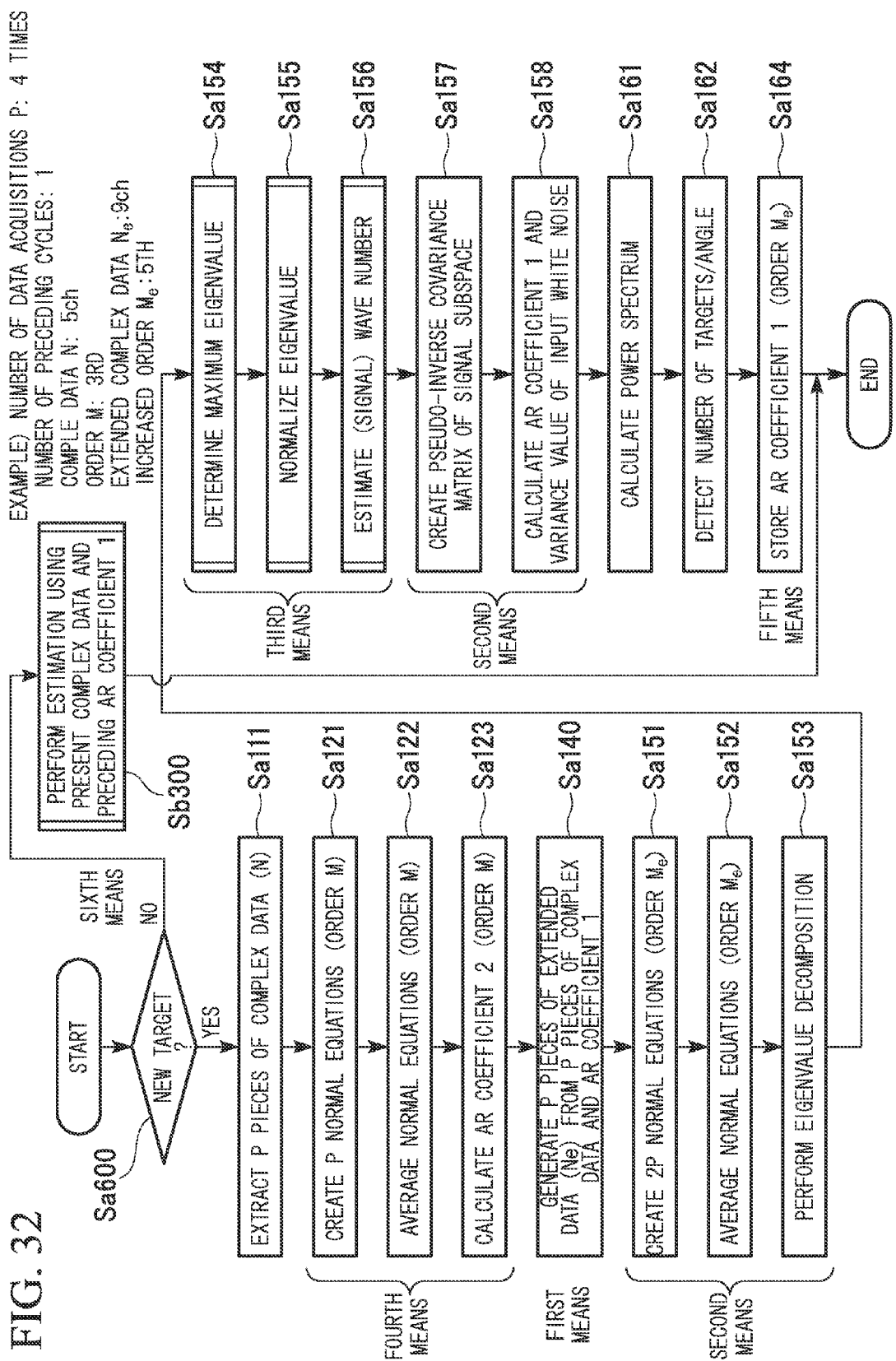
FIG. 32 is a flowchart illustrating the flow of processes in the fifth embodiment.

FIG. 32 is a flowchart illustrating the sequence (flow) of processes. The same processes as shown in FIGS. 15 to 17 will be referenced by the same reference numerals.

The preconditions in the flow of processes to be described below are arranged as follows.

The number of data acquisitions P which is the number of times of acquiring data in a single control cycle is set to 4. The number of preceding detection cycles to be referred to other than the present detection cycle is set to 1. The number of channels N (the number of data) included in the complex data detected through the single data acquisition is set to 5 ch. The number of channels $N_e$ (the number of data) included in the extended complex data to which data is extended is set to 9 ch. The order (increased order) $M_e$ to which the order of the data is increased by the extended complex data is set to 5. It is assumed that these values are preliminarily determined.

Figure 33:
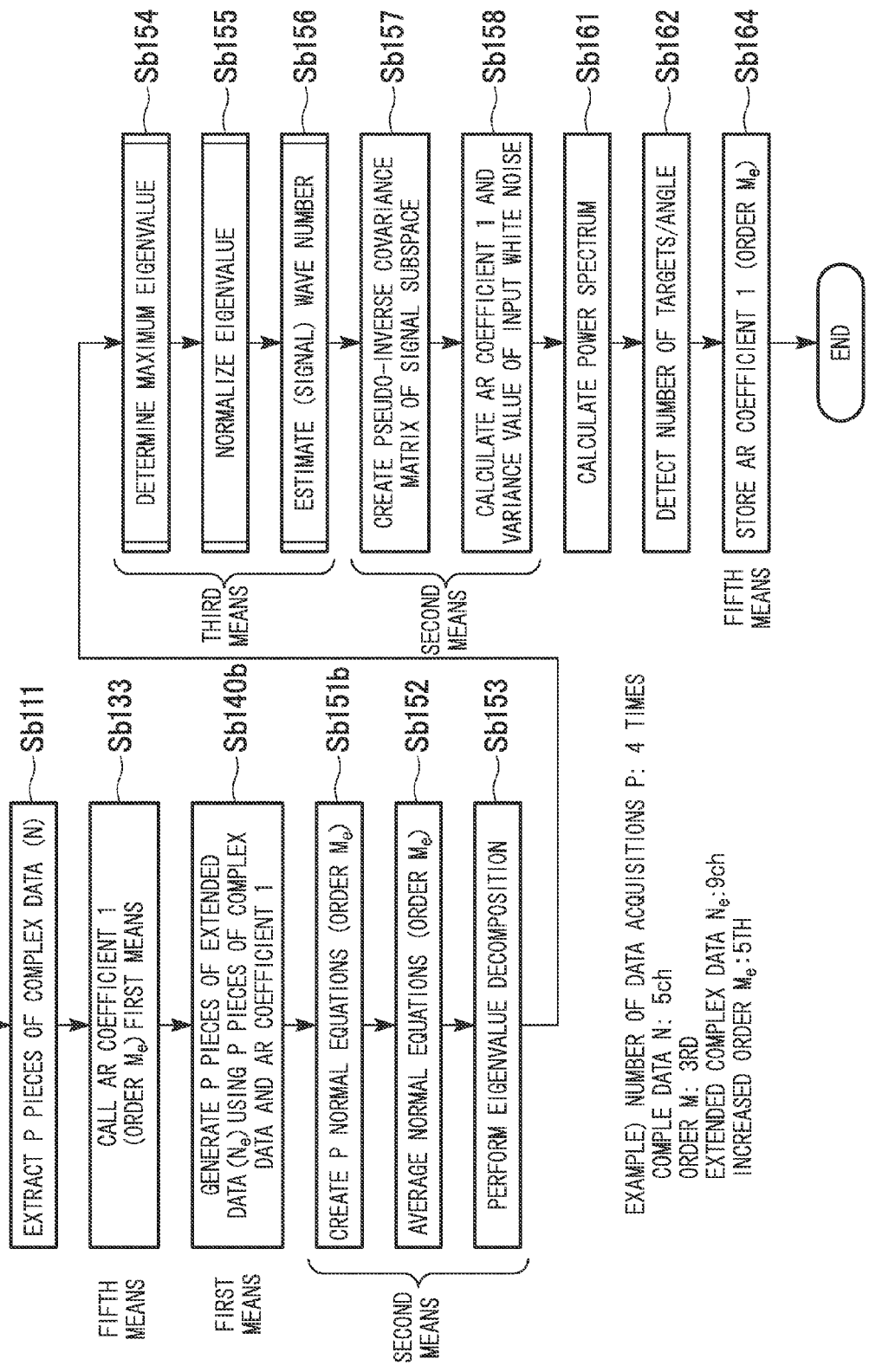
FIG. 33 is a flowchart illustrating the flow of processes in step Sb300 in the fifth embodiment.

The flow of processes shown in FIGS. 32 and 33 is repeatedly performed for each control cycle (see FIG. 25) and for each of plural targets selected through the detection of peaks in the entire configuration of the radar.

As shown in FIG. 32, first, in step Sa600, the data linking unit 32b determines whether a target is new.

When it is determined in step Sa600 that the present target is new, the process of step Sa111 is performed. The processes of step Sa111 to Sa162 are sequentially performed. The processes of steps Sa111 to Sa162 are the same as shown in FIGS. 15 to 17. Here, the data extending unit 610, the principal component AR spectrum estimating unit 620, the FBLP unit 640, and the power spectrum calculating unit 680 are replaced with the data extending unit 310, the principal component AR spectrum estimating unit 320B, the FBLP unit 340, and the power spectrum calculating unit 380, respectively. The normal equation creating unit 621, the normal equation filter unit 622, the eigenvalue decomposition unit 623, the wave number estimating unit 624, the pseudo-inverse covariance matrix calculating unit 625, and the AR coefficient calculating unit 626 are replaced with the normal equation creating unit 321, the normal equation filter unit 322, the eigenvalue decomposition unit 323, the wave number estimating unit 324, the pseudo-inverse covariance matrix calculating unit 325, and the AR coefficient calculating unit 326B, respectively. The normal equation creating unit 641, the normal equation filter unit 642, and the AR coefficient calculating unit 643 are replaced with the normal equation creating unit 341, the normal equation filter unit 342, and the AR coefficient calculating unit 343, respectively.

In step Sa164, the target linking unit 32b stores the $M_e$-th order AR coefficient 1(n) calculated by the principal component AR spectrum estimating unit 320B in the memory 21.

Through the above-mentioned sequence of processes, the detection cycle for a new target is ended.

When it is determined in step Sa600 that the target is not new, the process of step Sb300 is performed.

The data extending process is performed based on the AR coefficient calculated in the preceding detection cycle shown in step Sb300 and the spectrum estimating process is continuously performed.

The process of step Sb300 is a process of performing data extension and spectrum estimation based on the AR coefficient calculated in the preceding detection cycle.

The process (step Sb300) of performing the spectrum estimation based on the AR coefficient calculated in the preceding detection cycle will be described with reference to FIG. 33.

FIG. 33 is a flowchart illustrating the sequence (flow) of processes in step Sb300. The same processes as shown in FIGS. 15 to 17 and FIG. 29 are referenced by the same reference numerals.

In step Sb111, complex data for each channel (CH) is acquired one or more times in the same control cycle. P pieces of present complex data (N) can be acquired by performing the data acquisition by P times.

In accordance with the above-mentioned preconditions, the number of data acquisitions P is set to 4. The number of channels N (number of data) of the complex data is 5 ch.

In step Sb133, the target linking unit 32b calls the previous (preceding) AR coefficient 1 (the order $M_e$) stored in the table (FIG. 31) installed in the memory 21 and supplies the called coefficient to the data extending unit 310B.

In step Sb140b, the data extending unit 310B generates P pieces of extended complex data from P pieces of complex data (corresponding to P acquisitions) acquired in the present detection cycle out of the detection cycles in which the process of calculating the direction of arrival of a received wave is repeatedly performed and the AR coefficient 1 (first AR coefficient) called from the memory 21 in step Sb133. In accordance with the above-mentioned preconditions, the number of channels $N_e$ (the number of data) included in the extended complex data is 9 ch. The number of channels N (5 ch) can be extended to the number of channels $N_e$ (9 ch) through the data extension of the data extending unit 310B.

In step Sb151b, the normal equation creating unit 321 creates the $M_e$-th order normal equation (first normal equation) to be applied to an AR model depending on the number of acquisitions in step Sb111. In accordance with the above-mentioned preconditions, the order $M_e$ is set to 5.

In step Sb152, the normal equation filter unit 322 averages elements of the covariance matrices and the right-hand vectors (cross-correlation vectors) of the normal equations created in step Sb151.

The processes of steps Sb152 to Sb162 are the same as shown in FIG. 29.

Here, the AR coefficient calculating unit 326 is replaced with the AR coefficient calculating unit 326B.

In step Sb164, the AR coefficient calculating unit 326B stores the $M_e$-th order AR coefficient 1 calculated in step Sb158 in the memory 21 through the use of the target linking unit 32b.

Through the above-mentioned sequence of processes, the same can be sequentially performed in a detection cycle after linking the targets.

In this manner, by providing the determination process of step Sa600, it is possible to perform the data extending process in the data extending unit 310B based on the AR coefficient 2(n) calculated based on the complex data detected in the present detection cycle in the estimation process in which the linking of targets is first performed. Accordingly, it is possible to enhance the detection precision in all the detection cycles.

Through the above-mentioned sequence of processes, the electronic scanning radar apparatus can detect an azimuth with enhanced detection precision.

Sixth Embodiment

Another example where the AR spectrum estimating method known as a high-resolution algorithm is used in the spectrum estimating method will be described in more detail below with reference to FIG. 1 and FIGS. 23 to 35.

Figure 34:
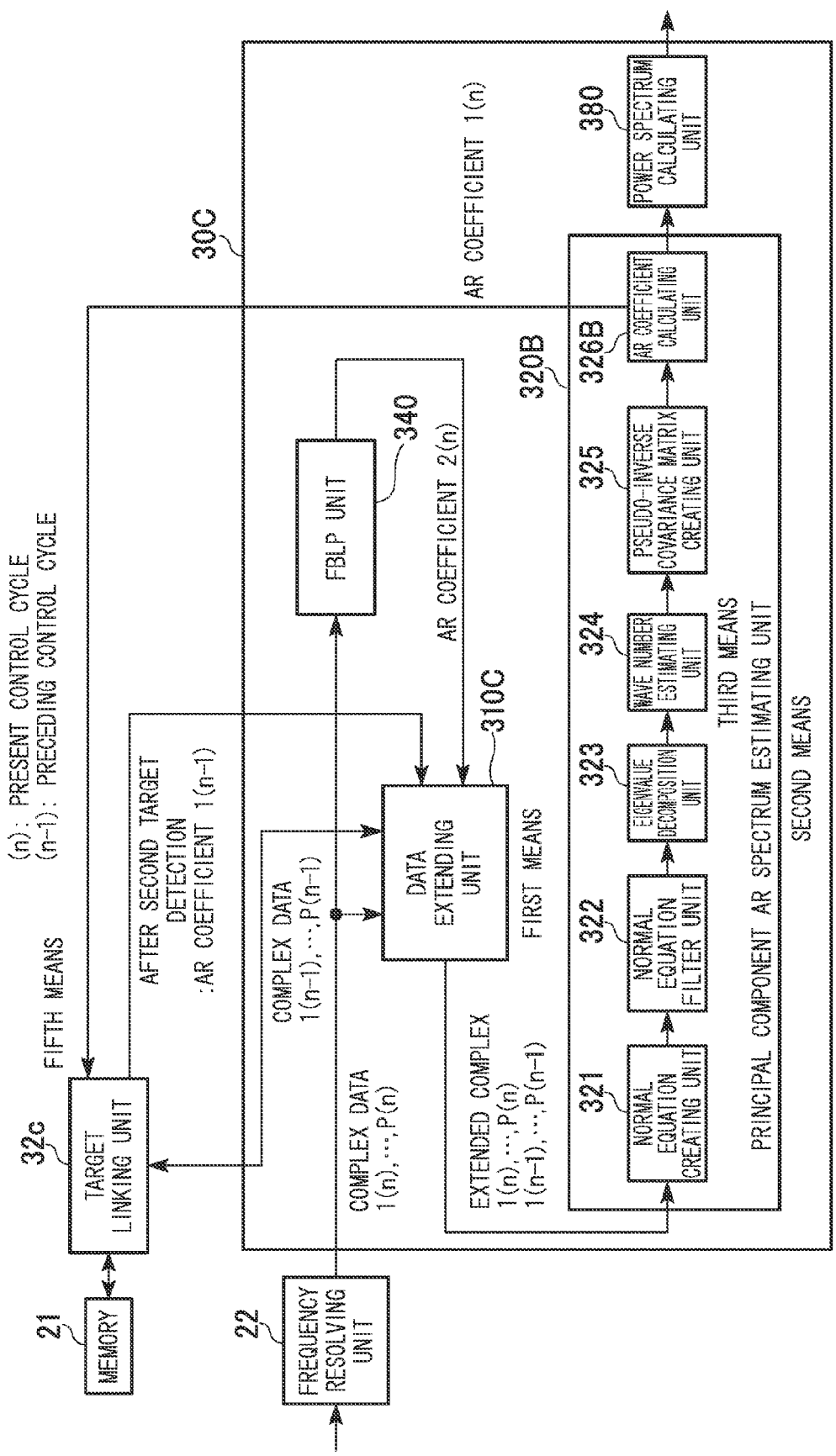
FIG. 34 is a block diagram illustrating the configuration of an azimuth detecting unit according to a sixth embodiment.

FIG. 34 is a block diagram illustrating the configuration of an azimuth detecting unit according to a sixth embodiment of the invention.

The azimuth detecting unit 30C shown in FIG. 34 is an example of the azimuth detecting unit 30 shown in FIG. 23. The same constituents as shown in FIGS. 23, 24, and 30 will be referenced by the same reference numerals.

The azimuth detecting unit 30C and the target linking unit 32c shown in FIG. 34 are the azimuth detecting unit 30 and the target linking unit 32 of the signal processing unit 20E (FIG. 23), respectively.

The target linking unit 32c writes and stores the complex data (n) acquired in the present detection cycle and the AR coefficient 1(n) calculated in the present detection cycle in the memory 21. The AR coefficient 1(n) is derived from the complex data (extended complex data) extended in the present detection cycle by the principal component AR spectrum estimating unit 320B.

The complex data and the AR coefficient 1 written to the memory 21 is called in the present detection cycle (n-th time of acquisition) which is a subsequent detection cycle by the target linking unit 32b.

The complex data and the AR coefficient 1 are called as complex data (n−1) acquired in the previous (preceding) detection cycle and an AR coefficient 1(n−1) derived in the previous (preceding detection cycle).

That is, the sixth embodiment is different from the fourth and fifth embodiments in the information stored in the memory 21. The information stored in the memory 21 includes the acquired complex data and the AR coefficient of which the order is increased. The AR coefficient (AR coefficient 1) is calculated by the principal component AR spectrum estimating unit 320B.

The azimuth detecting unit 30C includes a data extending unit 310C, a principal component AR spectrum estimating unit 320B, an FBLP unit 340, and a spectrum calculating unit 380.

The data extending unit 310C generates extended complex data in which the number of data is extended from plural pieces of complex data which are acquired in a predetermined number of detection cycles including the present detection cycle out of the detection cycles in which the process of calculating the direction of arrival of a received wave is repeatedly performed and the called AR coefficient.

The plural pieces of complex data (1(n), . . . , P(n)) acquired in the present detection cycle are complex data corresponding to the beat frequencies (one or both of the ascending and the descending) resolved by the frequency resolving unit 22.

The data extending unit 310C generates a predetermined number of extended complex data (1(n), . . . , P(n)) based on the original complex data of which the number of data should be extended and the AR coefficient.

The data extending unit 310C generates the extended complex data (1(n), . . . , P(n)) based on the complex data (1(n), . . . , P(n)) of the present detection cycle by the frequency resolving unit 22 for a new target. When generating the extended complex data, the data extending unit 310C acquires the complex data (1(n), . . . , P(n)) of the present detection cycle from the frequency resolving unit 22. In the detection cycle after linking the targets, the data extending unit 310C acquires the complex data (1(n−1), . . . , P(n−1)) of the preceding detection cycle from the target linking unit 32c. The data extending unit 310C acquires the AR coefficient (n−1) of the preceding detection cycle stored in the memory 21 through the use of the target linking unit 32c. The data extending unit 310C generates the extended complex data (1(n), . . . , P(n)) and (1(n−1), . . . , P(n−1)) based on the acquired complex data (1(n), . . . , P(n)) of the present detection cycle and the complex data (1(n−1), . . . , P(n−1)) of the preceding detection cycle, and the AR coefficient (n−1) of the preceding detection cycle. That is, the number of the extended complex data generated in the detection cycle after linking the targets is 2P.

In this manner, the data extending unit 310C generates the extended complex data corresponding to the acquired complex data from the complex data acquired in the "present detection cycle" and the "preceding detection cycle" and the AR coefficient (n−1) calculated in the "preceding detection cycle".

Here, when generating the extended complex data for a new target not linked to the preceding detection cycle as the determination result of the target linking unit 32c, the data extending unit 310C acquires the AR coefficient 2(n) of the present detection cycle from the FBLP unit 340. The data extending unit 310C generates the extended complex data (1(n), . . . , P(n)) based on the complex data (1(n), . . . , P(n)) and the AR coefficient 2(n). That is, the number of extended complex data generated for a new target is P.

The target linking unit 32c stores the AR coefficient (n) calculated by the AR coefficient calculating unit 326B in the present detection cycle in the memory 21. When the AR coefficient stored in the memory 21 is called out by the target linking unit 32c in a subsequent detection cycle, the AR coefficient is called out as the AR coefficient 1(n−1) (the preceding (n−1) AR coefficient) calculated in the preceding detection cycle.

In the sixth embodiment, the FBLP unit 340 (see FIG. 24) generates the AR coefficient 2(n) based on the complex data acquired in a detection cycle in which a target is newly detected.

The table installed in the memory 21 is the same as the table shown in FIG. 31.

The flow of processes will be described below with reference to FIGS. 32 and 35.

Figure 35:
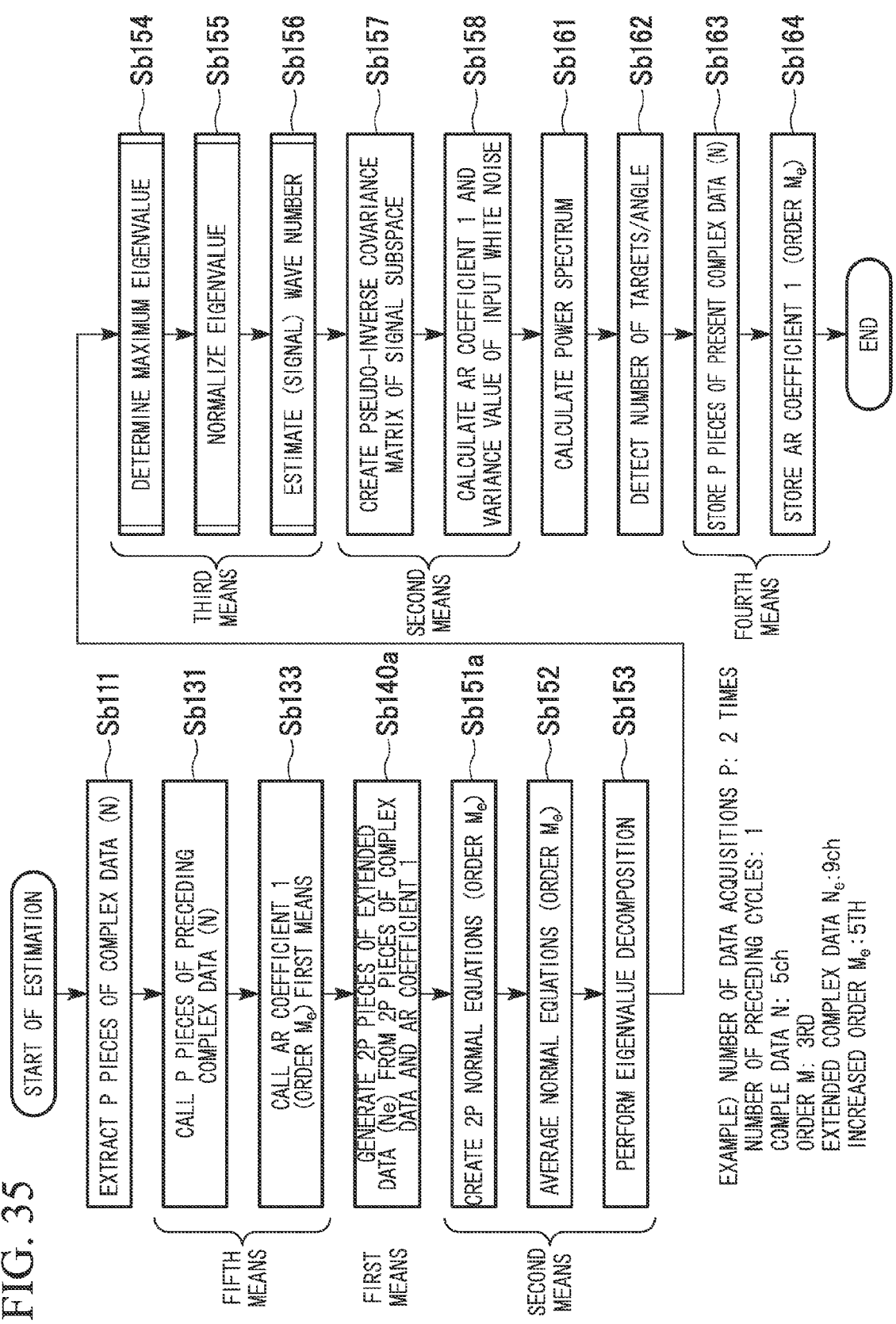
FIG. 35 is a flowchart illustrating the flow of processes in step Sb300 in the sixth embodiment.

The flow of processes shown in FIGS. 34 and 35 is repeatedly performed for each control cycle (see FIG. 25) and for each of plural targets selected through the detection of peaks in the entire configuration of the radar.

First, a new target detecting process is performed in the flow of processes shown in FIG. 32.

As shown in FIG. 32, first, in step Sa600, the data linking unit 32c determines whether a target is new.

When it is determined in step Sa600 that the present target is new, the process of step Sa111 is performed. The processes of step Sa111 to Sa162 are sequentially performed. The processes of steps Sa111 to Sa162 are the same as shown in FIGS. 15 to 17.

Here, the data extending unit 610, the principal component AR spectrum estimating unit 620, the FBLP unit 640, and the power spectrum calculating unit 680 are replaced with the data extending unit 310C, the principal component AR spectrum estimating unit 320B, the FBLP unit 340, and the power spectrum calculating unit 380, respectively. The normal equation creating unit 621, the normal equation filter unit 622, the eigenvalue decomposition unit 623, the wave number estimating unit 624, the pseudo-inverse covariance matrix calculating unit 625, and the AR coefficient calculating unit 626 are replaced with the normal equation creating unit 321, the normal equation filter unit 322, the eigenvalue decomposition unit 323, the wave number estimating unit 324, the pseudo-inverse covariance matrix calculating unit 325, and the AR coefficient calculating unit 326B, respectively. The normal equation creating unit 641, the normal equation filter unit 642, and the AR coefficient calculating unit 643 are replaced with the normal equation creating unit 341, the normal equation filter unit 342, and the AR coefficient calculating unit 343, respectively.

In step Sa164, the target linking unit 32c stores the $M_e$-th order AR coefficient 1(n) calculated by the principal component AR spectrum estimating unit 320B in the memory 21.

Through the above-mentioned sequence of processes, the detection cycle for a new target is ended.

When it is determined in step Sa600 that the target is not new, the process of step Sb300 is performed.

The data extending process is performed based on the AR coefficient calculated in the preceding detection cycle shown in step Sb300 and the spectrum estimating process is continuously performed.

The process of step Sb300 is a process of performing the data extension and the spectrum estimation based on the AR coefficient calculated in the preceding detection cycle.

The process (step Sb300) of performing the spectrum estimation based on the AR coefficient calculated in the preceding detection cycle will be described with reference to FIG. 35.

FIG. 35 is a flowchart illustrating the sequence (flow) of processes in step Sb300. The same processes as shown in FIGS. 29 and 33 are referenced by the same reference numerals.

The preconditions in the flow of processes to be described below are arranged as follows.

The number of data acquisitions P which is the number of times of acquiring data in a single control cycle is set to 2. The number of preceding detection cycles to be referred to other than the present detection cycle is set to 1. The number of channels N (the number of data) included in the complex data detected through the single data acquisition is set to 5 ch. The order M with which the complex data detected through the data acquisition is treated is set to 3. The number of channels $N_e$ (the number of data) included in the extended complex data to which data is extended is set to 9 ch. The order (increased order) $M_e$ to which the order of the data is increased through the data extension is set to 5. It is assumed that these values are preliminarily determined.

In step Sb111, complex data for each channel (CH) is acquired one or more times in the same control cycle. P pieces of present complex data (N) can be acquired by performing the data acquisition by P times.

In accordance with the above-mentioned preconditions, the number of data acquisitions P is set to 2. The number of channels N (number of data) of the complex data is 5 ch.

In step Sb131, the target linking unit 32b calls the previous (preceding) complex data (N) stored in the table (FIG. 31) installed in the memory 21 and supplies the called coefficient to the data extending unit 310B.

In step Sb133, the target linking unit 32c calls P pieces of previous (preceding) complex data and the AR coefficient 1 (the order $M_e$) stored in the memory 21 and supplies the called to the data extending unit 310C.

Subsequently, the processes of steps Sb140a to Sb162 are performed.

In step Sb163, the target linking unit 32c stores P pieces of present complex data (N) in the memory 21.

In step Sb164, the AR coefficient calculating unit 326B stores the $M_e$-th order AR coefficient 1 calculated in step Sb158 in the memory 21 through the use of the target linking unit 32c.

Through the above-mentioned sequence of processes, the same can be sequentially performed in a detection cycle after linking the targets.

In this manner, by providing the determination process of step Sa600, it is possible to perform the data extending process in the data extending unit 310C based on the AR coefficient 2(n) calculated based on the complex data detected in the present detection cycle when a target is first performed. Accordingly, it is possible to enhance the detection precision in all the detection cycles.

In the detection cycle after the targets are linked, by performing the data extending process based on the complex data acquired in the preceding detection cycle, it is possible to further increase the number of extended complex data, compared with the case of the detection cycle in which a new target is detected.

Through the above-mentioned sequence of processes, the electronic scanning radar apparatus can detect an azimuth with enhanced detection precision.

Seventh Embodiment

An electronic scanning radar apparatus according to a seventh embodiment of the invention will be described with reference to the accompanying drawings.

Figures 36, 37:
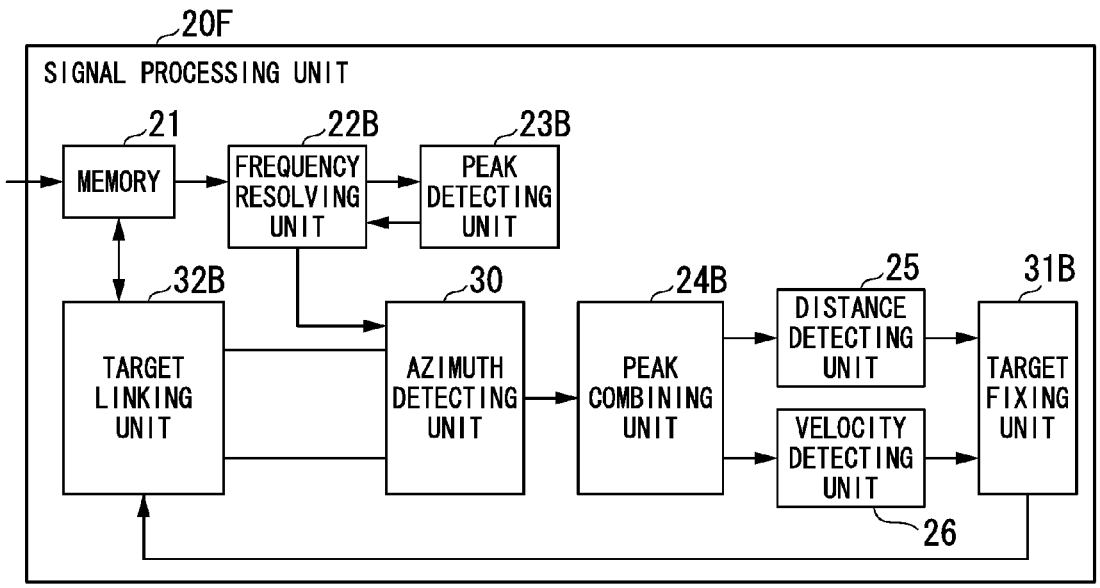
FIG. 36 is a block diagram illustrating the configuration of an electronic scanning radar apparatus according to a seventh embodiment of the invention.
FIG. 37 is a diagram illustrating a table used to combine peaks in the ascending region and the descending region.

FIG. 36 is a block diagram illustrating the configuration of the electronic scanning radar apparatus according to the seventh embodiment.

In the seventh embodiment, an azimuth estimating process is performed through the use of a high-resolution algorithm, similarly to the fourth to sixth embodiments. The same constituents as in the fourth to sixth embodiments shown in FIG. 23 will be referenced by the same reference numerals and differences from the fourth embodiment will be described below.

A frequency resolving unit 22B of a signal processing unit 20F converts beat signals of the ascending region and the descending region for each antenna into complex data and outputs frequency points indicating the beat frequencies and the complex data to a peak detecting unit 23B.

The peak detecting unit 23B detects the peak values of the ascending region and the descending region and the frequency points at which the peak values are present, and outputs the frequency points to the frequency resolving unit 22B.

The frequency resolving unit 22B outputs the corresponding complex data for each of the ascending region and the descending region to the azimuth detecting unit 30.

The complex data is the target group (the beat frequencies having a peak in the ascending region and the descending region) of each of the ascending region and the descending region. Here, the peak detecting unit 23B can perform the same function as the maximum eigenvalue determining process (step S155a) in the model order estimating process in the azimuth detecting unit and thus may be deleted.

Since the target linking unit 32B needs to link the target fixed in the past and both target groups of the ascending and the descending, the above-mentioned table is stored in the memory 21.

The target linking unit 32B links the present detection cycle to the preceding detection cycles through the same process as in the target linking unit 32 shown in FIG. 23.

The azimuth detecting unit 30 performs the process of averaging the normal equations and the wave number estimating process in the fourth to sixth embodiments on the ascending region and the descending region.

The azimuth detecting unit 30 detects the angles θ of the AR coefficient in the ascending region and the AR coefficient in the descending region and outputs the detected angles as the table shown in FIG. 37 to a peak combining unit 24B.

FIG. 37 is a diagram illustrating a table used to combine the peaks of the ascending region and the descending region.

The peak combining unit 24B combines the peaks having the same angle based on the information of the table shown in FIG. 37 and outputs the combination of beat frequencies of the ascending region and the descending region to the distance detecting unit 25 and the velocity detecting unit 26.

The distance detecting unit 25 calculates the distance based on the combination of beat frequencies of the ascending region and the descending region, similarly to the fourth embodiment.

The velocity detecting unit 26 calculates the relative velocity based on the combination of beat frequencies of the ascending region and the descending region, similarly to the fourth embodiment.

A target fixing unit 31B fixes the complex data of the ascending region and the descending region, and the frequency point, the distance, and the relative velocity in the ascending region and the descending region as the present status.

The target linking unit 32B stores the frequency points of the ascending region and the descending region, the complex data of the ascending region and the descending region, the distance, the longitudinal position, the lateral position, and the relative velocity for each target, which are input from the target fixing unit 31B, in the table through the same processes as in the fourth to sixth embodiments.

Through the above-mentioned sequence of processes, the electronic scanning radar apparatus can detect an azimuth with enhanced detection precision.

Eighth Embodiment

An electronic scanning radar apparatus according to an eighth embodiment of the invention will be described with reference to the accompanying drawings.

Figures 38, 39:
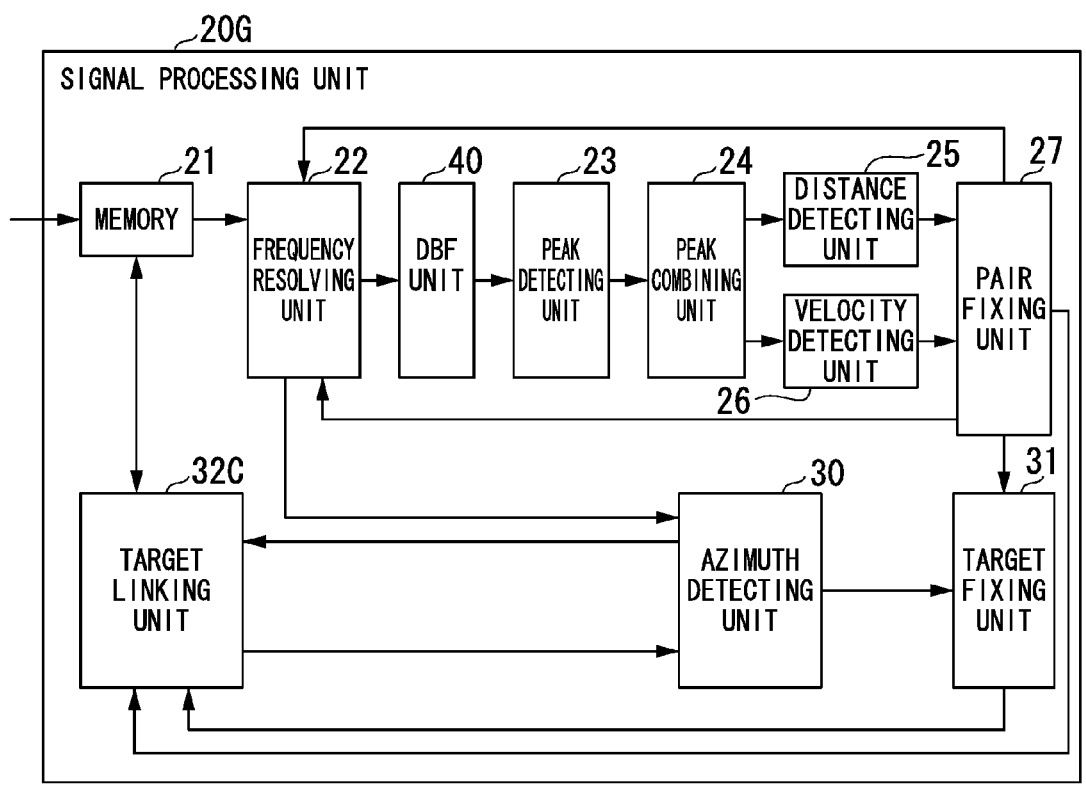
FIG. 38 is a block diagram illustrating the configuration of an electronic scanning radar apparatus according to an eighth embodiment of the invention.
FIG. 39 is a table in which pairs of peaks in the ascending region and the descending region are fixed.

FIG. 38 is a block diagram illustrating the configuration of the electronic scanning radar apparatus according to the eighth embodiment.

In the eighth embodiment, unlike the fourth embodiment, an azimuth estimating process is first performed through the use of a DBF (Digital Beam Forming) with a resolution lower than that of the high-resolution algorithm such as the AR spectrum estimating process and an azimuth estimating process is then performed through the use of the high-resolution algorithm based on the AR spectrum estimating process using averaged normal equations. The same constituents as in the fourth embodiment shown in FIG. 23 will be referenced by the same reference numerals and differences from the fourth embodiment will be described below.

As shown in the drawing, this embodiment is different from the fourth embodiment, in that a DBF unit 40 is disposed between a frequency resolving unit 22 and a peak detecting unit 23 in the fourth embodiment shown in FIG. 23 and the azimuth in which a received wave arrives is detected first using the DBF.

Similarly to the seventh embodiment, the frequency resolving unit 22 resolves input beat signals in frequencies (Fourier-transform in a time axis direction) and outputs frequency points indicating the beat frequencies and the complex data to the DBF unit 40.

The DBF unit 40 Fourier-transforms the input complex data corresponding to the antennas in the arrangement direction of the antennas, that is, performs a spatial-axis Fourier transform.

The DBF unit 40 calculates spatial complex data depending on the angle, that is, for each angular channel corresponding to the angular resolution, and outputs the calculated spatial complex data to the peak detecting unit 23 for each beat frequency.

Accordingly, a spectrum indicated by the spatial complex data (in the units of beat frequencies) for each angular channel output from the DBF unit 40 depends on the estimation of a direction of arrival of a received wave based on the beam scanning resolution.

Since the complex data is Fourier-transformed in the arrangement direction of the antennas, the same effect as adding the complex data of the angular channels can be obtained and the complex data for each angular channel is improved in the S/N ratio. Accordingly, it is possible to enhance the precision in detection of a peak value, similarly to the first embodiment.

Similarly to the third embodiment, the complex data and the spatial complex data are both calculated from both the ascending region and the descending region of a triangular wave.

The peak detecting unit 23 detects the peak for each angular channel based on the DBF result and outputs the detected peak values of the channels to the next-stage peak combining unit 24 for each angular channel, after the process in the DBF unit 40 is performed. That is, in the case of the spatial-axis Fourier transform with a resolution of 16, the number of angular channels is 15.

Similarly to the third embodiment, the peak combining unit 24 combines the beat frequencies having a peak value in the ascending region and the descending region and the peak values and outputs the combinations to the distance detecting unit 25 and the velocity detecting unit 26 for each angular channel.

The pair fixing unit 27 generates the table shown in FIG. 5 for each angular channel based on the distance r and the relative velocity v sequentially input from the distance detecting unit 25 and the velocity detecting unit 26, and determines the appropriate combination of peaks in the ascending region and the descending region corresponding to each target, similarly to the first embodiment. Here, since the presence of a target appears over plural angular channels with the resolution of the DBF, it is possible to appropriately combine the peaks of the ascending region and the descending region for each angular channel in consideration of the coincidence with adjacent angular channels (matrices). The pair fixing unit fixes the pair of peaks of the ascending region and the descending region, outputs a target group number indicating the fixed distance r and the fixed relative velocity v to the target fixing unit 31, and prepares the table shown in FIG. 39.

FIG. 39 is a diagram illustrating a table in which the pair of peaks of the ascending region and the descending region is fixed.

Since the information on the angular channels of each target is obtained in addition to the distance r and the relative velocity v and the longitudinal position and the lateral position of the target can be acquired, the pair fixing unit 27 generates the table shown in FIG. 39 in which the longitudinal position and the lateral position included in the table shown in FIG. 6 and the results corresponding to the target groups in the present detection cycle are included.

Since the target linking unit 32C performs the process of linking the target in the present detection cycle to the target in the preceding detection cycles of FIG. 25 using the information of the table shown in FIG. 39 and uses the longitudinal position and the lateral position in addition to the distance, the relative velocity, and the peak frequencies as the linking parameters, it is possible to perform the linking process with higher precision.

The azimuth detecting unit 30 performs the process of averaging the normal equations and the wave number estimating process in the fourth to eighth embodiments.

By estimating the azimuth through the use of an AND logic based on the azimuth information from the azimuth detecting unit 30 and the azimuth information from the DBF unit, it is possible to improve the reliability of the direction detection, or to share the azimuth information each other, or to utilize the angular information of the DBF, for example, because the angular resolution may be low within a short range.

The azimuth detecting unit 30 performs the process of averaging the normal equations and the wave number estimating process in the fourth to eighth embodiments.

(Direction Estimation Characteristic in Eighth Embodiment)

The direction estimation characteristics of the electronic scanning radar apparatus according to the eighth embodiment will be described below.

FIG. 40 is a diagram illustrating the effect of the azimuth estimation characteristics of the electronic scanning radar apparatus according to the eighth embodiment.

When there are two preceding vehicles, a case employing the principal AR spectrum estimating method without any change and a case according to the eighth embodiment will be compared. In this comparison, the difference in estimation result due to the difference in estimation method will be reviewed based on the complex data in which the distances from the targets (preceding vehicles) are equal to each other. It is assumed that two targets (preceding vehicles apart by 55 m) are present and the wave number of the arrival wave is estimated to be 2.

In the estimation result of the principal component AR spectrum estimating method shown in part (a) of FIG. 40, the number of channels 5 CH and the order is 3. The data extending process and the process of averaging the normal equations are not performed.

Three curves shown in the drawing represent the results corresponding to three cycles. As shown in the drawing, the positions (angles) of the peaks of the waveforms indicating a power spectrum are different and thus the position (angle) of a target cannot be stably detected. That is, it can be seen that the detection is not stabilized by only applying the principal component spectrum estimating method without any change.

On the other hand, the case according to the eighth embodiment is shown in part (b) and part (c) of FIG. 40.

Part (b) of FIG. 40 shows an example of the estimation result of the fourth embodiment and part (c) of FIG. 40 shows an example of the estimation result of the sixth embodiment.

In this manner, in the results shown in part (b) and part (c) of FIG. 40, the peaks of the curves are precipitous and the directions in which the peaks are detected are stabilized. As a result, two peak values are separately detected and the presence of two vehicles as the target is detected well.

As can be seen from the estimation results shown in part (b) and part (c) of FIG. 40, a more excellent estimation result can be obtained by increasing the number of data acquisitions. For example, the number of data acquisitions can be increased by causing plural devices or processors (FPGA, DSP, microcomputers) to perform the processes from the process of acquiring data to the process of extracting complex data (FFT and detection of peaks).

In the electronic scanning radar apparatus according to the eighth embodiment, it is possible to improve the detection precision by setting the order of the normal equation used for the azimuth detecting unit 30 (60) to perform the spectrum estimating process and the actual wave number to be estimated based on the complex data of the detection beat frequencies and then performing the azimuth estimating process. It is also possible to increase the order to be set by performing the data extending process, and it is also possible to enhance the precision of elements of the normal equation without increasing the order to be set.

According to the embodiments of the invention, a series of processes including the process of filtering a normal equation, the data extending process, and the process of the principal component AR spectrum estimating method of increasing the order and estimating the wave number can improve the azimuth detection precision (the angle precision or resolution).

Since the original complex data can be extended to a larger number of data (CH) by the first means, it is possible to increase the order of the normal equation of the second means. When the order is not increased, it is possible to improve the precision of elements of the normal equation.

Since the second means creates the pseudo-inverse matrix through the eigenvalue decompostion from the averaged covariance matrices of the plural normal equations acquired by the first means, it is possible to acquire an AR coefficient with high precision. Since the AR coefficient of the signal subspace can be calculated, it is possible to detect an azimuth with high precision and with suppressed spurious peaks. By increasing the order to be higher than the highest order which can be set from the original complex data, it is possible to reflect the characteristics of the AR spectrum estimation that higher order causes higher precision.

With the third means, it is possible to relatively easily estimate the wave number of a signal through the use of a method of effectively utilizing the eigenvalue decomposition process of all the steps. Since erroneous azimuth estimation can be prevented by determining the magnitude of the maximum eigenvalue, it is possible to determines whether no peak is detected in the entire configuration of a radar (for example, a case where an angle in the range of all distance points or any distance point is estimated using a spectrum) or whether the wave number estimation should be performed using another threshold value after detecting the peak. By estimating the wave number using the normalized eigenvalues, it is possible to estimated and determine the wave number not depending on the distance from a target. In addition, by employing plural threshold values of the eigenvalues, it is possible to provide the reference of specific wave number estimation.

With the fourth means, it is possible to necessarily utilize the AR coefficient acquired in the present control cycle as the AR coefficient used to extend data.

Since the complex data and the AR coefficient in a preceding control cycle can be stored by the use of the fifth means, it is possible to guarantee the number of data for averaging the normal equations.

Since data can be extended using the AR coefficient of which the order is increased by combination of the sixth means and the fifth means, it is possible to enhance the detection precision.

Although the configurational example using the FMCW type radar shown in FIG. 1 is described in the first to third embodiments and the configurational example using the FMCW type radar shown in FIG. 23 is described in the fourth to eighth embodiments, the invention can be applied to another antenna structure of the FMCW type. In addition to the operation of the microcomputer in the above-mentioned embodiments, by causing plural devices or processors (FPGA, DSP, microcomputers) to perform the processes from the process of acquiring data to the process of extracting complex data (FFT and detection of peaks), it is possible to increase the number of data acquisitions and to enhance the azimuth estimation precision.

The invention can be applied to other types such as a multi-frequency CW (Continuous Wave) radar and a pulse radar other than the FMCW type.

Although it has been stated in the above-mentioned embodiments that the peaks of a power spectrum are calculated to estimate the number of targets and the azimuth, the estimation can be performed using a spectrum prepared without multiplication of the variance value of the input white noise and thus the calculation of the variance value of the input white noise may be skipped. In addition, the azimuth may be estimated with the polarity through the use of the calculation of calculating a root of a high-order equation instead of the power spectrum.

Programs for realizing the functions of the signal processing units 20A to 20C and 20E to 20G in FIGS. 1, 7, 15, 18, 19, 21, 23, 24, 30, 34, 36, and 38 may be recorded on a computer-readable recording medium and the programs recorded on the recording medium may be read and executed by a computer system to perform the signal process of detecting an azimuth from a received wave. The "computer system" includes an OS and hardware such as peripherals. The "computer system" also includes a WWW system having a homepage provision environment (or display environment). The "computer-readable recording medium" includes a portable medium such as a flexible disc, a magneto-optical disc, a ROM, or a CD-ROM or a storage device such as a hard disk built in the computer system. The "computer-readable recording medium" also includes a device storing a program for a predetermined time, like an internal volatile memory (RAM) of a computer system serving as a server or a client when the program is transmitted through a network such as the Internet or a communication line such as a telephone line.

The programs may be transmitted from a computer system having the programs stored in a storage device thereof or the like to another computer system through a transmission medium or by carrier waves in the transmission medium. The "transmission medium" which transmits a program means a medium having a function of transmitting information and examples thereof include a network (communication network) such as the Internet and a communication link (communication line) such as a telephone line. The program may realize some of the above-described functions. The program may realize the above-described functions in combination with a program already recorded in a computer system, that is, the program may be a differential file (differential program).

In the above-mentioned embodiments, for example, when it is determined in step Sa155 that the value of the maximum eigenvalue is smaller than the predetermined threshold value, it is determined that the reliability of the acquired information (complex data) is low and the wave number estimating process of the subsequent step is not performed on the corresponding target, thereby preventing incorrect information from being provided.

For example, even when the processes of estimating the wave number and estimating the azimuth in the subsequent steps are not performed the information of a target in the corresponding cycle is not detected but lost, it is possible to similarly maintain the lost information of the target by using an extrapolation method based on tracking which is typically performed in the subsequent steps as a recognition process of the radar. According to this method, since it is possible to prevent a target from being lost, it is possible to suitably utilize the idea that it is more desirable to cancel the incorrect azimuth estimation result than to output the incorrect azimuth detection result. The idea that the azimuth detection should not be cancelled as much as possible may be right in some cases. Accordingly, the wave number may be forcibly allocated to a predetermined wave number (for example, any one of the maximum wave order and the minimum order) without performing the wave number estimation in the subsequent step. By performing the signal wave number estimating process including the maximum eigenvalue determination, it is effective, for example, in the case where it is determined whether the targets of which the peak is detected should be additionally subjected to the azimuth detection for each target or in the configuration in which the peak should not be detected. An example of the configuration in which the peak should not be detected is a processing configuration in which the azimuth detection is unconditionally performed on the overall points or any distance point.

Another method may be used instead of the data extension method described in the above-mentioned embodiments.

For example, the extension of a waveform in the domain of the original complex data using phase correction may be used by performing an IFFT process after adding data with a value of "0" to the extracted complex data, performing an FFT process, and correcting the phase in the transformed domain, or various data extrapolation algorithms or data prediction algorithms may be used.

The wave number estimation described in the above-mentioned embodiments may employ techniques of Frobenius norm ratio and the like of estimating the number of effective ranks of the eigenvalue decompostion as well as the threshold determination technique using the normalized eigenvalues.

The wave number when creating the pseudo-inverse covariance matrix may be fixed, for example, to the maximum wave number for the purpose of calculating the AR coefficient for the data extension or may be set independently of the wave number for calculating the power spectrum.

What is claimed is:

1. An electronic scanning radar apparatus mounted on a moving object, comprising:
  a receiving unit including a plurality of antennas receiving a received wave arriving from a target having reflected a transmitted wave;
  a beat signal generating unit configured to generate a beat signal from the transmitted wave and the received wave;
  a frequency resolving unit configured to resolve the beat signal in beat frequencies having a predetermined frequency bandwidth and to calculate complex data based on the beat signal resolved for each beat frequency; and
  an azimuth detecting unit configured to calculate a direction of arrival of the received wave based on original complex data which is the complex data calculated based on the beat signal,
  wherein the azimuth detecting unit includes
  a data extending unit configured to generate extended complex data by extending the number of data based on the original complex data, and
  a first computation processing unit configured to calculate the direction of arrival of the received wave based on the extended complex data.

2. The electronic scanning radar apparatus according to claim 1, wherein the azimuth detecting unit further includes a second computation processing unit configured to generate a coefficient used to generate the extended complex data in a linear equation created based on the original complex data.

3. The electronic scanning radar apparatus according to claim 2, wherein the data extending unit is configured to generate the extended complex data based on the original complex data and the coefficient.

4. The electronic scanning radar apparatus according to claim 2, wherein the first computation processing unit includes:
  an order-increased matrix creating unit configured to create an order-increased matrix which is increased to a predetermined desired order and which has the extended complex data as elements;
  an eigenvalue decomposition unit configured to obtain eigenvalues and eigenvectors by applying eigenvalue decomposition to the order-increased matrix; and
  a wave number estimating unit configured to calculate an estimated wave number by estimating the wave number of the arrival wave based on the obtained eigenvalues and the eigenvectors, and
  wherein the direction of arrival of the received wave is calculated based on a subspace determined by the estimated wave number.

5. The electronic scanning radar apparatus according to claim 4, wherein the first computation processing unit further includes:
  a pseudo-inverse matrix calculating unit configured to calculate a pseudo-inverse matrix of a signal subspace included in the subspace determined by the estimated wave number; and
  a first coefficient calculating unit configured to calculate a first AR coefficient derived from the pseudo-inverse matrix of the signal subspace and a variance value of white noise, and
  wherein the first computation processing unit is configured to perform a computational process based on a principal component AR spectrum estimating method.

6. The electronic scanning radar apparatus according to claim 4, wherein the first computation processing unit further includes a matrix filter unit configured to average the order-increased matrix having the generated extended complex data as elements based on the information corresponding to the target, and
  wherein the eigenvalue decomposition unit is configured to obtain eigenvalues and eigenvectors by applying eigenvalue decomposition to the averaged order-increased matrix.

7. The electronic scanning radar apparatus according to claim 4, wherein the first computation processing unit further includes a first normal equation filter unit configured to average the order-increased matrices and right-hand vectors which are constituent parts of a first normal equation created based on the extended complex data which is extended based on the complex data acquired in a predetermined number of detection cycles including the present detection cycle.

8. The electronic scanning radar apparatus according to claim 2, wherein the coefficient is calculated based on a linear equation expressing an autoregressive model in a spectrum estimating method using the autoregressive model.

9. The electronic scanning radar apparatus according to claim 2, wherein the data extending unit is configured to generate the extended complex data based on the coefficient calculated in a present detection cycle out of detection cycles in which the process of calculating the direction of arrival of the received wave is repeatedly performed.

10. The electronic scanning radar apparatus according to claim 9, further comprising
a storage unit configured to store information corresponding to the target in correlation with the number of times of the detection cycles,
wherein the data extending unit is configured to generate the extended complex data based on the coefficient which is stored in the storage unit as the information corresponding to the target and which is calculated in a preceding detection cycle previous to the present detection cycle.

11. The electronic scanning radar apparatus according to claim 10, wherein the data extending unit is configured to generate the extended complex data based on the original complex data calculated in the present detection cycle and the preceding complex data stored in the storage unit as the information corresponding to the target and calculated in the preceding detection cycle previous to the present detection cycle.

12. The electronic scanning radar apparatus according to claim 10, further comprising
a target linking unit configured to correlate the targets detected in the present detection cycle and the preceding detection cycle and to store the information correlated with the correlated target in the storage unit.

13. The electronic scanning radar apparatus according to claim 12, wherein the target linking unit is configured to correlate the target detected in the present detection cycle and the preceding detection cycle based on a distance and a relative velocity, or based on a distance, a relative velocity, and an azimuth.

14. The electronic scanning radar apparatus according to claim 2, wherein the second computation processing unit includes:
a normal equation creating unit configured to create a second normal equation based on the extended complex data; and
a second coefficient calculating unit configured to calculate the coefficient derived based on the second normal equation.

15. The electronic scanning radar apparatus according to claim 14, wherein the second computation processing unit further includes a second normal equation filter unit configured to average the second normal equation, and
wherein the second coefficient calculating unit is configured to calculate the coefficient from the averaged second normal equation.

16. The electronic scanning radar apparatus according to claim 1, further comprising
a peak detecting unit configured to detect a peak value from intensity values of the beat frequencies to detect the presence of the target,
wherein the azimuth detecting unit is configured to calculate the direction of arrival of the received wave based on the complex data corresponding to the target of which the presence is detected by the peak detecting unit.

17. The electronic scanning radar apparatus according to claim 16, further comprising
a DBF unit configured to detect the presence and the azimuth of the target through the use of a digital beam forming process of enhancing receiving sensitivity in a desired direction in which the received wave is received based on the complex data,
wherein the peak detecting unit is configured to detect the azimuth of the target based on the digital beam forming in the beat frequencies in the present detection cycle.

18. The electronic scanning radar apparatus according to claim 1, wherein the first computation processing unit is configured to create a matrix of which precision of elements is enhanced without increasing the order thereof.

19. A received wave direction estimating method in an electronic scanning radar apparatus mounted on a moving object, comprising:
a receiving step of receiving a received wave arriving from a target having reflected a transmitted wave through the use of a plurality of antennas;
a beat signal generating step of generating a beat signal from the transmitted wave and the received wave;
a frequency resolving step of resolving the beat signal in beat frequencies having a predetermined frequency bandwidth and calculating complex data based on the beat signal resolved for each beat frequency; and
an azimuth detecting step of calculating a direction of arrival of the received wave based on original complex data which is the complex data calculated based on the beat signal,
wherein the azimuth detecting step includes
a data extending step of generating extended complex data by extending the number of data based on the original complex data, and
a first computation processing step of calculating the direction of arrival of the received wave based on the extended complex data.

20. A computer program product tangibly embodied on a non-transitory computer-readable medium causing a computer to perform a received wave direction estimating process in an electronic scanning radar apparatus mounted on a moving object, the received wave direction estimating process comprising:
a receiving step of receiving a received wave arriving from a target having reflected a transmitted wave through the use of a plurality of antennas;
a beat signal generating step of generating a beat signal from the transmitted wave and the received wave;
a frequency resolving step of resolving the beat signal in beat frequencies having a predetermined frequency bandwidth and calculating complex data based on the beat signal resolved for each beat frequency; and
an azimuth detecting step of calculating a direction of arrival of the received wave based on original complex data which is the complex data calculated based on the beat signal,
wherein the azimuth detecting step includes
a data extending step of generating extended complex data by extending the number of data based on the original complex data, and
a first computation processing step of calculating the direction of arrival of the received wave based on the extended complex data.

* * * * *